United States Patent [19]

Piller et al.

[11] 4,051,123
[45] Sept. 27, 1977

[54] SULFONIC-ACID-GROUP CONTAINING DISAZO DYESTUFFS

[75] Inventors: Bernhard Piller; John Lenoir, both of Marly-le-Petit; Alfred Froehlich; Thomas Stauner, both of Marly-le-Grand; Paul Tschopp, Marly, all of Switzerland

[73] Assignee: Ciba-Geigy AG, Basel, Switzerland

[21] Appl. No.: 606,395

[22] Filed: Aug. 21, 1975

Related U.S. Application Data

[63] Continuation of Ser. No. 238,944, March 28, 1972, abandoned.

[51] Int. Cl.² ............... C09B 35/22; C09B 35/24; C09B 35/30; C09B 35/34
[52] U.S. Cl. ............... 260/178; 96/1.6; 96/67; 96/74; 96/89; 96/100 R; 260/152; 260/154; 260/156; 260/158; 260/160; 260/173; 260/174; 260/175; 260/184; 260/185; 260/198; 260/260; 260/295 AM; 260/326 A; 260/332.2 A; 260/347.5; 260/465 D; 260/507 R; 260/509; 260/515 P; 260/518 R; 260/519; 260/520 R; 260/544 N; 260/556 A; 560/19
[58] Field of Search ............... 260/174, 177, 178, 184, 260/175

[56] References Cited

U.S. PATENT DOCUMENTS

| | | | |
|---|---|---|---|
| 2,098,782 | 11/1937 | Hopff et al. | 260/178 |
| 2,148,135 | 2/1939 | Rossander | 260/160 |
| 2,216,229 | 10/1940 | Cliffe | 260/160 |
| 2,236,618 | 4/1941 | Cliffe | 260/178 |
| 2,266,822 | 12/1941 | Sparks et al. | 260/160 |
| 2,488,853 | 9/1948 | Allen et al. | 260/178 |
| 3,113,937 | 12/1963 | Nakaten et al. | 260/178 |
| 3,211,554 | 10/1965 | Dreyfus | 260/175 X |
| 3,598,594 | 8/1971 | Freytag et al. | 260/175 X |
| 3,749,576 | 7/1973 | Piller | 260/175 X |

FOREIGN PATENT DOCUMENTS

| | | | |
|---|---|---|---|
| 716,196 | 6/1968 | Belgium | 260/175 |
| 936,234 | 7/1948 | France | 260/175 |
| 1,449,357 | 7/1966 | France | 260/175 |
| 415,294 | 1/1967 | Switzerland | 260/163 |

*Primary Examiner*—Floyd D. Higel
*Attorney, Agent, or Firm*—Burgess, Dinklage & Sprung

[57] ABSTRACT

In a first main aspect azo dyestuffs of the formula

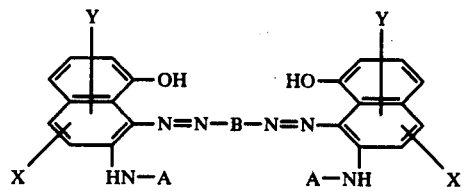

wherein A, B, X and Y are certain substituents, in a second main aspect azo dyestuffs of the formula

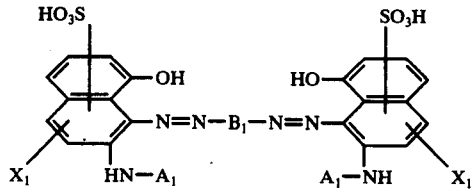

wherein B' represents certain substituents and in a third main aspect azo dyestuffs of the formula

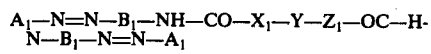

wherein $A_1$, $B_1$, $X_1$, $Z_1$ and Y are certain substituents as well as the use of said azo dyestuffs in photographic material are disclosed.

12 Claims, No Drawings

SULFONIC-ACID-GROUP CONTAINING DISAZO DYESTUFFS

This is a continuation of application Ser. No. 238,944, filed on Mar. 28, 1972 and now abandoned.

In a first main aspect the present invention relates to new azo dyestuffs, a process for their manufacture, and the use of these azo dyestuffs, as constituents for photographic materials.

The azo dyestuffs according to the invention correspond to formula (I)

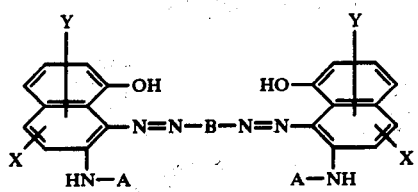

(I)

wherein A denotes a hydrogen atom, an unsubstituted or substituted alkyl group, a cycloalkyl radical or an unsubstituted or substituted benzene radical, B denotes a radical of the formula

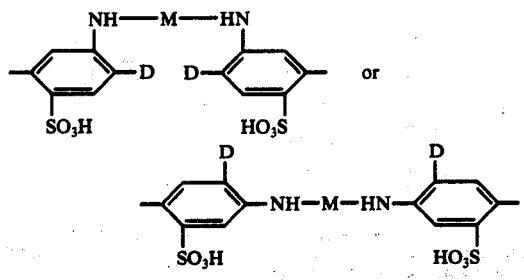

or wherein D represents a halogen atom, an unsubstituted or substituted lower alkyl, alkoxy or alkylmercapto group or an acylamino group with at most 8 carbon atoms and M represents a —CO— or —CS— group or an at least dibasic acyl radical, bonded in the manner of an amide to the two —NH— groups, which is derived from an unsubstituted or substituted aliphatic dicarboxylic acid, an unsubstituted or substituted aromatic, at least dibasic, acid which possesses sulpho and/or carboxyl groups, a heterocyclic dicarboxylic acid or a nitrogen-heterocyclic compound which contains hydroxyl groups and possesses acid character, X denotes a hydrogen atom or a sulpho or sulphonamide group and Y denotes a sulpho or sulphonamide group.

Substituted alkyl groups A for example contain hydroxyl groups as substituents. Possible cycloalkyl radicals A are especially those with 6 carbon atoms and possible substituted benzene radicals A are those which contain halogen atoms, lower alkyl, alkoxy, halogenoalkyl, alkylcarbonyl or al. lsulphonyl radicals or optionally functionally modified carboxyl or sulpho groups, for example carbonamide or sulphonamide groups.

Possible substituents of lower alkyl groups D are halogen atoms or hydroxyl groups, possible substituents of lower alkoxy groups D are lower alkoxy groups or hydroxyl groups and possible substituents for lower alkylmercapto groups D are hydroxyl groups or carboxylic acid groups. At least dibasic acyl radicals M bonded in the manner of an amide to the two —NH— groups correspond, for example, to the following formulae:

| —OC—CO— | (a) |
| —OC—Q—CO— | (b) |
| —OC—Q—SO$_2$— | (c) |
| —OC—Q'—CO— | (d) |
| —Q''— | (e) | in which formulae Q denotes an unsubstituted or substituted alkylene or alkenylene radical with 1 to 6 carbon atoms, such as the methylene, ethylene or vinylene radical, an unsubstituted or substituted aromatic radical, such as the 1,4- phenylene, 1,3-phenylene, 5-nitro-1,3-phenylene or 2,6-naphthylene radical or a radical —E—T—E'—, wherein E and E' each denote an unsubstituted or substituted aromatic or heterocyclic radical, such as a benzene, furane, thiophene or pyridine radical and T denotes a direct bond or a divalent bridge member such as an alkylene group with 1 to 12, preferably 1 to 4, carbon atoms, or a group of the formula —O—, —S—, —SO$_2$—, —S—S—, —N=N—, —CO—, —NHCOHN—, —CONH——SO$_2$NH—, —CONH—(CH$_2$)$_m$—HNOC—,

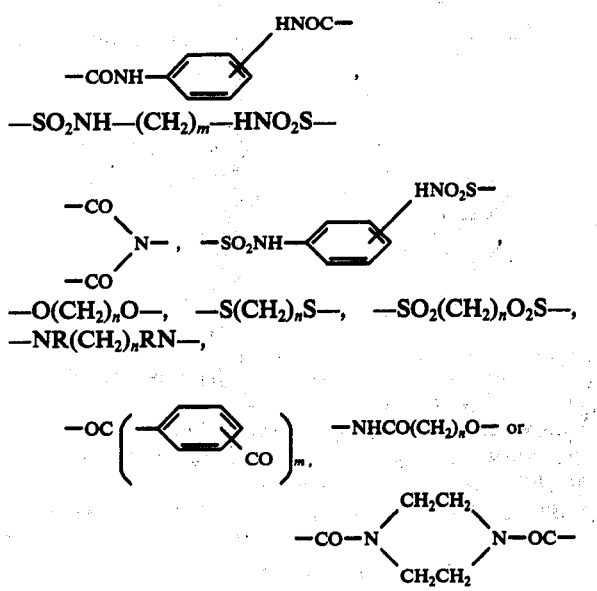

wherein m represents an integer from 1 to 5, n represents an integer from 1 to 12 and R represents a hydrogen atom or an alkyl group with 1 to 4 carbon atoms, Q' denotes a heterocyclic radical, such as the 2,5-thienylene, 2,5-furylene, 2,5-pyridylene or 2,5-pyrazinylene radical, and Q'' denotes a nitrogen-heterocyclic structure containing hydroxyl groups and possessing acid character, such as a cyanuric radical.

More specifically, the dyestuffs are those of the formula

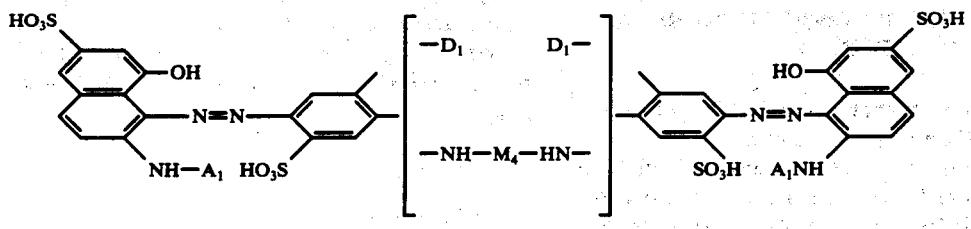

wherein
- $A_1$ denotes hydrogen, methyl, hydroxyethyl, phenyl, lower alkyl phenyl, trifluoromethyl phenyl lower alkoxy phenyl, fluoro-, chloro- or bromophenyl, sulphophenyl, carboxyphene, lower alkyl sulphophenyl or lower alkyl carbonylphenyl,
- $M_4$ denotes carbonyl, isophthaloyl, nitroisophthaloyl, benzoylamino-isophthaloyl, terephthaloyl, nitroterephthaloyl chloroterephthaloyl, naphthalenedicarbonyl, —CO—phenylenemethylene-phenylene—CO—, —OC-phenylene-carbonyl-phenylene—CO—, —OC-phenylene-sulphonyl-phenylene—CO—, —OC—phenyleneazo-phenylene—CO—, —OC-phenylene-ureylene-phenylene—CO—, —OC-phenylene-ethylene-dioxy-phenylene-CO—, —OC-phenylene-pentylenedioxy-phenylene—CO—, —OC-phenylene—CO—NH—phenylene—CO— or —OC-phenylene—CO—NH—$(CH_2)_p$—HN—OC— phenylene-CO—,
- $p$ being 2, 3 or 4 and
- $D_1$ denotes fluorine, chlorine or bromine, methyl, ethyl, methoxy, ethoxy, methylmecapto, ethylmercapto, hydroxyethylmercapto, trifluoromethyl, acetylamino or benzoylamino.

preferred azo dyestuffs correspond to the formula (II)

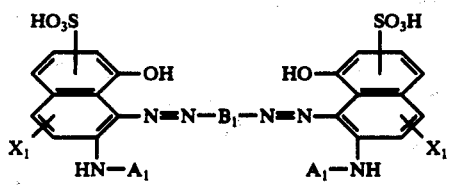

wherein $A_1$ denotes a hydrogen atom, a methyl or hydroxyethyl group or a benzene radical optionally substituted by lower alkyl, halogenoalkyl or alkoxy groups, halogen atoms, optionally functionally modified sulpho or carboxyl groups or lower alkylsulphonyl or lower alkylcarbonyl groups, $X_1$ denotes a hydrogen atom or a sulpho group and $B_1$ denotes a radical of the formula

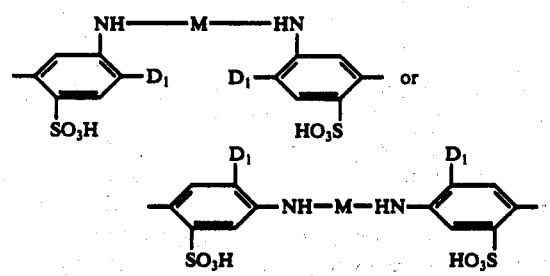

wherein M has the abovementioned meaning and $D_1$ represents a fluorine, chlorine or bromine atom, a methyl, ethyl, methoxy, ethoxy, methylmercapto, ethylmercapto or hydroxyethylmercapto group, a trifluoromethyl group or an acetyl- or benzoylamino group.

Azo dyestuffs of the formula (III)

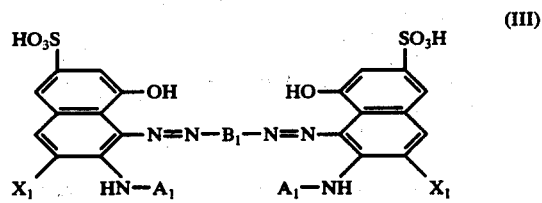

wherein $B_1$, $A_1$ and $X_1$ have the abovementioned meanings, are of particular interest.

Azo dyestuffs of the formula (IV)

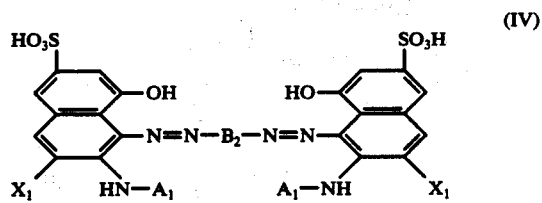

wherein $A_1$ and $X_1$ have the abovementioned meanings and $B_2$ denotes a radical of the formula

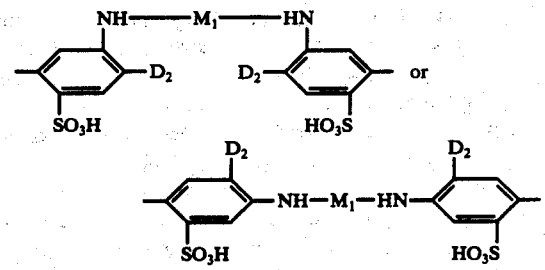

wherein $D_2$ represents a fluorine, chlorine or bromine atom or a methyl, methoxy, methylmercapto, trifluoromethyl or benzoylamino group and $M_1$ represents the carbonyl group or an at least dibasic acyl radical which is bonded in the manner of an amide to the two —NH— groups and which is derived from an unsubstituted or substituted aliphatic dicarboxylic acid with a totol of at most 8 carbon atoms, an unsubstituted or substituted aromatic dicarboxylic acid, a heterocyclic dicarboxylic acid or an aromatic or heterocyclic dicarboxylic acid of the formula $$HOOC-E''-T_1-E'''-COOH$$

wherein $E''$ and $E'''$ each denote an unsubstituted or substituted benzene radical or an unsubstituted or substituted furane, thiophene or pyridine radical and $T_1$ denotes a direct bond, an oxygen or sulphur atom, a sulphonyl, carbonyl, dithio or azo group, an alkylene group with 1 to 4 carbon atoms, a ureylene group or one of the groups —CO—NH—, —SO₂—NH—, —CONH—(CH₂)$_m$—HNOC—

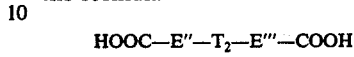

—SO₂NH—(CH₂)$_m$—HNO₂S—,

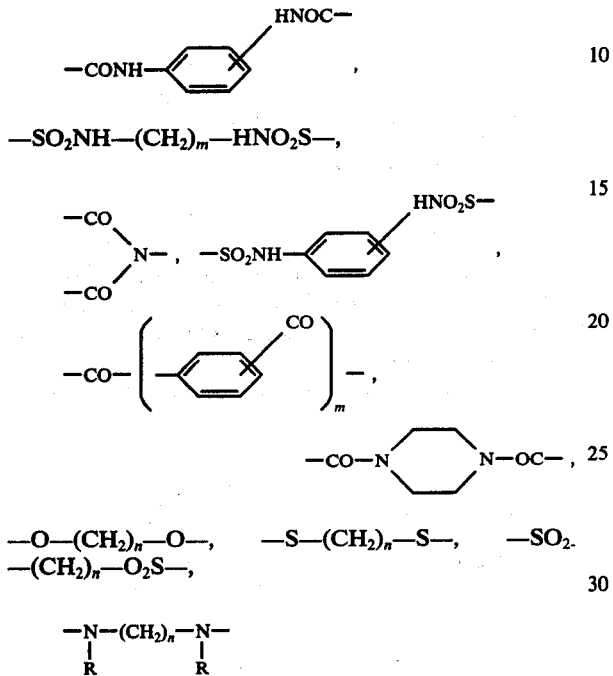

—O—(CH₂)$_n$—O—, —S—(CH₂)$_n$—S—, —SO₂—(CH₂)$_n$—O₂S—,

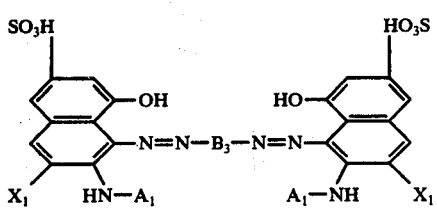

or —NHCO(CH₂)$_n$O— wherein R represents a hydrogen atom or an alkyl group with 1 to 4 carbon atoms, $m$ represents an integer from 1 to 5 and $n$ represents an integer from 1 to 12, have proved to be particularly suitable.

Particular interest is to be ascribed to azo dyestuffs of the formula (V)

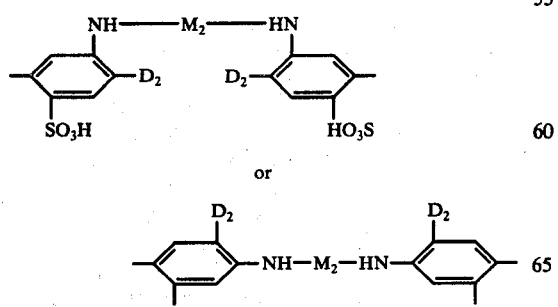

wherein $A_1$ and $X_1$ have the abovementioned meanings and $B_3$ denotes a radical of the formula

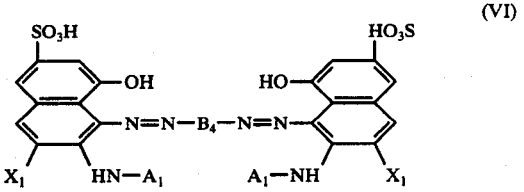

or

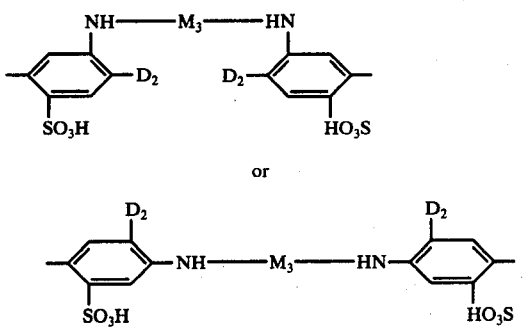

wherein $D_2$ has the abovementioned meaning and $M_2$ represents the carbonyl group and at least dibasic acyl radical bonded in the manner of an amide to the two —NH— groups, which is derived from an unsubstituted or substituted aliphatic dicarboxylic acid with a total of at most 8 carbon atoms, an unsubstituted or substituted aromatic dicarboxylic acid, a heterocyclic dicarboxylic acid or an aromatic or heterocyclic dicarboxylic acid of the formula

HOOC—E"—T₂—E'"—COOH in which E" and E'" have the abovementioned meanings and $T_2$ denotes a direct bond, an oxygen or sulphur atom, a sulphonyl, carbonyl or azo group, an alkylene group with 1 to 4 carbon atoms, a ureylene group or a —CO—NH—, —SO₂—NH—, —O—(CH₂)$_n$—O— or —CONH—(CH₂)$_m$—HNOC— group, wherein $m$ and $n$ have the abovementioned meanings.

Advantageous properties are displayed by azo dyestuffs of the formula (VI)

(VI)

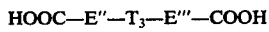

wherein $A_1$ and $X_1$ have the abovementioned meanings and $B_4$ represents a radical of the formula

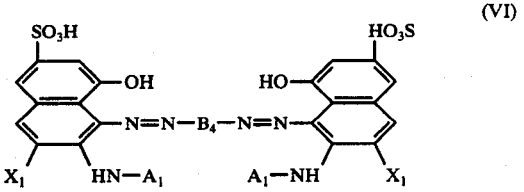

or

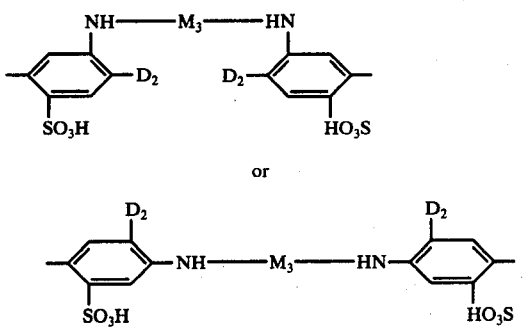

wherein $D_2$ has the abovementioned meaning and $M_3$ denotes a radical of an aromatic or heterocyclic dicarboxylic acid of the formula

HOOC—E"—T₃—E'"—COOH wherein E" and E'" have the abovementioned meanings and $T_3$ represents one of the radicals

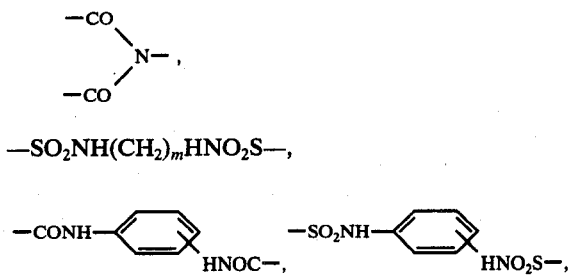

—SO₂NH(CH₂)$_m$HNO₂S—,

—S(CH$_2$)$_n$S—, —SO$_2$(CH$_2$)$_n$O$_2$S—, —NH(CH$_2$)$_n$HN—,

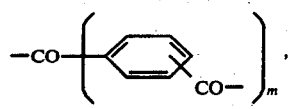

or —NHCO(CH$_2$)$_n$O—, wherein $m$ and $n$ have the abovementioned meanings.

Possible substituents of a benzene radical E or E' are halogen atoms, lower alkyl or alkoxy groups or nitro groups.

Azo dyestuffs of the formula (VII)

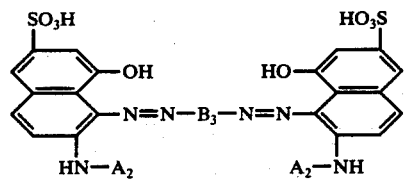
(VII)

wherein B$_3$ has the abovementioned meaning and A$_2$ denotes a hydrogen atom or a methyl, 2,6-dimethylphenyl, 2,6-dimethoxyphenyl 2-methyl-4-chloro-phenyl, 3-acetylphenyl, 3-chlorophenyl, 4-chlorophenyl, 4-fluorophenyl or 4-bromophenyl radical, those of the formula (VIII)

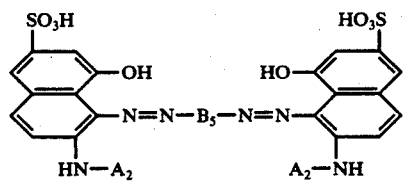
(VIII)

wherein A$_2$ has the abovementioned meaning and B$_5$ represents a radical of the formula

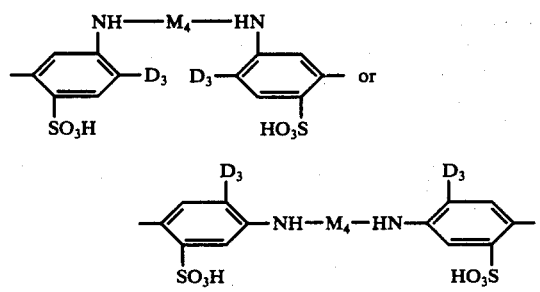

wherein D$_3$ denotes a chlorine atom or a methyl, methoxy, methylmercapto or trifluoromethyl group and M$_4$ denotes the carbonyl group, the unsubstituted isophthaloyl radical or the isophthaloyl radical substituted by a nitro or benzoylamino group, the unsubstituted terephthaloyl radical or the terephthaloyl radical substituted by nitro groups or chlorine atoms, a naphthalenedicarbonyl radical, a furane-, thiophene-, pyrazine-, pyrazole- or pyridine-dicarbonyl radical or the radical HOOC—E$_1$—T$_4$—E$_1$'—COOH wherein E$_1$ and E$_1$' represent an unsubstituted or substituted phenylene radical and T$_4$ represents the methylene, carbonyl, sulphonyl, azo, ureylene, ethylenedioxy, pentylenedioxy, —CONH— or —CONH(CH$_2$)$_p$ HNOC— radical, wherein $p$ is an integer from 2 to 4, and those of the formula (IX)

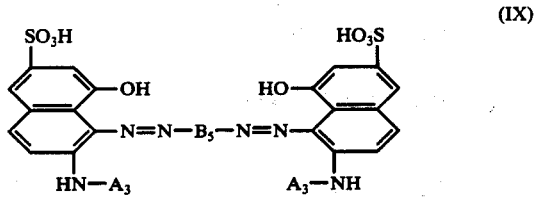
(IX)

wherein B$_5$ has the abovementioned meaning and A$_3$ denotes a hydrogen atom or a methyl, 2,6-dimethylphenyl or 2-methyl-4-chlorophenyl radical, have proved particularly suitable.

Azo dyestuffs of particular importance are those of the formula (X)

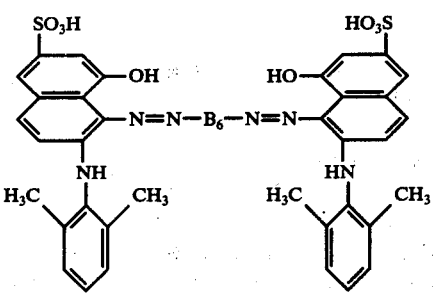
(X)

wherein B$_6$ represents the radical

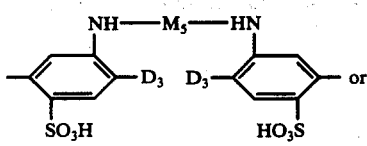
or

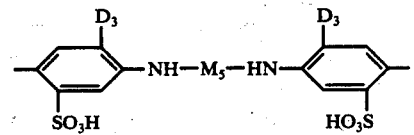

wherein D$_3$ has the abovementioned meaning and M$_5$ denotes the isophthaloyl, 5-nitro-isophthaloyl, 5-benzoylamino-isophthaloyl, terephthaloyl, naphthalene-2,6-dicarbonyl, furane-2,5-dicarbonyl, thiophene-2,5-dicarbonyl, pyridine-2,6-, -2,5-, -2,4- or 3,5-dicarbonyl, pyrazole-3,5-dicarbonyl, pyrazine-3,6-dicarbonyl, 2,5-dimethyl-pyrazine-3,6-dicarbonyl, diphenylmethane-4,4'- or 3,4'-dicarbonyl, diphenylsulphone-4,4'- or 3,4'-dicarbonyl, benzophenone-4,4'- or -3,4'-dicarbonyl, azobenzene-3,3'-dicarbonyl, N,N'-diphenylurea-4,4'-dicarbonyl, N-benzoylaniline-3,4'-dicarbonyl, N-benzoyl-2-chloroaniline-5,4'-dicarbonyl, N,N'-dibenzoylethylenediamine-4,4'- or N,N'-dibenzoylbutylenediamine-4,4'-dicarbonyl, 1,2-diphenoxyethane-3',3'- or 4',4''-dicarbonyl or 1,5-diphenoxypentane-4',4''-dicarbonyl radical. The azo dyestuffs of the formula (XI)

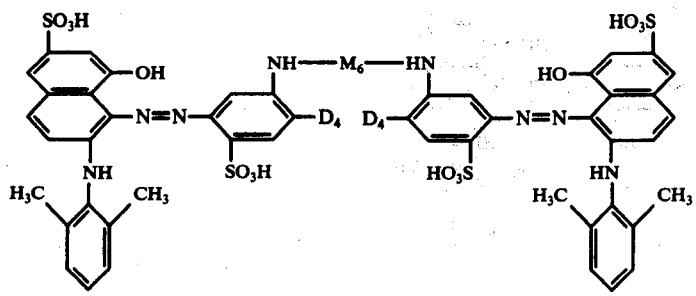
(XI)

wherein $D_4$ denotes the methyl or methoxy radical and $M_6$ denotes the terephthaloyl, pyridine-2,5- or -2,4-dicarbonyl, benzophenone-4,4'-dicarbonyl, diphenylsulphone-4,4'-dicarbonyl, naphthalene-2,6-dicarbonyl, N-benzoylaniline-3,4'-dicarbonyl, N-benzoyl-2-chloroaniline-5,4'-dicarbonyl, 1,2-diphenoxyethane-3',3''- or -4',4''-dicarbonyl or N,N'-dibenzoylethylenediamine-4,4'-dicarbonyl radical, and those of the formulae (XII), (XIII) and (XIV)

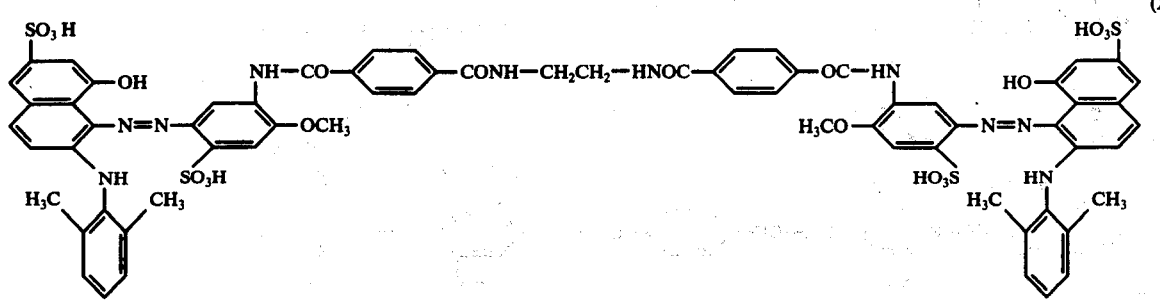
(XII)

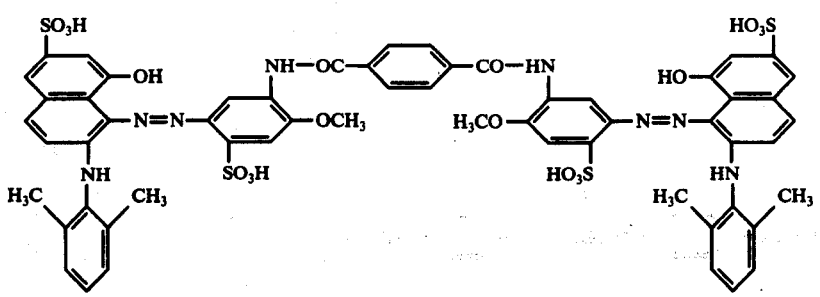
(XIII)

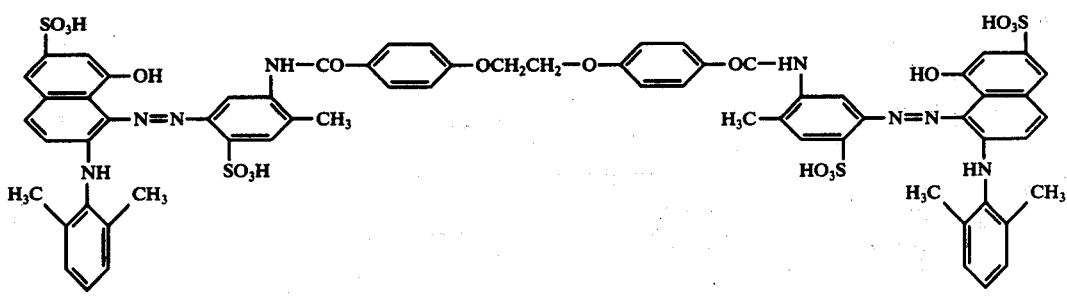
(XIV)

are particularly interesting.

Further preferred azo dyestuffs correspond to the formula (XV)

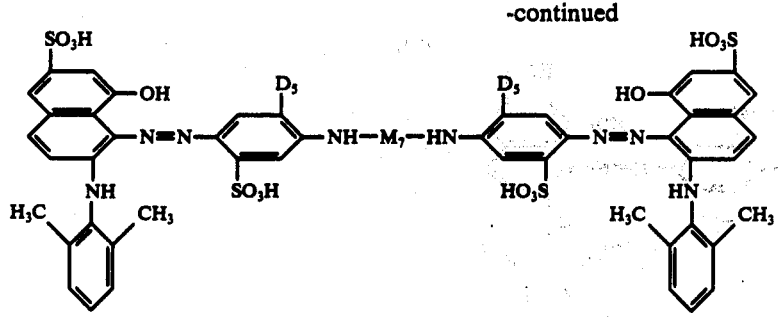

wherein $D_5$ denotes a chlorine atom or a methyl, methoxy or trifluoromethyl group and $M_7$ denotes the isophthaloyl, terephthaloyl, pyridine-2,5- or -2,6-dicarbonyl, benzophenone-4,4'-dicarbonyl, naphthalene-2,6-dicarbonyl, diphenylsulphone-4,4'-dicarbonyl, N-benzoylaniline-3,4'-dicarbonyl, N-benzoyl-2-chloroaniline-5,4'-dicarbonyl or 1,2-diphenoxyethane-3',3''- or -4',4''-dicarbonyl or N,N'-dibenzoylethylenediamine-4,4'-dicarbonyl radical, and especially to the formulae (XVI) to (XVIII)

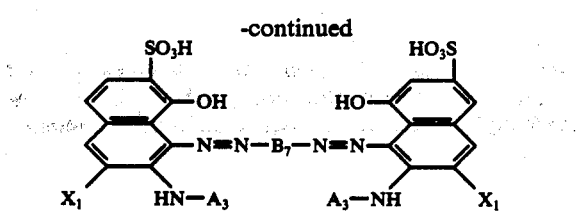

wherein $A_3$ denotes a hydrogen atom or a methyl, 2,6-dimethylphenyl or 2-methyl-4-chlorophenyl radical and $B_7$ denotes the radical

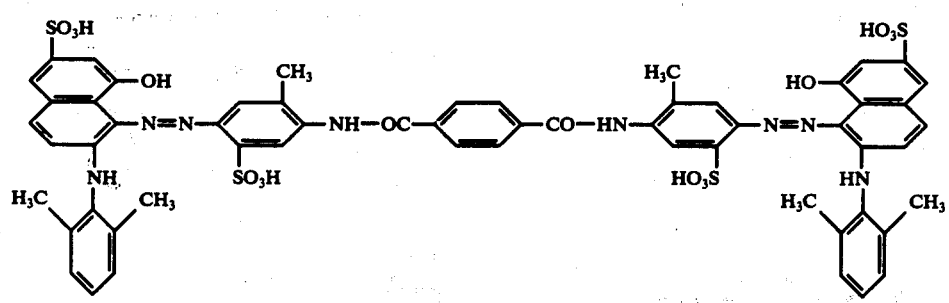

(XVI)

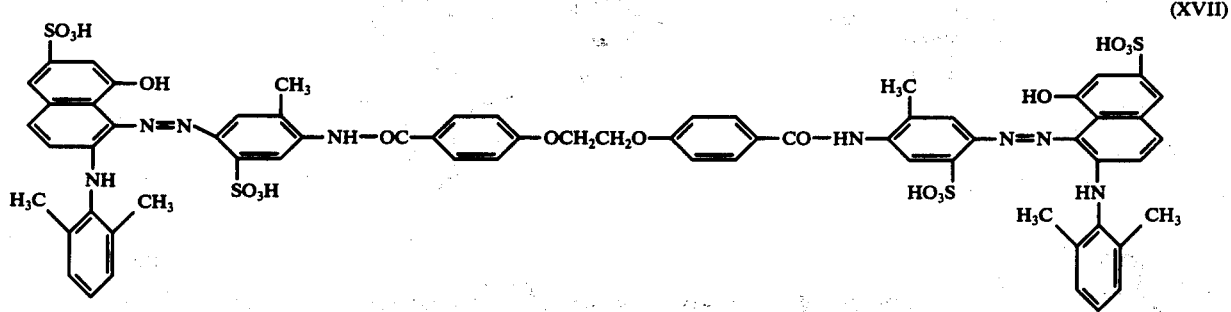

(XVII)

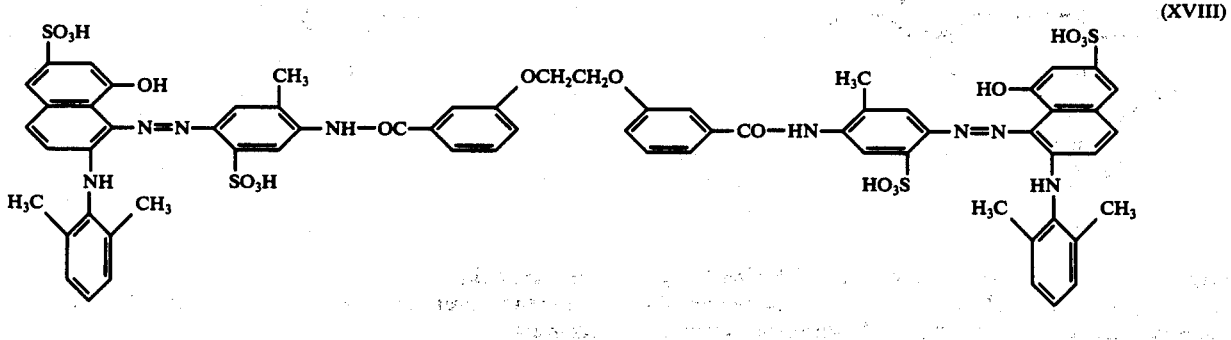

(XVIII)

Azo dyestuffs of the formula (XIX)

(XIX)

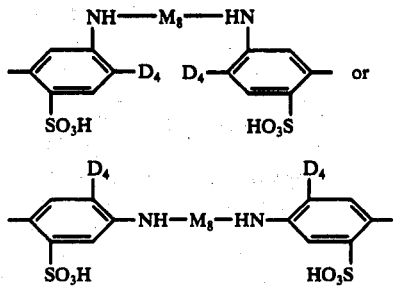

wherein $D_4$ represents a methyl, methoxy or methylmercapto group and $M_8$ represents a radical of an aromatic dicarboxylic acid of the formula $$HOOC-E_2-T_5-E_2-COOH$$

wherein $E_2$ denotes the benzene radical and $T_5$ denotes one of the radicals

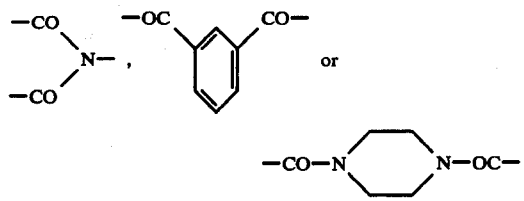

have proved particularly interesting.

The dyestuffs of the formulae (I) to (XIX) can not only, as indicated, be present in the form of their free acids, that is to say with HOOC— or HO₃S— groups, but also as salts. Depending on the conditions under which they are separated out, for example on the selected pH value or on the cation on which the salt used for separating out the dyestuff possesses, the acid groups can be present as —SO₃— or —COO—cation groups, such as, for example, —SO₃Na, —SO₃K, (—SO₃)₂Ca, —COONa, —COOLi and —COONH₄. Thus the salts are preferably salts of the alkaline earth metal group and especially of the alkali metal group.

The radicals of the formula

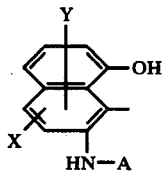

(XX)

in the formula (I) are derived, for example, from the following compounds: 2-amino-8-hydroxynaphthalene-5-sulphonic acid, 2-amino-8-hydroxynaphthalene-5-sulphonamide, 2-amino-8-hydroxynaphthalene-5,7-disulphonic acid, 2-amino-8-hydroxynaphthalene-5,7-disulphonamide, 2-amino-8-hydroxynaphthalene-3,6-disulphonic acid, 2-amino-8-hydroxynaphthalene-3,6-disulphonamide, 2-amino-8-hydroxynaphthalene-6-sulphonic acid, 2-amino-8-hydroxynaphthalene-6-sulphonamide and 2-amino-8-hydroxynaphthalene-7-sulphonic acid-5-sulphonamide, wherein the amino group can be substituted by an aliphatic or aromatic radical A, such as methyl, ethyl, butyl, hydroxyethyl, cyclohexyl, phenyl, 2,6-dimethylphenyl, 2,6-diethylphenyl, 2- or 3- or 4-chlorophenyl, 2,3- or 3,4- or 3,5-dichlorophenyl, 2- or 3- or 4-fluorophenyl, 4-bromophenyl, 2-methyl-4- or 2-methyl-5-chlorophenyl, 3-trifluoromethylphenyl, 2,6-dimethoxyphenyl, 2- or 4-phenylsulphonic acid, 2-methylphenyl-4-sulphonic acid, 4-chlorophenyl-3-sulphonic acid, 3- or 4-acetylphenyl, 3- or 4-methylsulphonylphenyl, 4-phenoxyphenyl-3-sulphonic acid, 4-phenyl-carboxylic acid, 4-phenyl-carboxylic acid N,N-dimethylamide, 4-phenyl-sulphonic acid N,N-diethylamide, 2,4,6-trimethylphenyl or 2,3,4,6-tetramethylphenyl.

The radicals of the formula

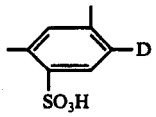

(XXI)

in the radical of the formula (I) are derived, for example, from the following compounds: 1-amino-3-nitro-4-chlorobenzene-6-sulphonic acid, 1-amino-3-acetylamino-4-bromobenzene-6-sulphonic acid, 1-amino-3-nitro-4-trifluoromethylbenzene-6-sulphonic acid, 1-amino-3-nitro-4-methylbenzene-6-sulphonic acid, 1-amino-3-nitro-4-methoxybenzene-6-sulphonic acid, 1-amino-3-nitro-4-ethoxybenzene-6-sulphonic acid, 1-amino-3-nitro-4-methylmercaptobenzene-6-sulphonic acid, 1-amino-3-acetylamino-4-ethylmercaptobenzene-6-sulphonic acid, 1-amino-3-nitro-4-hydroxyethylmercaptobenzene-6-sulphonic acid, 1-amino-3-nitro-4-carboxymethylmercaptobenzene-6-sulphonic acid, 1-amino-3-nitro-4-acetylaminobenzene-6-sulphonic acid, 1-amino-3-nitro-4-benzoylaminobenzene-6-sulphonic acid, 1-amino-3-acetylamino-4-fluorobenzene-6-sulphonic acid and 1-amino-3-nitro-4-(2'-methoxyethoxy)benzene-6-sulphonic acid.

The radicals of the formula

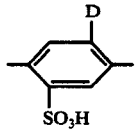

(XXIa)

in the radical B of the formula (I) are derived, for example, from the following compounds: 1-amino-4-nitro-5-fluorobenzene-2-sulphonic acid, 1-amino-4-nitro-5-chlorobenzene-2-sulphonic acid, 1-amino-4-acetylamino-5-bromobenzene-2-sulphonic acid, 1-amino-4-nitro-5-trifluoromethylbenzene-2-sulphonic acid, 1-amino-4-nitro-5-methylbenzene-2-sulphonic acid, 1-amino-4-nitro-5-n-hexylbenzene-2-sulphonic acid, 1-amino-4-nitro-5-(2'-hydroxyethyl)-benzene-2-sulphonic acid, 1-amino-4-nitro-5-methoxybenzene-2-sulphonic acid, 1-amino-4-nitro-5-ethoxybenzene-2-sulphonic acid, 1-amino-4-nitro-5-n-butoxybenzene-2-sulphonic acid, 1-amino-4-nitro-5(2'-hydroxyethoxy)-benzene-2-sulphonic acid, 1-amino-4-nitro-5-(2'-methoxyethoxy)-benzene-2-sulphonic acid, 1-amino-4-nitro-5-methylmercaptobenzene-2-sulphonic acid, 1-amino-4-acetylamino-5-ethylmercaptobenzene-2-sulphonic acid, 1-amino-4-nitro-5-hydroxyethylmercaptobenzene-2-sulphonic acid, 1-amino-4-nitro-5-carboxymethylmercaptobenzene-2-sulphonic acid, 1-amino-4-nitro-5-formylaminobenzene-2-sulphonic acid, 1-amino-4-nitro-5- acetylaminobenzene-2-sulphonic acid, 1-amino-4-nitro-5-benzoylaminobenzene-2-sulphonic acid, 1-amino-4-nitro-5-n-octylaminobenzene-2-sulphonic acid and 1-amino-4-acetylamino-5-methoxybenzene-2-sulphonic acid.

The bridge member M in the radical B of the formula (I) is derived, for example, from the following acid halides: phosgene, succinic acid dichloride, thiophosgene, glutaric acid dichloride, pimelic acid dichloride, 2,3-dichlorosuccinic acid dichloride, chlorosuccinic acid dichloride, fumaric acid dichloride, terephthaloyl bromide, terephthaloyl chloride, 2-nitro-terephthaloyl chloride, 2-chloro-terephthaloyl chloride, 2,5-dichloro-terephthaloyl chloride, isophthaloyl chloride, 5-nitroisophthaloyl chloride, 5-methylsulphonyl-isophthaloyl chloride, 5-sulpho-isophthaloyl chloride, 3,5-dichloroformyl-N,N-dimethyl-benzenesulphonamide, 3,5-dichloroformyl-N,N-dibutyl-benzensulphonamide, 3,5-dichloroformyl-N-octyl-benzenesulphonamide, 5-benzoylamino-isophthaloyl chloride, thiophene-2,5-dicarboxylic acid dichloride, furane-2,5-dicarboxylic acid dichloride, pyridine-2,5-dicarboxylic acid dichloride, pyridine-2,4-dicarboxylic acid dichloride, pyridine-2,6-dicarboxylic acid dichloride, pyridine-3,5-dicarboxylic acid dichloride, pyrrole-2,5-dicarboxylic acid dichloride, biphenyl-4,4'-dicarboxylic acid dichloride, diphenylurea-4,4'-dicarboxylic acid dichloride, diphenylurea-3,3'-dicarboxylic acid dichloride, diphenylketone-4,4'-dicarboxylic acid dichloride, diphenylketone-3,4'-dicarboxylic acid dichloride, diphenylketone-3,3'-dicarboxylic acid dichloride, diphenylsulphone-4,4'-dicarboxylic acid dichloride, diphenylsulphone-3,3'-dicarboxylic acid dichloride, diphenylsulphone-3,4'-dicarboxylic acid dichloride, 2'-nitrodiphenylsulphone-3,4'-dicarboxylic acid dichloride, benzene-1,3-disulphonic acid chloride, 4-chloroformyl-benzenesulphonyl chloride, diphenylmethane-4,4'-dicarboxylic acid dichloride, diphenylmethane-3,3'-dicarboxylic acid dichloride, diphenylsulphide-4,4'-dicarboxylic acid dichloride, diphenyldisulphide-2,2'-dicarboxylic acid dichloride, diphenylamine-4,4'-dicarboxylic acid dichloride, diphenylether-4,4'-dicarboxylic acid dichloride, 4,4'-dimethyl-azobenzene-3,3'-dicarboxylic acid dichloride, 4,4'-dichloro-azobenzene-3,3'dicarboxylic acid dichloride, 2,2'-dichloro-azobenzene- 5,5'-dicarboxylic acid dichloride, 2,2'-dimethyl-azobenzene-5,5'-dicarboxylic acid dichloride, 2,2'-dimethoxy-azobenzene-5,5'-dicarboxylic acid dichloride, azobenzene-3,3'-dicarboxylic acid dichloride, azobenzene-4,4'-dicarboxylic acid dichloride, azobenzene-3,4'-dicarboxylic acid dichloride, naphthalene-2,6-dicarboxylic acid dichloride, azobenzene-4,4'- and -3,3'-disulphonic acid dichloride, 2,2'-dimethylazobenzene-4,4'-dicarboxylic acid dichloride, 4-methoxyazobenzene-3,4'-dicarboxylic acid dichloride, 3,3'-dichloroazobenzene-4,4'-dicarboxylic acid dichloride, 4,4'-dichloroazobenzene-5,5'-dicarboxylic acid dichloride, 3,4-dimethyl-thiophene-2,5-dicarboxylic acid dichloride, 3,4-dimethoxythiophene-2,5-dicarboxylic acid dichloride, selenophene-2,4-dicarboxylic acid dichloride, 9-thiafluorene-2,6-dicarboxylic acid dichloride, pyrazole-3,5-dicarboxylic acid dichloride, 1,3-thiazole-2,5-dicarboxylic acid dichloride, benzobisthiazole-2,6-dicarboxylic acid dichloride, benzothizole-2,5-dicarboxylic acid dichloride, thiazolothiazole-2,5-dicarboxylic cid dichloride, benzoxazole-2,5-dicarboxylic acid dichloride, 1,3,4-thiadiazole-2,5-dicarboxylic acid dichloride, 1,3,4-oxadiazole-2,5-dicarboxylic acid dichloride, 1-methyl-1,2,4-triazole-3,5-dicarboxylic acid dichloride, pyrazine-2,5-dicarboxylic acid dichloride and 3,6-dimethylpyrazine-2,5-dicarboxylic acid dichloride.

It is furthermore also possible to use 4,6-dichloropyrimidine, 2-phenyl-4,6-dichloro-s-triazine, 2-methoxy-4,6-dichloro-s-triazine or cyanuric chloride.

The radicals of the formula —OC—Q—CO—, wherein Q represents the radical —E—T—E'—, are also derived, for example, from the following dicarboxylic acids:

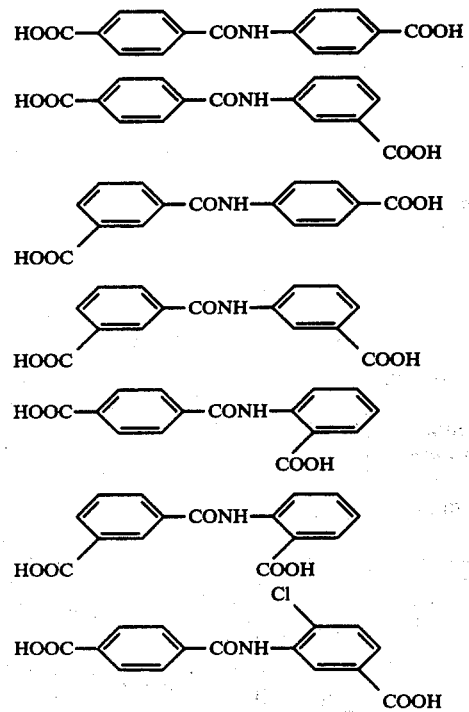

-continued
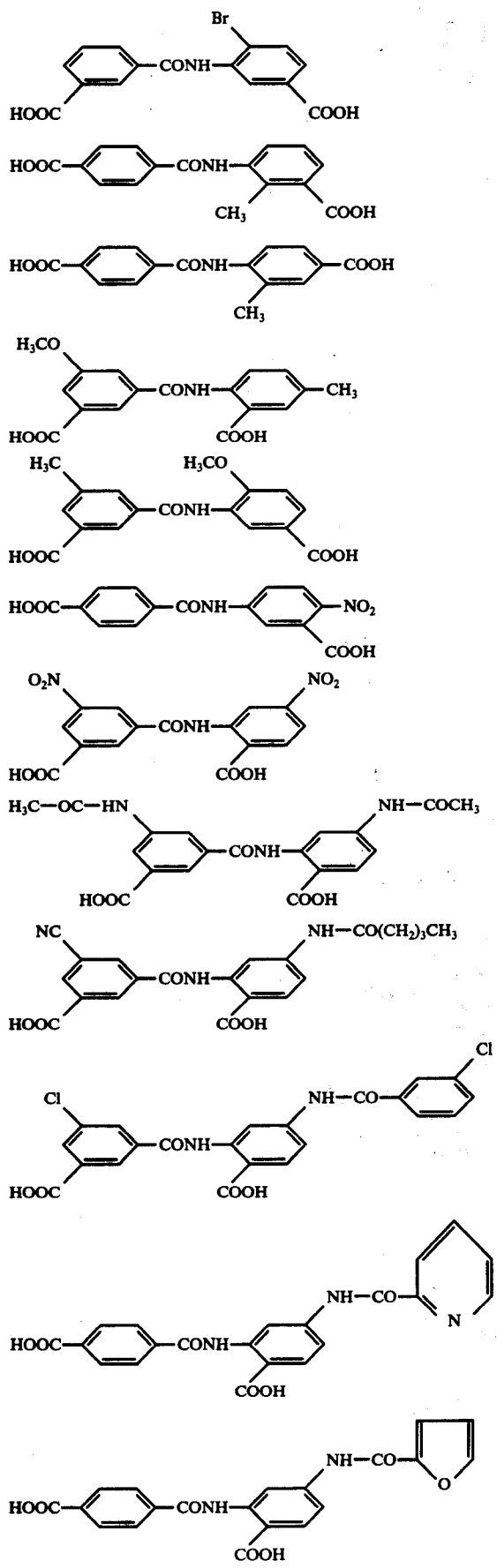

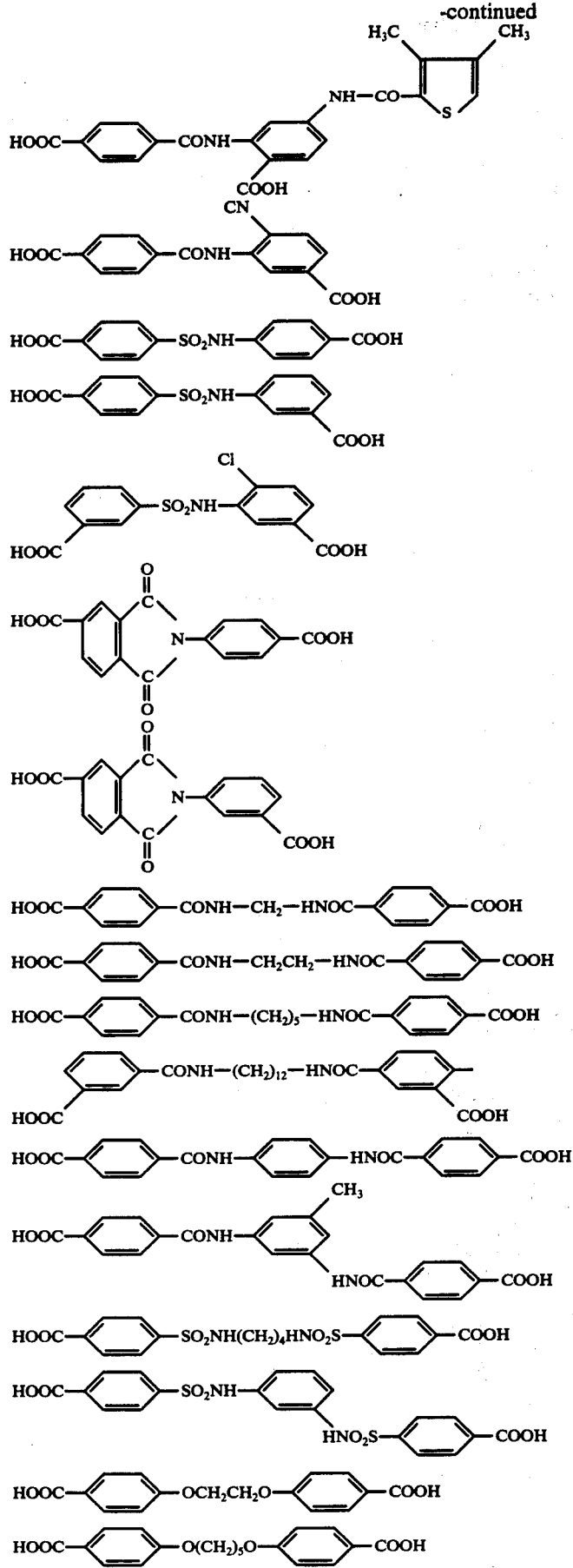

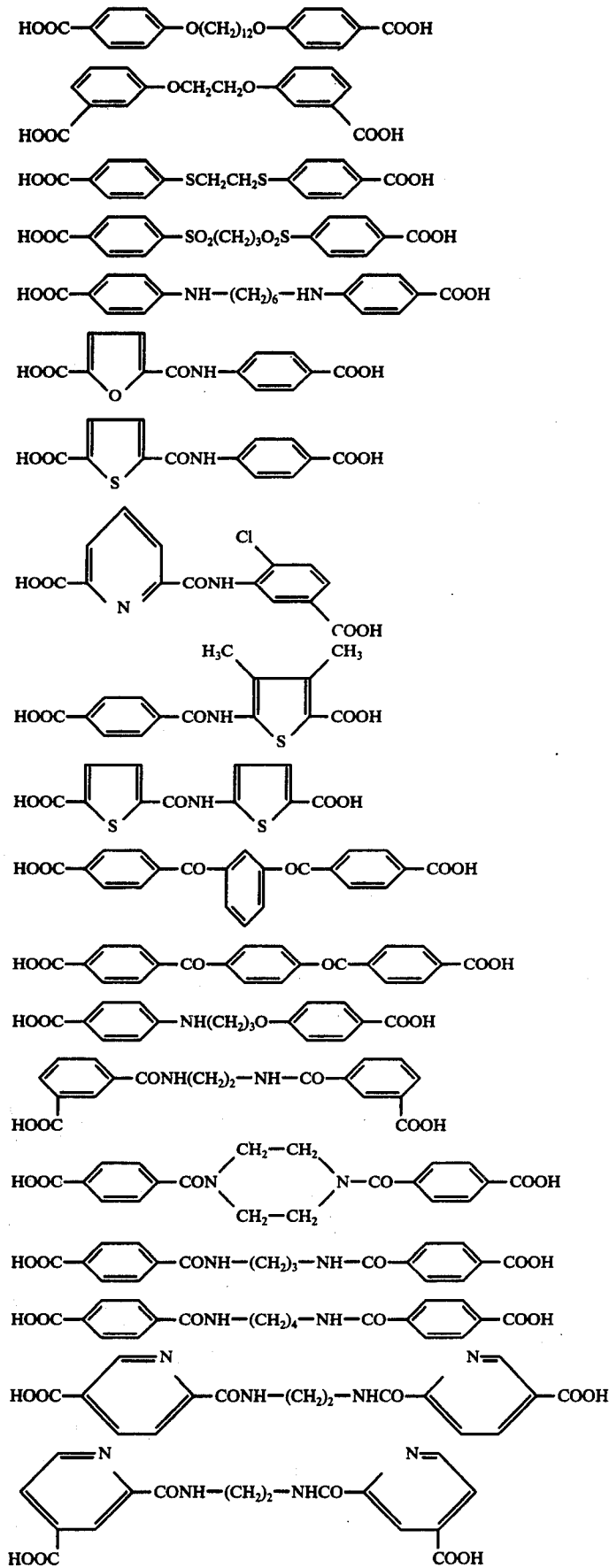

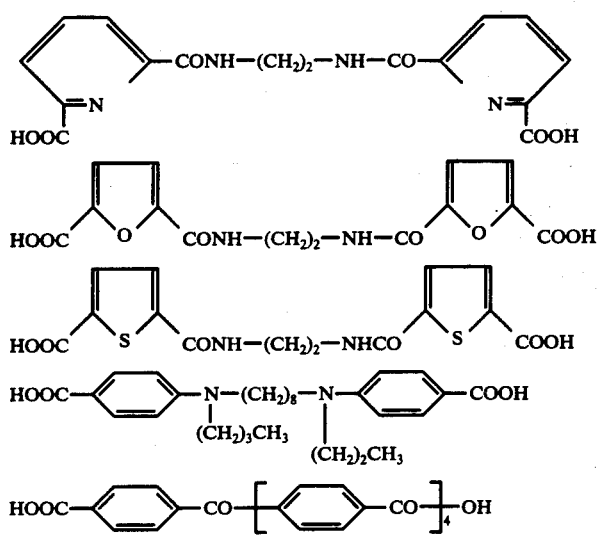

The manufacture of the azo dyestuffs of the formula (I) is carried out in accordance with methods which are in themselves known.

One process is characterised, for example, in that two equivalents of a compound of the formula

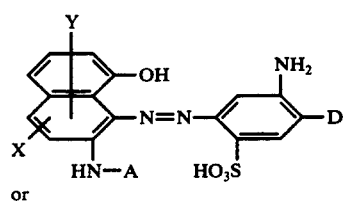
(XXII)

or

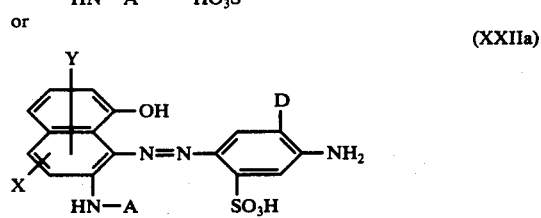
(XXIIa)

are reacted with a dihalide or dianhydride of an acid of the formula

wherein A, M, D, X and Y have the abovementioned meanings.

The starting compounds of the formulae (XXII) and (XXIIa) are obtained if an aniline of the formula

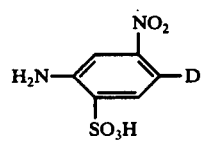
(XXIII)

or

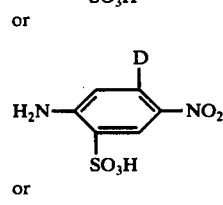
(XXIIIb)

or

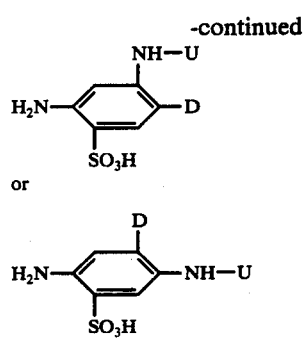
(XXIIIc)

wherein U denotes a protective group which can be split off, for example an acyl group, is diazotised and coupled with a compound of the formula

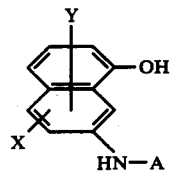
(XXIV)

After reduction of the nitro group, or splitting off of the protective group, an aminoazo dyestuff of the formula (XXII) or (XXIIa) is obtained.

It is also possible, before reducing the nitro group, to replace a halogen atom which may be present, and which is in the p-position to the azo bond, by an optionally substituted alkoxy or alkylmercapto radical and then to reduce the nitro group.

Another process for the manufacture of dyestuffs of the formula (I) is that 1 mol of a tetraazo compound of a diamine of the formula

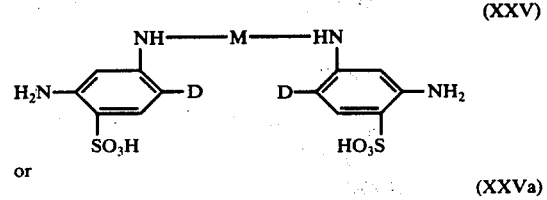
(XXV)

or (XXVa)

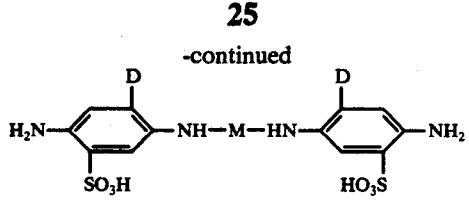

is reacted with 2 mols of an aminonaphthol of the formula (XXIV). In the formulae (XXV) and (XXVa), M and D have the meanings indicated earlier.

A further process for the manufacture of dyestuffs of formula (I) is characterised, for example, in that a diazo compound of one of the aminoazo dyestuffs of the formulae (XXVI)

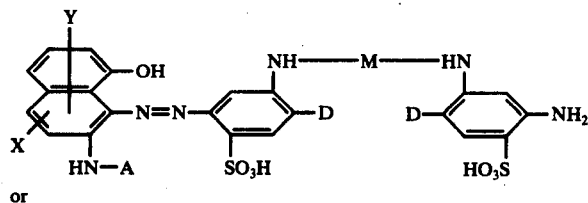

or (XXVIa)

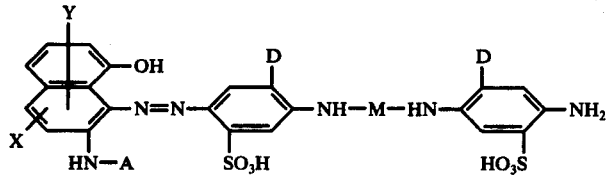

is reacted with an aminonaphthol of the formula (XXIV), wherein A, M, D, X and Y have the abovementioned meanings. The compounds of the formulae (XXVI) and (XXVIa) are obtained by diazotisation of a compound of the formula (XXVII)

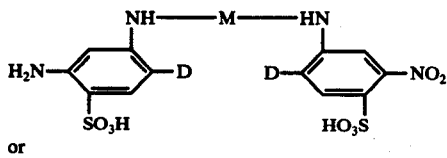

or (XXVIIa)

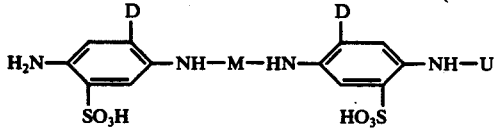

wherein D, M and U have the abovementioned meanings, and coupling of the diazo compounds with a compound of the formula (XXIV) with subsequent reduction of the nitro group or splitting off of the protective group U.

The condensation of amines with acid dichlorides is advantageously carried out in polar, protic or aprotic solvents such as water, methanol, glycol, diethylacetamide, dimethylformamide or N-methylpyrrolidone, pyridine, tetramethylurea, hexamethylphosphoric acid triamide or N-methyl-caprolactam or mixtures thereof.

It may also be advantageous to carry out the condensation in the presence of acid-binding agents such as, for example, alkali carbonates or alkali borates. Solvents such as pyridine themselves already act as acid-binding agents.

The dyestuffs of the formula (I) can be used for various purposes, but especially in photographic materials and in these particularly advantageously as image dyestuffs for a dye bleach process.

For this purpose, the following dye bleach processes may for example be used: diffusion transfer processes with photosensitive ferric salts according to German Pat. No. 1,422,917, metal bleach processes via photosensitive metal complexes according to Swiss Pat. No. 506,809, electrophotographic processes according to Swiss Pat. No. 431,277 or U.S. Pat. No. 3,172,826, dye bleach processes in the presence of stannite according to British patent specification No. 546,704, contact processes according to British patent specification No. 661,416 and other dye bleach processes, such as, for example, the dye bleach process with complex salts of the first series of transition metals. The dyestuffs of the formula (1) can be used with very particular advantages as image dyestuffs for the silver dye bleach process. In accordance therewith, valuable photographic materials which contain, on an emulsion carrier, at least one layer with a dyestuff of the formula (I), can be manufactured in the customary manner which is in itself known.

In particular, these dyestuffs may be present in a multi-layer material which contains, on an emulsion carrier, a layer dyed with a cyan dyestuff which is selectively sensitive to red, on top of this a layer dyed with a magenta dyestuff of the formula (I), which is selectively sensitive to green, and finally a layer dyed with a yellow dyestuff, which is sensitive to blue. However, it is also possible to incorporate the dyestuffs of the formula (I) in an auxiliary layer or in particular into a layer adjacent to the light-sensitive layer Furthermore the dyestuffs of the formula (I) can, for example, also be used for retouching purposes.

In most cases it suffices to add the dyestuffs to be used according to the invention, as a solution in water or in a water-miscible solvent, to an aqueous gelatine solution at normal or slightly elevated temperature, with good stirring. Thereafter the mixture is brought together with a gelatine containing silver halide and/or other materials for the production of photographic images and is cast on a base in the usual manner to give a layer and is dried if appropriate.

The dyestuff solution can also be directly added to a gelatine containing silver halide and/or other materials for the production of photographic images. Thus it is possible, for example, to add the dyestuff solution only immediately before casting.

Instead of simple stirring, the usual methods of distribution by means of kneading and/or shear forces or ultrasonics can also be employed.

It is also possible to add the dyestuff, not as a solution, but in the solid form or as a paste.

The casting solution can contain yet further additives such as curing agents, sequestering agents and wetting agents, as well as sensitisers and stabilisers for the silver halide.

The dyestuffs neither undergo chemical reactions with the light-sensitive materials nor interfere with the light-sensitivity of the materials. The dyestuffs of the formula (I) are at the same time very resistant to diffusion and also form stable, aqueous solutions, are insensitive to calcium ions and can easily be bleached white.

On being added to the casting solutions, the dyestuffs neither cause an increase in viscosity nor a significant change in viscosity on leaving the casting mixture to stand.

The spectral absorption in gelatine lies in a favourable range, so that the dyestuffs of the formula (I) can be combined with a suitable yellow and cyan dyestuff to give a triple dyestuff combination which displays grey shades which appear neutral to the eye over the entire density range.

The dyestuffs of the formula (I) are distinguished by particularly high fastness to light coupled with excellent bleachability, good resistance to diffusion and advantageous colour strength.

In the manufacturing instructions and examples which follow, percentages are percentages by weight. The wavelengths are given in mm.

MANUFACTURING EXAMPLES

EXAMPLE 1

1a.

A solution of 12.5 g of 1-amino-3-nitro-4-methylbenzene-6-sulphonic acid (ammonium salt) in 100 ml of water is mixed with 14 ml of 4 N sodium nitrite solution and the mixture is added dropwise to 100 ml of 2 N hydrochloric acid at 0°–5° C. The mixture is stirred for a further 30 minutes and excess nitrite is then destroyed with sulphamic acid. A neutral solution of 21 g of 2-[2',6'-dimethylphenylamino-] 8-hydroxynaphthalene-6-sulphonic acid and 400 ml of water is added to the diazo solution at 0° C. The reaction mixture is treated with sodium acetate until pH 3 is reached and is stirred overnight. The nitroazo dyestuff which has separated out is filtered off and treated, in 400 ml of water at 400° C, with a solution of 27 g of sodium sulphide in 60 ml of water added in portions, and the whole is stirred at 40° C until no further nitro compound is detectable in a thin layer chromatogram. The reaction mixture is cooled to 20° C, neutralised with glacial acetic acid and treated with 10 ml of 7 N potassium acetate solution. The precipitate which has separated out is filtered off, dissolved in 500 ml of water at 40° C and precipitated with 5 ml of 7 N potassium acetate solution. The product is filtered off, washed with ethanol and dried. Yield: 18 g of the aminoazo dyestuff of the formula (1.1)

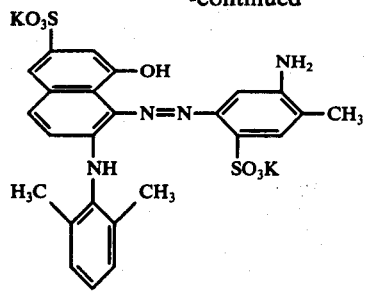

1b. 2.5 g of aminoazo dyestuff of the formula (1.1) are dissolved in 30 ml of water and 10 ml of dimethylformamide treated simultaneously, at icebath temperature, with a solution of 0.8 g of isophthalic acid dichloride in 5 ml of acetone and with 5 ml of 2 N sodium bicarbonate solution, and the whole is stirred overnight whilst allowing the temperature to rise to 20° C. After adding 0.3 g of isophthalic acid dichloride in 2 ml of acetone and 2 ml of 2 N sodium carbonate solution, the reaction mixture is stirred for a further 3 hours at 20° C and 20% strength potassium chloride solution is added. The dyestuff which has separated out is filtered off, dissolved in 50 ml of water and 5 ml of dimethylformamide and precipitated by adding 20% strength potassium chloride solution.

Yield: 1.1 g of chromatographically pure dyestuff of the formula (101) of the Table I.

EXAMPLE 2

2a.

13.5 g of 1-amino-3-nitro-4-chlorobenzene-6-sulphonic acid (as the ammonium salt) are diazotised in accordance with Example 1a) and coupled with 21 g of 2-[2',6'-dimethyl-phenylamino]-8-naphthol-6-sulphonic acid at pH 4. After stirring for 1 hour at 5° C, the coupling is complete. The nitroazo dyestuff is precipitated by adding 170 ml of 7 N potassium acetate solution.

Yield: 30 g of the dyestuff of the formula

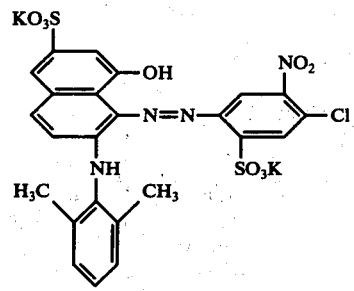

2b.

6.3 g of nitroazo dyestuff of the above formula are dissolved in 80 ml of water and 20 ml of ethanol at 30° C. 5.6 ml of 1.8 N potassium mercaptide solution in 95% strength ethanol are now added dropwise under a stream of nitrogen. The reaction mixture is stirred for a further 2 hours at 30° C and is treated with glacial acetic acid at pH 6.5 and then with 20 ml of 20% strength potassium chloride solution. The dyestuff which has separated out is filtered off and dried.

Yield: 6.5 g.

6.2 g of this dyestuff in 90 ml of water and 10 ml of ethanol at 40° C are treated with a solution of 4 g of sodium sulphide in 15 ml of water and the mixture is stirred for 20 hours at 40° C. The reaction mixture is neutralized with acetic acid and the dyestuff which has separated out is filtered off. Yield, 4.2 g of aminoazo dyestuff of the formula

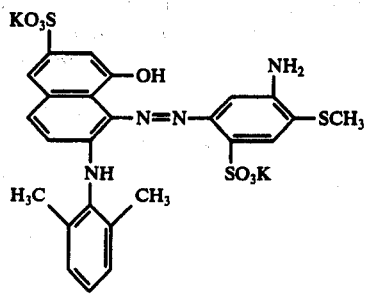

2c.

1.2 g of aminoazo dyestuff of the above formula are dissolved in 20 ml of water and 5 ml of dimethylformamide and a solution of 0.5 g of isophthalic acid dichloride in 4 ml of acetone is added at 50° C, at a pH of 6 obtained by adding 2 N sodium carbonate solution. After stirring for 3 hours, the dyestuff is salted out with potassium chloride solution and filtered off, redissolved in warm water and precipitated with acetone.

Yield: 0.2 g of the dyestuff of the formula (140) of Table I, which is pure according to thin layer chromatography.

EXAMPLE 3

3a.

A solution of 11.6 g of 1-amino-5-methyl-4-nitrobenzene-2-sulphonic acid in 100 ml of water is treated with 14 ml of 4 N sodium nitrite solution and added over the course of 80 minutes to 100 ml of 2 N hydrochloric acid at 0° to 5° C. The mixture is stirred for a further 30 minutes and the excess nitrite is destroyed with sulphamic acid.

The diazo solution is mixed, at 5° to 8° C and pH 3.5, with a solution of 18 g of 7-(2',6'-dimethylphenylamino)-1-hydroxynaphthalene-3-sulphonic acid and 10 g of crystalline sodium acetate in 200 ml of water and the mixture is stirred for a further 15 hours a 20° to 25° C. After filtration and drying, 21.7 g of the nitroazo dyestuff of the formula shown below are obtained in the form of a dark blue powder.

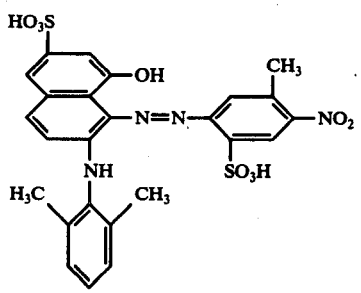

3b.

A solution of 5.8 g of the compound of the above formula and 20 ml of ferric chloride in 50 ml of water is treated at 40° C with a solution of 3.6 g of sodium sulphide in 8 ml of water and is treated at 40° C with 1 g of sodium sulphide added at intervals of 2 hours until no further nitro compound is detectable in the thin layer chromatogram. The mixture is cooled to 20° C, 25 ml of ethanol are added and the product is precipitated by adding 7 N potassium acetate solution. The yield of aminoazo dyestuff of the formula shown below is 4.3 g.

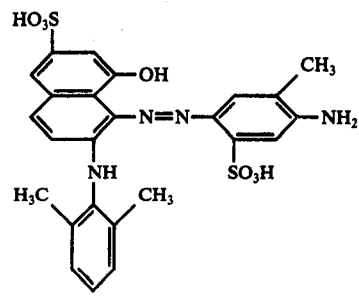

3c.

1.1 g of aminoazo dyestuff of the above formula are dissolved in 30 ml of N-methylpyrrolidone. Terephthaloyl chloride is then added in portions of 10 mg, at 23° C, until the starting product as reacted completely. The mixture is filtered and the dyestuff is precipitated from the filtrate by adding isopropanol and is purified by recipitation from water by means of a 1:1 mixture of isopropanol and dioxane. After filtering off and drying, 0.5 g of pure dyestuff of the formula (301) of Table III is obtained in the form of a dark red powder.

EXAMPLE 4

4a.

274 g of 3-amino-4-chloro-benzoic acid methyl ester in 4,000 ml of ether are treated dropwise with 120 g of p-toluoyl chloride whilst stirring and the mixture is stirred for 5 hours at room temperature. The ether is then largely distilled off and the residue is cooled to 10° C and filtered, whereupon 250 g of crude product are obtained.

This product is suspended in 1,000 ml of methanol and 300 ml of 35% strength hydrochloric acid are added at 65° C, immediately followed by 2,000 ml of ice water. The mixture is filtered and the product is washed with water until neutral and recrystallised from 5,000 ml of methanol.

Yield: 174 g of product of the formula

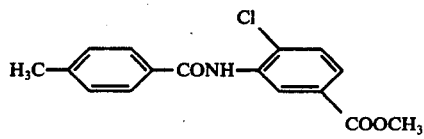

of melting point 147°.

4b.

54 g of the product thus obtained in 300 ml of methanol and 20 ml of 10 N sodium hydroxide solution are heated to the boil and 2,000 ml of water are then gradually added, whereupon a clear solution is produced. 50 ml of glacial acetic acid are then added and the crystals which have separated out are filtered off and recrystallised from methanol.

Yield: 45 g of product of the formula

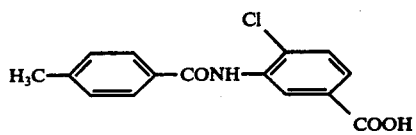

of melting point 233° C.

4c.

50 g of this product are suspended in 300 ml of water and a solution of 66 g of potassium permanganate and 25 g of MgSO$_4$.H$_2$O in 1,300 ml of water is added dropwise whilst stirring on a waterbath. The mixture is stirred until the potassium permanganate has been completely consumed (approx. 3 to 4 hours) the manganese dioxide formed is filtered off and rinsed with 400 ml of hot water, and the filtrate is rendered acid to Congo Red by means of 35% strength hydrochloric acid. The crystals which have been separated out are filtered off, washed with 300 ml of water and recrystallised from 120 of dimethylformamide.

Yield: 39 g of the formula

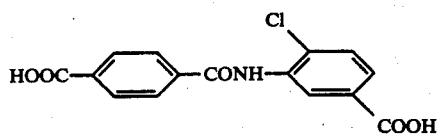

of melting point >300° C.

4d.

5.0 g of the dicarboxylic acid thus obtained in 75 ml of benzene are treated with 7.5 ml of thionyl chloride and the mixture is heated to the boil for 4 hours. A clear solution is produced, which is allowed to cool gradually. The crystals which have separated out are filtered off and successively washed with 30 ml of benzene and 30 ml of petroleum ether.

Yield: 3.9 g of the formula

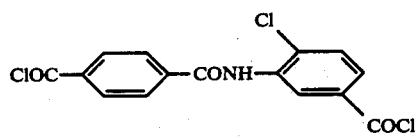

of melting point 172° C.

4e.

1.6 g of aminomonazo dyestuff of the formula

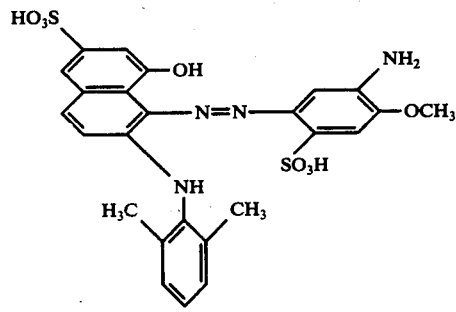

are dissolved in 75 ml of N-methylpyrrolidone and 2 ml of pyridine at 110° C and 1.5 g of the dicarboxylic acid dichloride obtained are gradually added at 100° to 110° C. After 15 minutes, the reaction mixture is diluted with 150 ml of isopropanol and the dyestuff which has separated out is filtered off, washed with 50 ml of ethanol and extracted with ethanol for 24 hours.

1.7 g of pure dyestuff of the formula (178) of Table I are obtained in the form of a red powder.

The dyestuff of the formula (212) of Table II and the dyestuff of the formula (327) of Table III are obtained analogously.

If an analogous procedure to (4a)–(4d) is followed, the dicarboxylic acid dichlorides of the formulae (1) to (6) listed below are obtained.

| No. | Dicarboxylic acid dichloride | Melting point |
|---|---|---|
| (1) | ClOC—⟨⟩—CONH—⟨⟩—COCl | *) |
| (2) | ClOC—⟨⟩—CONH—⟨⟩ with COCl | 109° |
| (3) | ⟨⟩—CONH—⟨⟩ with ClOC and COCl | 150° |
| (4) | ⟨⟩—CONH—⟨⟩ with Cl; ClOC and COCl | 123° |
| (5) | ClOC—⟨⟩—SO$_2$NH—⟨⟩—COCl | 108° |
| (6) | ClOC—⟨phthalimide⟩—N—⟨⟩—COCl | 191° |

*) not isolated (further converted, in solution, to the dyestuff

EXAMPLE 5

5a.

15.2 g of 4-hydroxybenzoic acid methyl ester and 7.0 g of potassium carbonate are dissolved in 25 ml of cyclohexanone and 9.4 g of ethylene bromide are added over the course of 5 minutes in a nitrogen atmosphere, whilst stirring. The reaction mixture is stirred under nitrogen for 36 hours at 85° C and is then poured into 200 ml of methanol, 30 ml of water are added at 60° C and the solution is filtered whilst still hot, whereupon 8.7 g of product of the formula

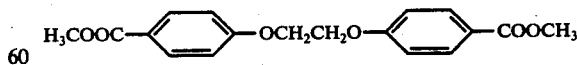

crystallise out from the filtrate in the form of a white powder of melting point 164° C (decomposition).

5b.

34.0 g of the ester of the above formula are stirred in 170 ml of 30% strength potassium hydroxide solution for 72 hours at 85° to 90° C. The mixture is poured onto 400 ml of water, the whole is heated to the boil and filtered after addition of a little Fuller's earth, and after acidification with 35% strength hydrochloric acid 28.1 g of product of the formula

are obtained in the form of a white powder of melting point >300° C.

5c.

If an analogous procedure to (4d) is followed, 28.0 g of acid of the above formula yield 25.1 g of acid chloride of the formula (7), melting point 128° C, in the form of fine, white needles.

5d.

Analogously to (4e), the acid chloride of the formula (7) yields the dyestuffs of the formulae (181) to (183) and (196) to (198) of Table I, the dyestuffs of the formulae (330) to (332), (344), (345) and (349) of Table III and the dyestuffs of the formulae (405) and (406) of Table IV.

If an analogous procedure to (5a)–(5c) is followed, the acid chlorides of the formulae (8) to (10) listed below, are obtained.

are obtained in the form of colourless crystals of melting point 307° C.

6b.

48.0 g of ester of the above formula are suspended in a mixture of 540 ml of water, 146 ml of 2 N sodium hydroxide solution and 270 ml of ethanol and the mixture is stirred for 20 minutes under reflux, whereby a clear solution is produced. The reaction mixture is then added to 2,300 ml of 0.7 N sulphuric acid. The precipitate which has separated out is filtered off and washed by suspending it twice in 600 ml of ice-water at a time.

43.0 g of product of the formula

are obtained in the form of white crystals of melting point >300° C.

6c.

3.6 g of dicarboxylic acid of the above formula are suspended in 50 ml of benzene. 0.4 ml of dimethylformamide and 10 ml of thionyl chloride are added and the whole is heated to the boil and stirred until the evolution of gas has ceased. The reaction mixture is filtered hot and 25 ml of petroleum ether (boiling point 35° to 75° C) are added. After completion of crystallisation, the crystals are rapidly filtered off, washed with petroleum ether and dried in vacuo over phosphorus pentoxide.

3.5 g of acid chloride of the formula (11) are obtained

| No. | Dicarboxylic acid dichloride | Melting point |
|---|---|---|
| (7) | ClOC—⟨C₆H₄⟩—OCH₂CH₂O—⟨C₆H₄⟩—COCl | 128° |
| (8) | ClOC—⟨C₆H₄⟩—O(CH₂)₅O—⟨C₆H₄⟩—COCl | 100° |
| (9) | ClOC—⟨C₆H₄⟩—CO—⟨C₆H₄⟩—OC—⟨C₆H₄⟩—COCl | 132° |
| (10) | ClOC—⟨C₆H₄⟩—CO—⟨C₆H₄⟩—OC—⟨C₆H₄⟩—COCl | *) |

*) not isolated (further converted in solution to the dyestuff).

EXAMPLE 6

6a.

41.0 g of terephthalic acid monomethyl ester monochloride are dissolved in 300 ml of acetone at 5° to 10° C. After adding 17.0 g of solid sodium bicarbonate, a solution of 6.8 ml of ethylenediamine in 50 ml of acetone is added dropwise. The mixture is stirred for 2 hours at 5° C, 3 hours at 20° C and a further hour at the reflux temperature. After cooling, the reaction mixture is introduced into 1,200 ml of ice water. The precipitate is filtered off, washed with ice water and then dried and recrystallised from 350 ml of dimethylformamide and 300 ml of n-butanol. 24.7 g of product of the formula in the form of white needles of melting point 150° C.

6d.

If an analogous procedure to (4e) is followed, the acid chloride of the formula (11) yields the dyestuffs of the formulae (184) and (185) of Table I, the dyestuff of the formula (215) of Table II, the dyestuffs of the formulae (328), (329) and (348) of Table III and the dyestuff of the formula (407) of Table IV. The remaining dyestuffs of Tables I to IV are also obtained analogously.

If an analogous procedure to (6a)–(6c) is followed, the acid chlorides of the formulae (12) to (19) listed below are obtained.

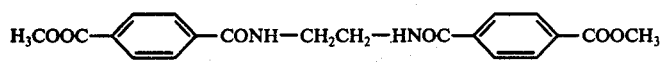

| No. | Dicarboxylic acid dichloride | Melting point |
|---|---|---|
| (11) | ClOC—⟨C₆H₄⟩—CONH—(CH₂)₂—HNOC—⟨C₆H₄⟩—COCl | 150° |
| (12) | ClOC—⟨C₆H₄⟩—CONH—(CH₂)₃—HNOC—⟨C₆H₄⟩—COCl | 42° |
| (13) | ClOC—⟨C₆H₄⟩—CONH—(CH₂)₄—HNOC—⟨C₆H₄⟩—COCl | 182° |
| (14) | ClOC—⟨pyridine⟩—CONH—(CH₂)₂—HNOC—⟨pyridine⟩—COCl | 180° |
| (15) | ClOC—⟨pyridine⟩—CONH—(CH₂)₂—HNOC—⟨pyridine⟩—COCl | 155° |
| (16) | ClOC—⟨C₆H₄⟩—CONH—(CH₂)₂—HNOC—⟨C₆H₄⟩—COCl (meta) | 180° |
| (17) | ClOC—⟨thiophene⟩—CONH—(CH₂)₂—HNOC—⟨thiophene⟩—COCl | 120° |
| (18) | ClOC—⟨furan⟩—CONH—(CH₂)₂—HNOC—⟨furan⟩—COCl | 218° |
| (19) | ClOC—⟨C₆H₄⟩—CON(CH₂CH₂)₂NOC—⟨C₆H₄⟩—COCl (piperazine) | 242° |

Table I

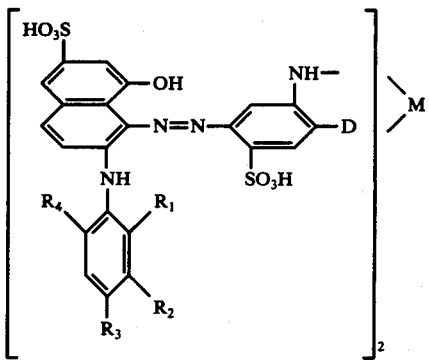

| No. | $R_1$ | $R_2$ | $R_3$ | $R_4$ | D | M | λmax. in DMF-H₂O (1:1) | λmax. in Gelatine |
|---|---|---|---|---|---|---|---|---|
| 101 | $CH_3$ | H | H | $CH_3$ | $CH_3$ | 1,3-OC—C₆H₄—CO | 524 + 542 | 528 + 550 |
| 102 | $CH_3$ | H | H | $CH_3$ | $CH_3$ | 1,4-OC—C₆H₄—CO | 520 + 542 | 530 + 550 |
| 103 | $CH_3$ | H | H | $CH_3$ | $CH_3$ | CO | 520 + 540 | 524 + 548 |

Table I-continued

| No. | $R_1$ | $R_2$ | $R_3$ | $R_4$ | D | M | λmax. in: DMF-$H_2O$ (1:1) | λmax. in: Gelatine |
|---|---|---|---|---|---|---|---|---|
| 104 | $CH_3$ | H | H | $CH_3$ | $CH_3$ | 5-nitro-1,3-benzenedicarbonyl | 522 + 540 | 526 + 548 |
| 105 | $CH_3$ | H | H | $CH_3$ | $CH_3$ | 5-($SO_2CH_3$)-1,3-benzenedicarbonyl | 520 + 542 | 526 + 560 |
| 106 | $CH_3$ | H | H | $CH_3$ | $CH_3$ | 5-($SO_2N(CH_3)_2$)-1,3-benzenedicarbonyl | 520 + 542 | 524 + 550 |
| 107 | $CH_3$ | H | H | $CH_3$ | $CH_3$ | 5-($SO_2N(C_4H_5)_2$)-1,3-benzenedicarbonyl | 522 + 542 | 523 + 546 |
| 108 | $CH_3$ | H | H | $CH_3$ | $CH_3$ | 5-($SO_2NH(CH_2)_7CH_3$)-1,3-benzenedicarbonyl | 520 + 541 | 527 + 550 |
| 109 | $CH_3$ | H | H | $CH_3$ | $CH_3$ | 5-(NHCO-phenyl)-1,3-benzenedicarbonyl | 518 + 540 | 527 + 550 |
| 110 | $CH_3$ | H | H | $CH_3$ | $CH_3$ | 2,6-pyridinedicarbonyl | 522 + 541 | 528 + 551 |
| 111 | $CH_3$ | H | H | $CH_3$ | $CH_3$ | 3,5-pyridinedicarbonyl | 520 + 541 | 526 + 550 |

Table I-continued

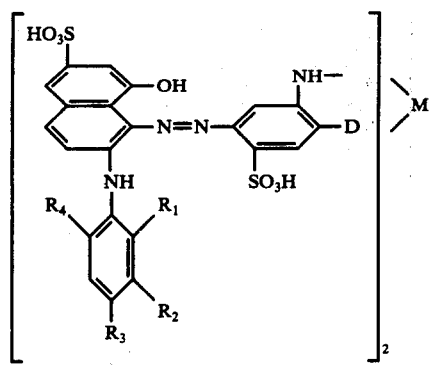

| No. | R₁ | R₂ | R₃ | R₄ | D | M | λmax in DMF-H₂O (1:1) | λmax in Gelatine |
|---|---|---|---|---|---|---|---|---|
| 112 | CH₃ | H | H | CH₃ | CH₃ | 2,4-pyridinedicarbonyl | 521 + 541 | 530 + 550 |
| 113 | CH₃ | H | H | CH₃ | CH₃ | 2,5-pyridinedicarbonyl | 520 + 542 | 530 + 556 |
| 114 | CH₃ | H | H | CH₃ | CH₃ | 2,5-furandicarbonyl | 522 + 542 | 530 + 550 |
| 115 | CH₃ | H | H | CH₃ | CH₃ | 2,5-thiophenedicarbonyl | 522 + 542 | 526 + 560 |
| 116 | CH₃ | H | H | CH₃ | CH₃ | OC-C₆H₄-CO-C₆H₄-CO | 521 + 540 | 527 + 546 |
| 117 | CH₃ | H | H | CH₃ | CH₃ | OC-C₆H₄-CO-C₆H₄-CO | 522 + 541 | 526 + 546 |
| 118 | CH₃ | H | H | CH₃ | CH₃ | OC-C₆H₄-CH₂-C₆H₄-CO | 522 + 540 | 526 + 542 |
| 119 | CH₃ | H | H | CH₃ | CH₃ | OC-C₆H₄-C₆H₄-CO | 521 + 541 | 530 + 551 |
| 120 | CH₃ | H | H | CH₃ | CH₃ | 2,6-naphthalenedicarbonyl | 522 + 541 | 530 + 548 |
| 121 | CH₃ | H | H | CH₃ | CH₃ | OC-C₆H₄-NH-CO-NH-C₆H₄-CO | 520 + 541 | 528 + 546 |
| 122 | CH₃ | H | H | CH₃ | CH₃ | OC-C₆H₄-SO₂-C₆H₄-CO (m,m') | 520 + 540 | 526 + 550 |
| 123 | CH₃ | H | H | CH₃ | CH₃ | OC-C₆H₄-SO₂-C₆H₄-CO (p,p') | 521 + 540 | 525 + 545 |
| 124 | CH₃ | H | H | CH₃ | CH₃ | OC-C₆H₄-N=N-C₆H₄-CO | 522 + 542 | 530 + 550 |

Table I-continued

| No. | $R_1$ | $R_2$ | $R_3$ | $R_4$ | D | M | λmax. in DMF-$H_2O$ (1:1) | λmax. in Gelatine |
|---|---|---|---|---|---|---|---|---|
| 125 | H | Cl | H | H | $CH_3$ | OC-C₆H₄-CO (para) | 537 | 530 + 560 |
| 126 | H | Cl | H | H | $CH_3$ | OC-C₆H₄-CO (meta) | 537 | 522 + 560 |
| 127 | H | Cl | H | H | $CH_3$ | OC-(thiophene-2,5)-CO | 536 | 528 + 560 |
| 128 | H | Cl | H | H | $CH_3$ | OC-(pyridine-2,6)-CO, CS | 539 | 540 + 560 |
| 129 | $CH_3$ | H | Cl | H | $CH_3$ | | 526 + 546 | 534 + 560 |
| 130 | $CH_3$ | H | Cl | H | $CH_3$ | OC-C₆H₄-CO (para) | 522 + 540 | 520 + 560 |
| 131 | $CH_3$ | H | Cl | H | $CH_3$ | OC-C₆H₄-CO (meta) | 523 + 540 | 523 + 560 |
| 132 | $CH_3$ | H | Cl | H | $CH_3$ | OC-(thiophene-2,5)-CO | 523 + 542 | 530 + 553 |
| 133 | $CH_3$ | H | Cl | H | $CH_3$ | OC-(pyridine-2,5)-CO | 522 + 542 | 534 + 562 |
| 134 | $CH_3$ | H | Cl | H | $CH_3$ | OC-(pyridine-2,6)-CO | 522 + 540 | 520 + 560 |
| 135 | $CH_3$ | H | Cl | H | $CH_3$ | OC-(naphthalene-2,6)-CO | 524 + 542 | 528 + 550 |
| 136 | $CH_3$ | H | Cl | H | $CH_3$ | OC-C₆H₄-N=N-C₆H₄-CO | 522 + 524 | 527 + 560 |

Table I-continued

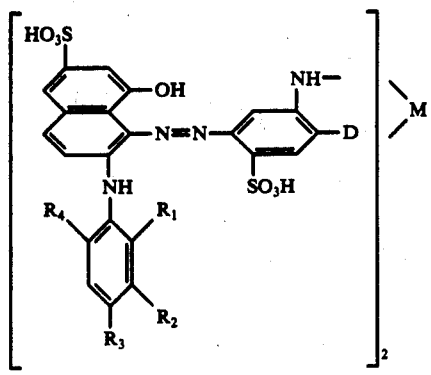

| No. | $R_1$ | $R_2$ | $R_3$ | $R_4$ | D | M | λmax. in DMF-H₂O (1:1) | λmax. in Gelatine |
|---|---|---|---|---|---|---|---|---|
| 137 | $CH_3$ | H | H | $CH_3$ | Cl | OC—(pyridine-3,5-diyl)—CO | 530 + 558 | 540 + 565 |
| 138 | $CH_3$ | H | H | $CH_3$ | Cl | OC—(1,3-phenylene)—CO | 528 + 550 | 536 + 556 |
| 139 | $CH_3$ | H | H | $CH_3$ | Br | OC—C₆H₄—SO₂—C₆H₄—CO | 526 + 550 | 536 + 564 |
| 140 | $CH_3$ | H | H | $CH_3$ | $SCH_3$ | OC—(1,3-phenylene)—CO | 534 + 560 | 536 + 566 |
| 141 | $CH_3$ | H | H | $CH_3$ | $SCH_3$ | OC—(1,4-phenylene)—CO | 536 + 563 | 542 + 574 |
| 142 | $CH_3$ | H | H | $CH_3$ | $SCH_3$ | OC—C₆H₄—CO—C₆H₄—CO | 533 + 559 | 537 + 567 |
| 143 | $CH_3$ | H | H | $CH_3$ | $OCH_3$ | CO | 518 + 542 | 526 + 550 |
| 144 | $CH_3$ | H | H | $CH_3$ | $OCH_3$ | OC—(1,3-phenylene)—CO | 522 + 547 | 530 + 555 |
| 145 | $CH_3$ | H | H | $CH_3$ | $OCH_3$ | OC—(1,4-phenylene)—CO | 522 + 547 | 532 + 564 |
| 146 | $CH_3$ | H | H | $CH_3$ | $OCH_3$ | OC—(5-nitro-1,3-phenylene)—CO | 522 + 548 | 533 + 564 |
| 147 | $CH_3$ | H | H | $CH_3$ | $OCH_3$ | OC—(5-benzamido-1,3-phenylene)—CO | 522 + 547 | 532 + 557 |
| 148 | $CH_3$ | H | H | $CH_3$ | $OCH_3$ | OC—(pyridine-2,6-diyl)—CO | 524 + 551 | 532 + 562 |

Table I-continued

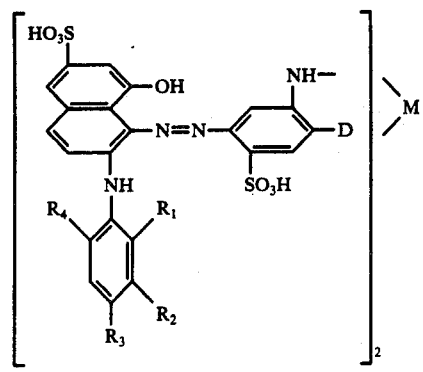

| No. | R₁ | R₂ | R₃ | R₄ | D | M | λmax. in DMF-H₂O (1:1) | λmax. in Gelatine |
|---|---|---|---|---|---|---|---|---|
| 149 | $CH_3$ | H | H | $CH_3$ | $OCH_3$ | 2,6-pyridinedicarbonyl (3,5-substituted) | 522 + 547 | 530 + 559 |
| 150 | $CH_3$ | H | H | $CH_3$ | $OCH_3$ | 2,4-pyridinedicarbonyl | 521 + 547 | 524 + 557 |
| 151 | $CH_3$ | H | H | $CH_3$ | $OCH_3$ | 2,5-pyridinedicarbonyl | 523 + 549 | 534 + 566 |
| 152 | $CH_3$ | H | H | $CH_3$ | $OCH_3$ | 2,5-furandicarbonyl | 524 + 549 | 532 + 561 |
| 153 | $CH_3$ | H | H | $CH_3$ | $OCH_3$ | 2,5-thiophenedicarbonyl | 522 + 548 | 534 + 562 |
| 154 | $CH_3$ | H | H | $CH_3$ | $OCH_3$ | OC—C₆H₄—CO—C₆H₃(CH₃)—CO | 521 + 547 | 530 + 557 |
| 155 | $CH_3$ | H | H | $CH_3$ | $OCH_3$ | OC—C₆H₄—CO—C₆H₄—CO—C₆H₄—CO | 523 + 548 | 532 + 562 |
| 156 | $CH_3$ | H | H | $CH_3$ | $OCH_3$ | OC—C₆H₄—CO—C₆H₄—CO (meta) | 521 + 547 | 539 + 554 |
| 157 | $CH_3$ | H | H | $CH_3$ | $OCH_3$ | OC—C₆H₄—C₆H₄—CO (biphenyl) | 521 + 547 | 530 + 560 |
| 158 | $CH_3$ | H | H | $CH_3$ | $OCH_3$ | 2,6-naphthalenedicarbonyl | 521 + 547 | 533 + 563 |
| 159 | $CH_3$ | H | H | $CH_3$ | $OCH_3$ | OC—C₆H₄—NHCONH—C₆H₄—CO (meta) | 522 + 548 | 530 + 557 |
| 160 | $CH_3$ | H | H | $CH_3$ | $OCH_3$ | OC—C₆H₄—NHCONH—C₆H₄—CO (para) | 522 + 548 | 532 + 565 |
| 161 | $CH_3$ | H | H | $CH_3$ | $OCH_3$ | OC—C₆H₄—SO₂—C₆H₄—CO | 522 + 548 | 530 + 561 |

Table I-continued

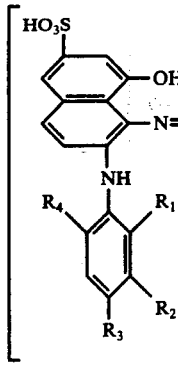

| No. | R₁ | R₂ | R₃ | R₄ | D | M | λmax. in: DMF-H₂O (1:1) | Gelatine |
|---|---|---|---|---|---|---|---|---|
| 162 | $CH_3$ | H | H | $CH_3$ | $OCH_3$ | OC—C₆H₄—SO₂—C₆H₄—CO | 521 + 547 | 530 + 557 |
| 163 | $CH_3$ | H | H | $CH_3$ | $OCH_3$ | OC—C₆H₄(SO₂)—C₆H₄—CO | 521 + 546 | 529 + 557 |
| 164 | $CH_3$ | H | H | $CH_3$ | $OCH_3$ | OC—C₆H₄—N=N—C₆H₄—CO | 522 + 548 | 532 + 560 |
| 165 | $CH_3$ | H | Cl | H | $OCH_3$ | OC—C₆H₄—CO (para) | 522 + 546 | 533 + 571 |
| 166 | $CH_3$ | H | Cl | H | $OCH_3$ | OC—C₆H₄—CO (meta) | 524 + 547 | 532 + 560 |
| 167 | $CH_3$ | H | Cl | H | $OCH_3$ | pyridine-2,4-dicarbonyl | 524 + 546 | 533 + 566 |
| 168 | $CH_3$ | H | Cl | H | $OCH_3$ | pyridine-2,5-dicarbonyl | 524 + 548 | 536 + 571 |
| 169 | $CH_3$ | H | Cl | H | $OCH_3$ | pyridine-3,5-dicarbonyl | 523 + 547 | 536 + 565 |
| 170 | $CH_3$ | H | H | $CH_3$ | $OCH_3$ | pyrazole-3,5-dicarbonyl | 520 + 546 | 532 + 562 |
| 171 | $CH_3$ | H | H | $CH_3$ | $OCH_3$ | 3,6-dimethylpyrazine-2,5-dicarbonyl | 522 + 548 | 536 + 567 |

Table I-continued

[Structure: naphthalene with HO₃S, OH, NH, linked by N=N to benzene ring with NH—M, D, SO₃H; NH connected to phenyl with R₁, R₂, R₃, R₄ substituents; bracketed ]₂ with M]

| No. | R₁ | R₂ | R₃ | R₄ | D | M | λmax in DMF-H₂O (1:1) | λmax in Gelatine |
|-----|-----|-----|-----|-----|-----|-----|-----|-----|
| 172 | CH₃ | H | H | CH₃ | CH₃ | pyrazine (3,6-dimethyl) dicarbonyl | 520 + 541 | 534 + 565 |
| 173 | CH₃ | H | H | CH₃ | OCH₃ | pyrazine-2,5-dicarbonyl | 524 + 550 | 536 + 568 |
| 174 | CH₃ | H | H | CH₃ | CH₃ | bis(methylthio)-diimino-dicarbonyl | 520 + 542 | 539 + 568 |
| 175 | CH₃ | H | H | CH₃ | OCH₃ | bis(methylthio)-diimino-dicarbonyl | 523 + 550 | 538 + 565 |
| 176 | CH₃ | H | H | CH₃ | OCH₃ | OC—C₆H₄—CONH—C₆H₄—CO (m,m) | 526 + 552 | 540 + 574 |
| 177 | CH₃ | H | H | CH₃ | OCH₃ | OC—C₆H₄—CONH—C₆H₄—CO (p,m) | 521 + 547 | 536 + 565 |
| 178 | CH₃ | H | H | CH₃ | OCH₃ | OC—C₆H₄—CONH—C₆H₃(Cl)—CO | 521 + 547 | 536 + 568 |
| 179 | CH₃ | H | H | CH₃ | OCH₃ | OC—C₆H₄—CONH—C₆H₄—CO | 521 + 547 | 527 + 552 |
| 180 | CH₃ | H | H | CH₃ | OCH₃ | OC—C₆H₄—SO₂NH—C₆H₄—CO | 522 + 547 | 530 + 557 |
| 181 | CH₃ | H | H | CH₃ | OCH₃ | OC—C₆H₄—OCH₂CH₂O—C₆H₄—CO | 521 + 546 | 534 + 568 |
| 182 | CH₃ | H | H | CH₃ | CH₃ | OC—C₆H₄—OCH₂CH₂O—C₆H₄—CO | 520 + 540 | 524 + 553 |
| 183 | CH₃ | H | Cl | H | OCH₃ | OC—C₆H₄—OCH₂CH₂O—C₆H₄—CO | 523 + 546 | 533 + 567 |

Table I-continued

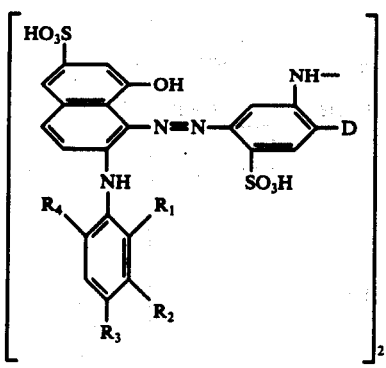

|  |  |  |  |  |  |  | λmax. in: DMF-H₂O (1:1) | Gelatine |
|---|---|---|---|---|---|---|---|---|
| No. | R₁ | R₂ | R₃ | R₄ | D | M | | |
| 184 | CH₃ | H | H | CH₃ | OCH₃ | [structure: two p-C₆H₄-CO- groups linked via -CO-NH-CH₂CH₂-NH-CO-] | 521 + 547 | 533 + 569 |
| 185 | CH₃ | H | H | CH₃ | CH₃ | [structure: two p-C₆H₄-CO- groups linked via -CO-NH-CH₂CH₂-NH-CO-] | 520 + 541 | 530 + 561 |
| 186 | CH₃ | H | H | CH₃ | OCH₃ | OC—C₆H₄—O(CH₂)₅O—C₆H₄—CO | 521 + 547 | 530 + 566 |
| 187 | CH₃ | H | H | CH₃ | OCH₃ | [structure: two p-C₆H₄-CO- groups linked via piperazine (N—CO and CO—N)] | 532 + 547 | 528 + 556 |
| 188 | CH₃ | H | H | CH₃ | OCH₃ | [structure: two p-C₆H₄-CO- groups linked via -CO-NH-(CH₂)₃-NH-CO-] | 522 + 547 | 526 + 558 |
| 189 | CH₃ | H | H | CH₃ | OCH₃ | [structure: two p-C₆H₄-CO- groups linked via -CO-NH-(CH₂)₃-NH-CO-] | 522 + 547 | 532 + 568 |

Table I-continued

| No. | $R_1$ | $R_2$ | $R_3$ | $R_4$ | D | M | λmax. in DMF-$H_2O$ (1:1) | λmax. in Gelatine |
|---|---|---|---|---|---|---|---|---|
| 190 | $CH_3$ | H | H | $CH_3$ | $OCH_3$ | bis(pyridine-CO-)CONH-$CH_2CH_2$-HNOC | 522 + 547 | 537 + 575 |
| 191 | $CH_3$ | H | H | $CH_3$ | $OCH_3$ | bis(pyridine-CO-O-)CONHCH$_2$CH$_2$-HNOC | 522 + 548 | 537 + 566 |
| 192 | $CH_3$ | H | H | $CH_3$ | $OCH_3$ | bis(phenyl-CO-)CONH-$CH_2CH_2$-HNOC | 523 + 548 | 528 + 558 |
| 193 | $CH_3$ | H | H | $CH_3$ | $OCH_3$ | bis(thiophene-CO-)NH-$CH_2CH_2$NH | 521 + 548 | 532 + 568 |
| 194 | $CH_3$ | H | H | $CH_3$ | $OCH_3$ | bis(furan-CO-)NH-$CH_2CH_2$NH | 522 + 548 | 526 + 554 |
| 195 | $CH_3$ | H | H | $CH_3$ | $OCH_3$ | OC-C$_6$H$_4$-O-C$_6$H$_4$-CO | 521 + 546 | 534 + 560 |
| 196 | H | H | F | H | $OCH_3$ | bis(phenyl-CO-)OCH$_2$CH$_2$O | 528 + 548 | 546 + 583 |

Table I-continued

[Structure: naphthalene with HO₃S, OH, NH groups, azo linkage to benzene ring with NH-, D, SO₃H substituents; NH connects to phenyl ring with R₁, R₂, R₃, R₄]—M, bracketed subscript 2

| No. | R₁ | R₂ | R₃ | R₄ | D | M | λmax. in: DMF-H₂O (1:1) | λmax. in: Gelatine |
|---|---|---|---|---|---|---|---|---|
| 197 | H | H | Cl | H | OCH₃ | OC-C₆H₄-OCH₂CH₂O-C₆H₄-CO | 530 + 549 | 545 + 581 |
| 198 | H | COCH₃ | H | H | OCH₃ | (OC-C₆H₄-OCH₂CH₂O-)₂ bis linker | 534 + 550 | 550 + 589 |

TABLE II

[Structure: naphthalene with HO₃S, OH, NH-A groups, azo linkage to benzene ring with NH-, D, SO₃H substituents]—M, bracketed subscript 2

| No. | A | D | M | λmax. in: DMF-H₂O (1:1) | λmax. in: Gelatine |
|---|---|---|---|---|---|
| 201 | H | CH₃ | OC-C₆H₄-CO | 510 | 513 |
| 202 | H | CH₃ | OC-C₆H₄-NHCOHN-C₆H₄-CO | 510 | 516 + 544 |
| 203 | H | SCH₃ | OC-C₆H₄-SO₂-C₆H₄-CO | 525 + 550 | 529 + 560 |
| 204 | H | OCH₃ | OC-C₆H₄-SO₂-C₆H₄-CO | 512 + 534 | 518 + 542 |
| 205 | H | OCH₃ | OC-C₆H₄-SO₂-C₆H₄-CO | 512 + 532 | 520 + 549 |
| 206 | CH₃ | OCH₃ | OC-C₆H₄-SO₂-C₆H₄-CO | 525 + 552 | 536 + 577 |
| 207 | CH₃ | OCH₃ | OC-naphthalene-CO | 527 + 554 | 538 + 574 |

TABLE II-continued $$\left[ \begin{array}{c} \text{structure with } HO_3S, OH, NH-, N=N, D, SO_3H, NH, A \end{array} \right]_2 M$$

| No. | A | D | M | λmax. in DMF-H$_2$O (1:1) | Gelatine |
|---|---|---|---|---|---|
| 208 | CH$_3$ | OCH$_3$ | OC—⟨⟩—SO$_2$—⟨⟩—CO | 526 + 556 | 535 + 570 |
| 209 | CH$_3$ | OCH$_3$ | pyridine-2,4-diyl dicarbonyl (OC—pyridine—CO) | 526 + 552 | 545 + 588 |
| 210 | H | OCH$_3$ | OC—⟨⟩—CO (1,3-phenylene) | 512 + 536 | 518 + 542 |
| 211 | CH$_3$ | OCH$_3$ | OC—C(=N—...S—CH$_3$)... C—CO | 528 + 555 | 531 + 581 |
| 212 | H | SCH$_3$ | OC—⟨⟩—CONH—⟨Cl⟩—CO | 525 + 550 | 530 + 562 |
| 213 | CH$_3$ | OCH$_3$ | OC—⟨⟩—O(CH$_2$)$_5$O—⟨⟩—CO | 526 + 552 | 537 + 575 |
| 214 | CH$_3$ | CH$_3$ | OC—⟨⟩—CO.O—⟨⟩—O.CO—⟨⟩—CO | 525 + 552 | 551 + 594 |
| 215 | H | SCH$_3$ | OC—⟨⟩—CONH—CH$_2$CH$_2$—HNOC—⟨⟩—CO | 525 + 550 | 543 + 578 |

Table III

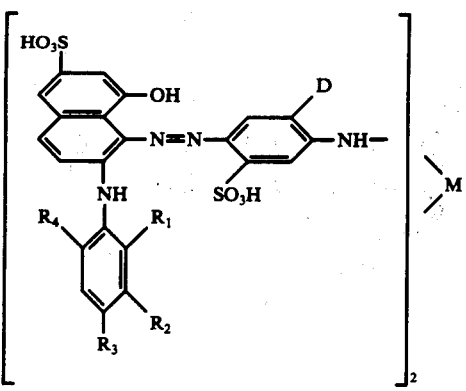

| No. | $R_1$ | $R_2$ | $R_3$ | $R_4$ | D | M | λmax. in: DMF-H₂O (1:1) | Gelatine |
|-----|-------|-------|-------|-------|---|---|------------------------|----------|
| 301 | CH₃ | H | H | CH₃ | CH₃ | OC—C₆H₄—CO (para) | 527 + 547 | 537 + 567 |
| 302 | CH₃ | H | H | CH₃ | CH₃ | benzene-1,2,4-tricarbonyl (CO)₃ | 538 + 565 | 544 + 576 |
| 303 | CH₃ | H | H | CH₃ | CH₃ | OC—C₆H₄—CO (meta) | 526 + 546 | 533 + 557 |
| 304 | CH₃ | H | H | CH₃ | CH₃ | OC—(thiophene-2,5-diyl)—CO | 526 + 548 | 541 + 571 |
| 305 | CH₃ | H | H | CH₃ | CH₃ | OC—(furan-2,5-diyl)—CO | 527 + 548 | 540 + 560 |
| 306 | CH₃ | H | H | CH₃ | CH₃ | OC—(pyridine-2,4-diyl)—CO | 528 + 549 | 539 + 570 |
| 307 | CH₃ | H | H | CH₃ | CH₃ | OC—(pyridine-2,5-diyl)—CO | 534 + 551 | 549 + 572 |
| 308 | CH₃ | H | H | CH₃ | CH₃ | OC—(pyridine-2,6-diyl)—CO | 530 + 545 | 535 + 556 |
| 309 | CH₃ | H | H | CH₃ | CH₃ | OC—(pyridine-3,5-diyl)—CO | 528 + 545 | 536 + 556 |
| 310 | CH₃ | H | H | CH₃ | CH₃ | OC—(naphthalene-2,6-diyl)—CO | 527 + 547 | 550 + 576 |
| 311 | CH₃ | H | H | CH₃ | CH₃ | CH(C₆H₄-4-CO)₃ | 530 + 545 | 538 + 556 |
| 312 | CH₃ | H | H | CH₃ | CH₃ | SO₂(C₆H₄-4-CO)₂ | 520 + 546 | 547 |

Table III-continued

| No. | $R_1$ | $R_2$ | $R_3$ | $R_4$ | D | M | λmax. in DMF-H$_2$O (1:1) | λmax. in Gelatine |
|---|---|---|---|---|---|---|---|---|
| 313 | CH$_3$ | H | H | CH$_3$ | OCH$_3$ | OC—C$_6$H$_4$—CO (para) | 540 + 566 | 558 + 596 |
| 314 | CH$_3$ | H | H | CH$_3$ | OCH$_3$ | OC—C$_6$H$_4$—CO (meta) | 537 + 563 | 545 + 577 |
| 315 | CH$_3$ | H | H | CH$_3$ | OCH$_3$ | OC—(thiophene-2,5-diyl)—CO | 541 + 568 | 516 + 606 |
| 316 | CH$_3$ | H | H | CH$_3$ | OCH$_3$ | OC—(pyridine-2,4-diyl)—CO | 539 + 568 | 549 + 587 |
| 317 | CH$_3$ | H | H | CH$_3$ | OCH$_3$ | OC—(pyridine-2,6-diyl)—CO | 538 + 563 | 544 + 582 |
| 318 | CH$_3$ | H | H | CH$_3$ | OCH$_3$ | OC—(naphthalene-2,6-diyl)—CO | 539 + 565 | 558 + 598 |
| 319 | CH$_3$ | H | H | CH$_3$ | Cl | OC—C$_6$H$_4$—CO (para) | 535 + 560 | 551 + 585 |
| 320 | CH$_3$ | H | H | CH$_3$ | Cl | OC—(pyridine-2,6-diyl)—CO | 536 + 560 | 546 + 580 |
| 321 | CH$_3$ | H | Cl | H | CH$_3$ | OC—C$_6$H$_4$—CO (para) | 532 + 546 | 552 + 577 |
| 322 | CH$_3$ | H | H | CH$_3$ | CF$_3$ | OC—C$_6$H$_4$—CO (para) | 530 + 554 | 567 |
| 323 | CH$_3$ | H | H | CH$_3$ | Cl | OC—C$_6$H$_4$—CO (meta) | 534 + 557 | 542 + 566 |
| 324 | CH$_3$ | H | H | CH$_3$ | Cl | OC—(furan-2,5-diyl)—CO | 536 + 560 | 544 + 571 |
| 325 | CH$_3$ | H | H | CH$_3$ | CH$_3$ | OC—C$_6$H$_4$—CONH—C$_6$H$_4$—CO | 527 + 545 | 535 + 559 |

Table III-continued

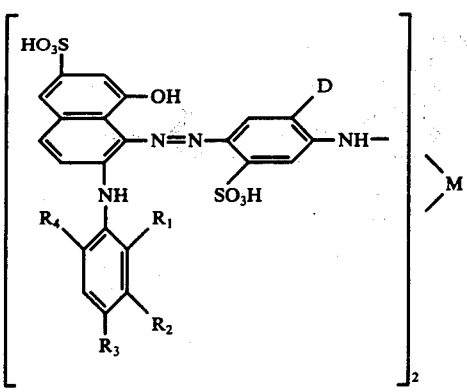

| No. | $R_1$ | $R_2$ | $R_3$ | $R_4$ | D | M | λmax. in DMF-H₂O (1:1) | Gelatine |
|---|---|---|---|---|---|---|---|---|
| 326 | CH₃ | H | H | CH₃ | OCH₃ | OC—⟨⟩—CONH—⟨⟩—CO | 537 + 562 | 550 + 586 |
| 327 | CH₃ | H | H | CH₃ | CH₃ | OC—⟨⟩—CONH—⟨Cl⟩—CO | 526 + 545 | 537 + 556 |
| 328 | CH₃ | H | H | CH₃ | CH₃ | (bis-benzamide structure) CONH—CH₂CH₂—HNOC | 525 + 547 | 539 + 569 |
| 329 | CH₃ | H | H | CH₃ | OCH₃ | (bis-benzamide structure) CONH—CH₂CH₂—HNOC | 536 + 560 | 558 + 600 |
| 330 | CH₃ | H | H | CH₃ | CH₃ | OC—⟨⟩—OCH₂CH₂O—⟨⟩—CO | 528 + 542 | 544 + 574 |
| 331 | CH₃ | H | H | CH₃ | OCH₃ | OC—⟨⟩—OCH₂CH₂O—⟨⟩—CO | 535 + 589 | 549 + 591 |
| 332 | CH₃ | H | Cl | H | CH₃ | OC—⟨⟩—OCH₂CH₂O—⟨⟩—CO | 528 + 536 | 548 + 577 |
| 333 | CH₃ | H | H | CH₃ | CH₃ | (pyrazole-dicarbonyl) | 526 + 549 | 537 + 562 |
| 334 | CH₃ | H | Cl | H | CH₃ | (pyrazole-dicarbonyl) | 529 + 548 | 534 + 566 |
| 335 | CH₃ | H | H | CH₃ | OCH₃ | (pyrazole-dicarbonyl) | 540 + 566 | 5 6 + 588 |
| 336 | CH₃ | H | H | CH₃ | CH₃ | OC—⟨⟩—OCH₂CH₂O—⟨⟩—CO | 528 + 545 | 530 + 560 |
| 337 | CH₃ | H | H | CH₃ | CF₃ | OC—⟨⟩—CO | 528 + 553 | 540 + 569 |

Table III-continued

| No. | R₁ | R₂ | R₃ | R₄ | D | M | λmax. in: DMF-H₂O (1:1) | λmax. in: Gelatine |
|---|---|---|---|---|---|---|---|---|
| 338 | CH₃ | H | H | CH₃ | CF₃ | (pyrazine with H₃C, CO, CH₃, OC substituents) | 536 + 562 | 548 + 578 |
| 339 | CH₃ | H | H | CH₃ | OCH₃ | OC—C₆H₄—CON(piperazine)NOC—C₆H₄—CO | 536 + 561 | 542 + 580 |
| 340 | CH₃ | H | H | CH₃ | CH₃ | OC—C₆H₄—CON(piperazine)NOC—C₆H₄—CO | 526 + 546 | 528 + 555 |
| 341 | CH₃ | H | H | CH₃ | Cl | OC—(thiophene-2,5-diyl)—CO | 536 + 560 | 558 + 593 |
| 342 | CH₃ | H | H | CH₃ | CH₃ | OC—C₆H₄—O—C₆H₄—CO | 526 + 544 | 534 + 554 |
| 343 | CH₃ | H | H | CH₃ | F | OC—C₆H₄—CO | 532 + 553 | 542 + 564 |
| 344 | CH₃ | H | H | CH₃ | F | OC—C₆H₄—OCH₂CH₂O—C₆H₄—CO | 534 + 556 | 550 + 585 |
| 345 | CH₃ | H | H | CH₃ | Cl | OC—C₆H₄—OCH₂CH₂O—C₆H₄—CO | 534 + 554 | 546 + 583 |
| 346 | CH₃ | H | H | CH₃ | NHCO—C₆H₅ | OC—C₆H₄—CO | 534 + 555 | 540 + 567 |
| 347 | CH₃ | H | H | CH₃ | NHCO—C₆H₅ | OC—(pyridine-3,5-diyl)—CO | 532 + 554 | 540 + 560 |
| 348 | CH₃ | H | H | CH₃ | NHCO—C₆H₅ | CO—C₆H₄—CONH—CH₂CH₂—HNOC—C₆H₄—CO | 532 + 552 | 540 + 560 |

Table III-continued

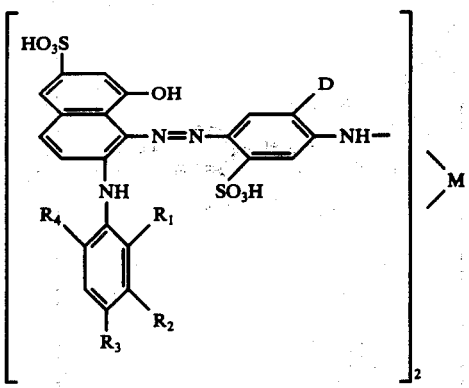

| No. | R₁ | R₂ | R₃ | R₄ | D | M | λmax. in: DMF-H₂O (1:1) | Gelatine |
|---|---|---|---|---|---|---|---|---|
| 349 | $CH_3$ | H | H | $CH_3$ | NHCO—C₆H₅ | OC—C₆H₄—OCH₂CH₂O—C₆H₄—CO | 532 + 552 | 546 + 563 |

TABLE IV

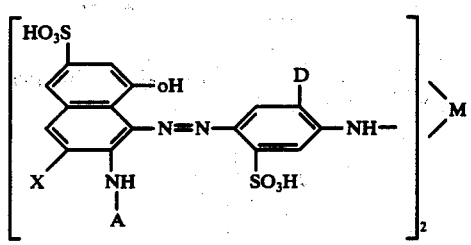

| No. | A | D | X | M | DMF-H₂O (1:1) | Gelatine |
|---|---|---|---|---|---|---|
| 401 | H | $OCH_3$ | H | OC—C₆H₄—CO | 524 + 542 | 532 + 558 |
| 402 | H | $OCH_3$ | H | OC—C₆H₄—CO—C₆H₄—CO | 524 + 538 | 534 + 559 |
| 403 | H | $OCH_3$ | H | OC—C₆H₄—SO₂—C₆H₄—CO | 526 + 550 | 537 + 578 |
| 404 | H | $OCH_3$ | H | OC—C₆H₄—NHCOHN—C₆H₄—CO | 523 + 546 | 536 + 574 |
| 405 | $CH_3$ | $CH_3$ | H | OC—C₆H₄—OCH₂CH₂O—C₆H₄—CO | 533 + 552 | 526 + 562 |
| 406 | H | $CH_3$ | H | OC—C₆H₄—OCH₂CH₂O—C₆H₄—CO | 516 + 536 | 520 + 542 |
| 407 | H | $OCH_3$ | H | OC—C₆H₄—CONH—CH₂CH₂—HNOC—C₆H₄—CO | 525 + 547 | 543 + 581 |

TABLE IV-continued

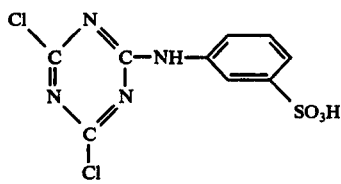

| No. | A | D | X | M | max. in: DMF-H₂O (1:1) | Gelatine |
|-----|---|---|---|---|------------------------|----------|
| 408 | H | NH-CO-C₆H₅ | SO₃H | OC-C₆H₄-CO | 523 +540 | 530 +550 |

USE EXAMPLES

EXAMPLE 1

3.3 ml of 6% strength gelatine solution, 2.0 ml of 1% strength aqueous solution of the hardener of the formula

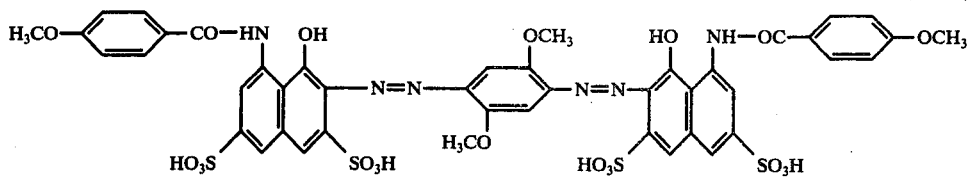

0.8 ml of $5 \times 10^{-3}$ molar aqueous solution of the magenta dyestuff of the formula (101) or (301) and 3.3 ml of silver bromide emulsion containing 35 g of silver per liter are pipetted into a test tube and made up to 10.0 ml with deionised water. This solution is vigorously mixed and kept in a waterbath at 40° C for 5 minutes.

The casting solution, at 40° C, is cast on a substrated glass plate of size 13 cm × 18 cm. After setting at 10° C, the plate is dried in a drying cabinet by means of circulating air at 32° C.

A strip cut to size 3.5 cm × 18 cm is exposed under a step wedge, through a Kodak 2b + 49 blue filter, with 50 Lux/cm² for 3 seconds. Thereafter it is further processed as follows:

1. 10 minutes' developing in a bath which per liter contains 1 g of p-methylaminophenol sulphate, 20 g of anhydrous sodium sulphite, 4 g of hydroquinone, 10 g of anhydrous sodium carbonate and 2 g of potassium bromide;
2. 2 minutes' soaking;
3. 6 minutes' stop-fixing in a bath which per liter contains 200 g of crystalline sodium thiosulphate, 15 g of anhydrous sodium sulphite, 25 g of crystalline sodium acetate and 13 ml of glacial acetic acid;
4. 8 minutes' soaking;
5. 20 minutes' dye-bleaching in a bath which per liter contains 27.5 ml of 96% strength sulphuric acid, 10 g of potassium iodide and 15 ml of a solution of 0.3 g of 2,3-dimethyl-6-aminoquinoxaline in 50 ml of ethanol;
6. 4 minutes' soaking;
7. 8 minutes' residual silver bleaching in a bath which per liter contains 50 g of potassium ferricyanide, 15 g of potassium bromide, 10 g of disodium phosphate and 14 g of monosodium phosphate;
8. 6 minutes' soaking;
9. 6 minutes' fixing as indicated under (3);
10. 10 minutes' soaking.

A brilliant, light-fast magenta wedge is obtained which is completely bleached to white in the position of what was originally the greatest silver density.

Similar results are obtained on using one of the remaining dyestuffs of Tables I to IV.

EXAMPLE 2

The following layers are successively applied to an opaque white acetate film provided with an adhesive layer:

1. Red-sensitive silver bromide emulsion in gelatine, containing the cyan dyestuff of the formula 2. Colourless gelatine layer without silver halide.
3. Green-sensitive silver bromide emulsion in gelatine, which contains the magenta dyestuff of the formula (182), (205) or (306).
4. Blue-sensitive silver bromide emulsion in gelatine, which contains the yellow dyestuff of the formula

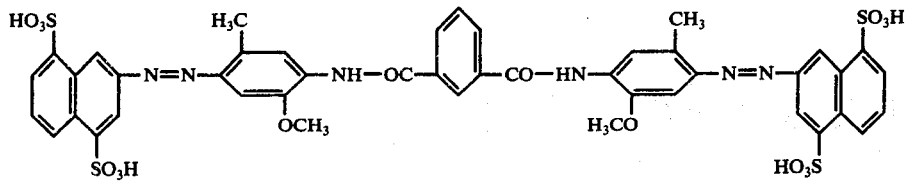

The gelatine layers can additionally contain additives such as wetting agents, hardeners and stabilisers for the silver halide. In other respects the procedure followed is such that the individual layers contain, per square meter of film, 0.5 g of the particular dyestuff and the amount of silver bromide corresponding to 1–1.2 g of silver.

This film is exposed, under a coloured diapositive, with red, green and blue copying light. Thereafter the copy is developed in accordance with the instruction indicated in Example 1.

A light-fast, document-quality positive direct-viewing image is obtained.

Similar results are obtained if instead of the indicated dyestuff another dyestuff of Tables I to IV is used.

EXAMPLE 3

3.3 ml of 6% strength gelatine solution, 2.0 ml of 1% strength aqueous solution of the hardener of the formula indicated in Example 1, 3.3 ml of silver bromide emulsion contain- 35 g of silver per liter and 1.4 ml of deionised water are pipetted into a test tube.

The whole is thoroughly mixed and kept at 40° C in a waterbath for 5 minutes.

The casting solution at 40° C is cast on a substrated glass plate of size 13 cm × 18 cm. After setting at 10° C, the plate is dried in a drying cabinet by means of circulating air at 32° C.

A mixture of 3.3 ml of 6% strength gelatine solution, 2.0 ml of 1% strength aqueous solution of the hardener of the formula indicated in Example 1, 0.5 ml of $5 \times 10^{-3}$ molar aqueous solution of the magenta dyestuff of the formula (151) or (308) and 4.2 ml of deionised water is then cast onto the dried layer at 40° C.

The coating is allowed to solidify and dry as indicated above.

A strip cut to size 3.5 cm × 18 cm is exposed for 10 seconds with 50 Lux/cm² under a step wedge through a Kodak 2b + 49 blue filter.

Thereafter the procedure described in Example 1 is followed.

A brilliant, very light-fast magenta wedge is obtained which is completely bleached to white in the area of what was originally the greatest silver density.

Similar results are obtained if instead of the indicated dyestuff another dyestuff of Tables I to IV is used.

EXAMPLE 4

A test strip manufactured in accordance with Example 1 using the magenta dyestuff of the formula (161) or (336), and exposed in accordance with Example 1, is processed as follows:

1. 5 minutes' developing in a bath which per liter contains 1 g of p-methylaminophenol sulphate, 20 g of anhydrous sodium carbonate, 2 g of potassium bromide and 3 g of sodium thiocyanate;
2. 2 minutes' soaking;
3. 2 minutes' treatment in a reversal bath which contains, per liter, 5 g of potassium bichromat and 5 ml of 96% strength sulfuric acid;
4. 4 minutes' soaking;
5. 5 minutes' treatment in a bath which per liter contains 50 g of anhydrous sodium sulphite;
6. 3 minutes' soaking;
7. 4 minutes' developing in a bath which per liter contains 2 g of 1-phenyl-3-pyrazolidone, 50 g of anhydrous sodium sulphite, 10 g of hydroquinone, 50 g of anhydrous sodium carbonate, 2 g of sodium hexametaphosphate and 20 ml of a 1% strength aqueous solution of tert.-butylaminoborane;
8. 2 minutes' soaking;
9. Further processing as indicated in Example 1 under (5) to (10).

A brilliant, highly light-fast magenta wedge converse to the original is obtained.

Similar results are obtained on using one of the remaining dyestuffs of Tables I to IV.

In a second main aspect the present invention relates to new azo dyestuffs, a process for their manufacture, and the use of these azo dyestuffs as constituents of photographic materials.

The azo dyestuffs according to the invention correspond to the formula

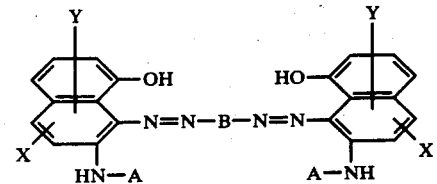

(I)

wherein A denotes a hydrogen atom, an unsubstituted or substituted alkyl group, a cycloalkyl radical or an unsubstituted or substituted benzene radical, X denotes a hydrogen atom or a sulpho or sulphonamide group, Y denotes a sulpho or sulphonamide group and B denotes a radical of the formula

—D—NH—M—HN—D— wherein D denotes a phenylene, biphenylylene or naphthylene radical possessing groups which confer solubility in water and M denotes a dicarbonyl radical of the formula

—OC—E—Z—E'—CO— wherein E and E' each denote an aromatic or heterocyclic radical and Z denotes one of the groups —CONH—, —SO₂NH—, —CONH(CH₂)$_n$HNOC—,

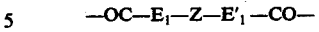

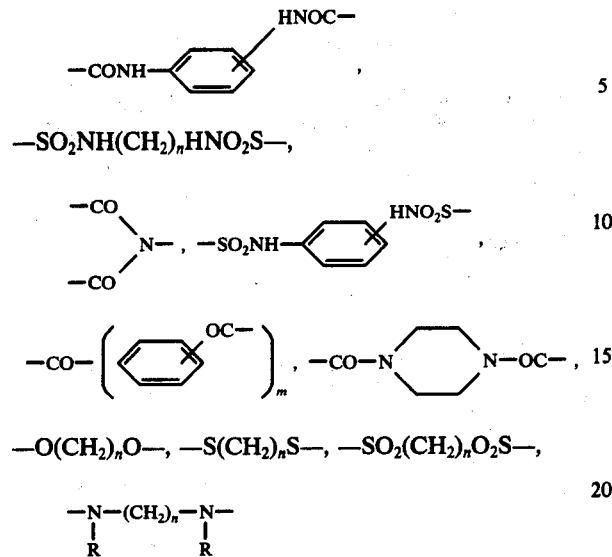

—SO$_2$NH(CH$_2$)$_n$HNO$_2$S—,

—O(CH$_2$)$_n$O—, —S(CH$_2$)$_n$S—, —SO$_2$(CH$_2$)$_n$O$_2$S—,

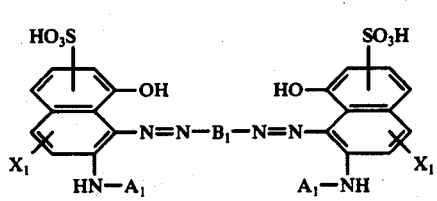

or —NHCO(CH$_2$)$_n$O— wherein R represents hydrogen or alkyl with 1 to 4 carbon atoms, m represents an integer from 1 to 5 and n represents an integer from 1 to 12.

Substituted alkyl groups A for example contain hydroxyl groups as substituents. Possible cycloalkyl radicals A are especially those with 6 carbon atoms and possible substituted benzene radicals A are those which contain halogen atoms, lower alkyl, alkoxy, halogenoalkyl, alkylcarbonyl or alkylsulphonyl radicals, or optionally functionally modified carboxyl or sulpho groups, such as carbonamide or sulphonamide groups.

Possible groups for phenylene, biphenylylene or naphthylene radicals D which confer solubility in water are, for example, carboxyl or sulpho groups.

Possible aromatic radicals E and E' are, for example, benzene radicals, which can be unsubstituted or substituted by halogen atoms, lower alkyl or alkoxy groups, acylamino, nitrile or nitro groups or thenoylamino, furoylamino or pyridinecarbonylamino radicals which are unsubstituted or substituted by alkyl. Heterocyclic radicals E and E' are, for example, furane, thiophene or pyridine radicals which can be unsubstituted or substituted by lower alkyl radicals.

Preferred azo dyestuffs correspond to the formula (II)

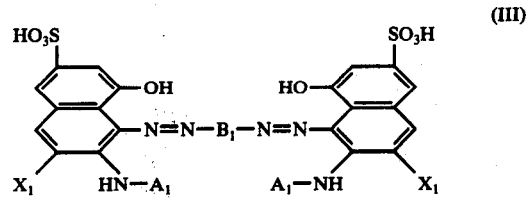

wherein A$_1$ denotes a hydrogen atom, a methyl or hydroxyethyl group or a benzene radical which is optionally substituted by lower alkyl, halogenoalkyl or alkoxy groups, halogen atoms, optionally functionally modified sulpho or carboxyl groups or lower alkylsulphonyl or lower alkylcarbonyl groups, X$_1$ denotes a hydrogen atom or a sulpho group and B$_1$ denotes a radical of the formula

—D$_1$—NH—M$_1$—HN—D$_1$— wherein D$_1$ denotes a phenylene or naphthylene radical possessing sulpho groups and M$_1$ denotes a dicarbonyl radical of the formula

—OC—E$_1$—Z—E'$_1$—CO— wherein Z has the abovementioned meaning and E$_1$ and E$_1$ each represent the benzene, furane, thiophene or pyridine radical or a benzene radical which is substituted by halogen, lower alkyl, lower alkoxy, nitro, acylamino or nitrile.

Azo dyestuffs of the formula (III)

(III)

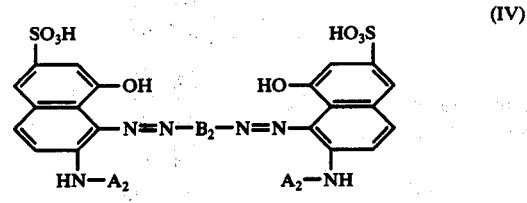

wherein A$_1$, B$_1$ and X$_1$ have the abovementioned meanings, are of particular interest.

Azo dyestuffs which have proved particularly suitable are those of the formula (IV)

(IV)

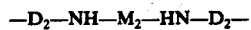

wherein A$_2$ denotes a hydrogen atom, a methyl or hydroxyethyl group or a benzene radical substituted by unsubstituted or substituted alkyl, alkoxy, alkylcarbonyl or alkylsulphonyl and B$_2$ denotes a radical of the formula

—D$_2$—NH—M$_2$—HN—D$_2$— wherein D$_2$ denotes a 1,3- or 1,4-phenylene or 2,6-naphthylene radical which possesses sulpho groups and M$_2$ denotes a dicarbonyl radical of the formula

—OC—E$_2$—Z$_1$—E'$_2$—CO— wherein E$_2$ and E$_2$' each represent a furane or benzene radical and a benzene radical substituted by chlorine, methyl or methoxy and Z$_1$ represents one of the radicals —CONH—, —SO$_2$NH—

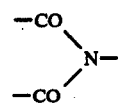

—CONH(CH$_2$)$_p$HNOC—, —O(CH$_2$)$_p$O—,

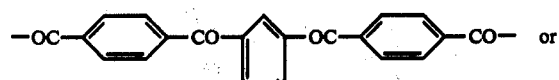 or

wherein p is an integer from 2 to 5.

Azo dyestuffs of the formula (V)

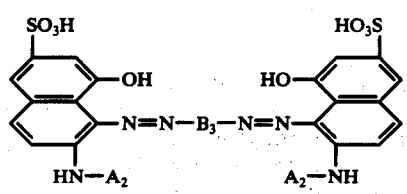

wherein $A_2$ has the abovementioned meaning and $B_3$ denotes a radical of the formula

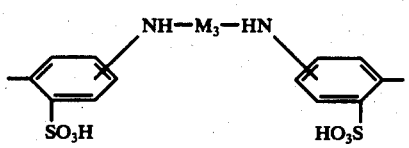

wherein $M_3$ represents a dicarbonyl radical of the formula $$-OC-E_3-Z_1-E_3'-CO-$$

wherein $E_3$ denotes the 1,3- or 1,4-phenylene radical and $E_3'$ denotes 1,3-phenylene, 1,4-phenylene or 4-chloro-1,3-phenylene radical and $Z_1$ has the abovementioned meaning, have proved particularly suitable.

Particular interest is to be ascribed to azo dyestuffs of the formula (VI)

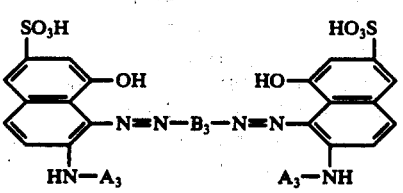

wherein $B_3$ has the abovementioned meaning and $A_3$ denotes a hydrogen atom or a methyl, 2,6-dimethyphenyl, 2,6-dimethoxyohenyl, 2-methyl-4-chloro-phenyl, 3-acetylphenyl, 3-chlorophenyl, 4-chlorophenyl, 4-fluorophenyl or 4-bromophenyl radical.

Azo dyestuffs of the formula (VII)

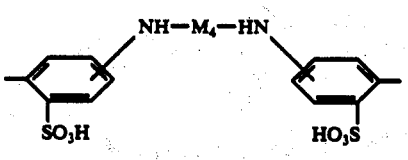

wherein $A_4$ denotes the methyl, 2,6-dimethylphenyl or 2-methyl-4-chlorophenyl radical and $B_4$ denotes a radical of the formula

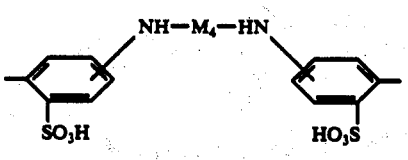

wherein $M_4$ represents a dicarbonyl radical of the formula $$-OC-E_3-Z_2-E_3'-CO-$$

wherein $E_3$ and $E_3'$ have the abovementioned meanings and $Z_2$ represents one of the radicals —CONH—, —O(CH$_2$)$_p$O—,

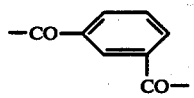

or —CONH(CH$_2$)$_p$HNOC— wherein p is an integer from 2 to 5, show advantageous properties.

Azo dyestuffs of the formula

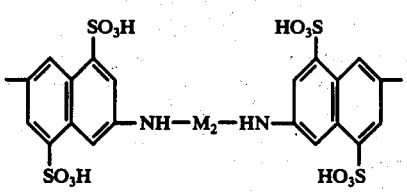

wherein $A_2$ has the abovementioned meaning and $B_5$ denotes a radical of the formula

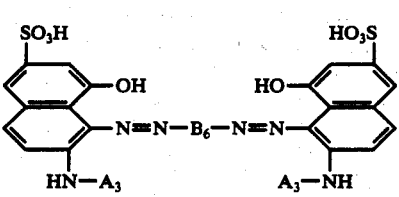

wherein $M_2$ has the abovementioned meaning, and those of the formula

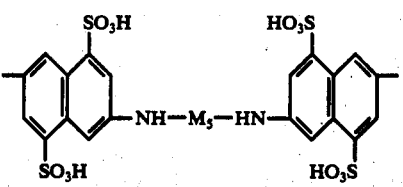

wherein $A_3$ has the abovementioned meaning and $B_6$ denotes a radical of the formula

wherein $M_5$ represents a dicarbonyl radical of the formula $$-OC-E_4-Z_3E_4-CO-$$

wherein $E_4$ denotes a 1,4-phenylene or 2,5-furylene radical and $Z_3$ denotes one of the radicals —OCH$_2$CH$_2$O—, —OCNH(CH$_2$)$_p$HNOC— or

wherein p is an integer from 2 to 5, have proved to be of interest.
Azo dyestuffs of the formula
(X)
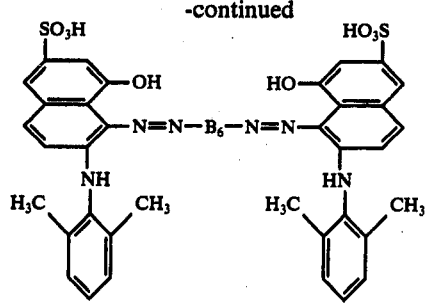
wherein $B_6$ has the abovementioned meaning, are of particular importance.
Azo dyestuffs of formulae (XI) to (XIV) are particularly interesting:
(XI)
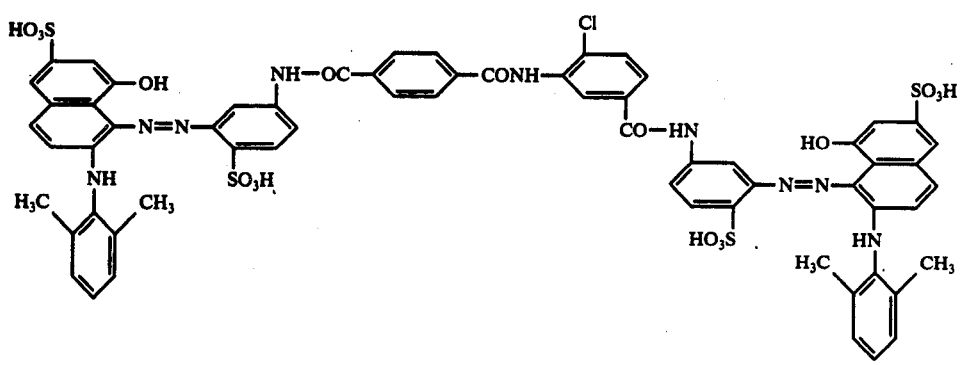
(XII)
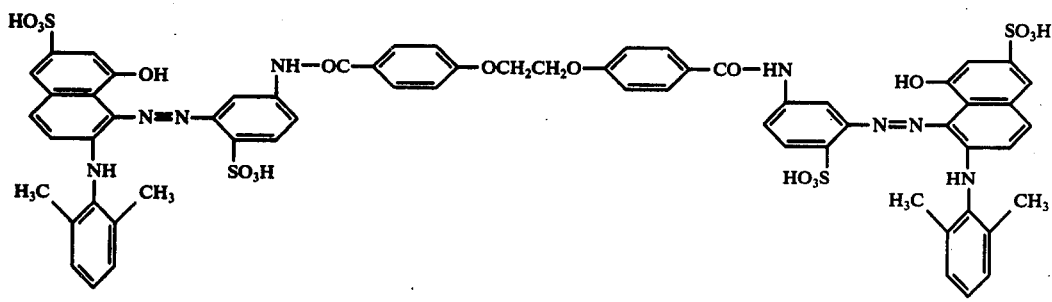
(XIII)
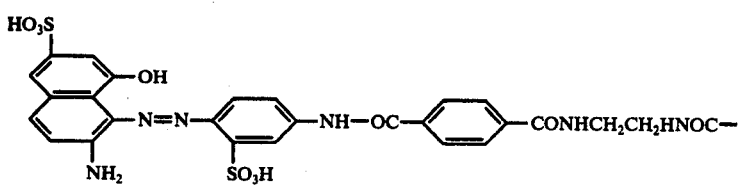
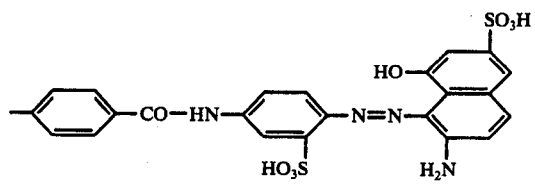
(XIV)

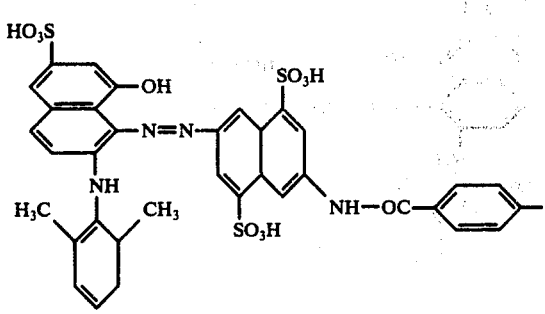
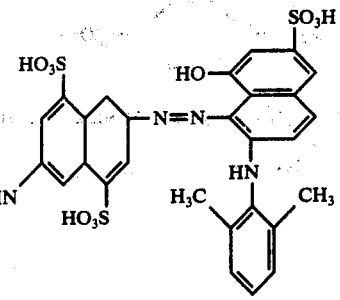

-continued

The dyestuffs of the formulae (I) to (XIV) can not only, as indicated, be in the form of their free acids, that is to say with HOOC— or HO₃S— groups, but also as salts. Depending on the conditions under which they are separated out, for example, on the selected pH value or the cation which the salt used for separating out the dyestuff possesses, the acid groups may be present as —SO₃-cation or —COO-cation groups, such as, for example, —SO₃Na, —SO₃K, (—SO₃)₂Ca, —COONa, —COOLi or COONH₄. Preferably, the salts are thus salts of the alkaline earth metal group or especially of the alkali metal group.

The radicals of the formula

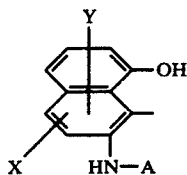

(XV)

in the formula (I) are derived, for example, from the following compounds: 7-amino-1-hydroxynaphthalene-4-sulphonic acid, 7-amino-1-hydroxynaphthalene-4-sulphonamide, 7-amino-1-hydroxynaphthalene-2,4-disulphonic acid, 7-amino-1-hydroxynapthalene-2,4-disulpohonamide, 7-amino-1-hydroxynaphthalene-3,6-disulphonic acid, 7-amino-1-hydroxynaphthalene-3,6-disulphonamide, 7-amino-1-hydroxynaphthalene-3-sulphonic acid, 7-amino-1-hydroxynaphthalene-3-sulphonamide and 7-amino-1-hydroxynaphthalene-2-sulphonic acid 4-sulphonamide, wherein the amino group can be substituted by an aliphatic or aromatic radical A, such as methyl, ethyl, butyl, hydroxyethyl, cyclohexyl, phenyl, 2,6-dimethylphenyl, 2,6-diethylphenyl, 2- or 3- or 4-chlorophenyl, 2,3- or 3,4- or 3,5-dichlorophenyl, 2- or 3- or 4-fluorophenyl, 4-bromophenyl, 2-methyl-4-, or 2-methyl-5-chlorophenyl, 3-trifluoromethylphenyl, 2,6-dimethoxyphenyl, 2- or 4-phenylsulphonic acid, 2-methylphenyl-4-sulphonic acid, 4-chlorophenyl-3-sulphonic acid, 3- or 4-acetylphenyl, 3- or 4-methylsulphonylphenyl, 4-phenoxyphenyl-3-sulphonic acid, 4-phenyl-carboxylic acid, 4-phenyl-carboxylic acid N,N-dimethylamide, 4-phenyl-sulphonic acid diethylamide, 2,4,6-trimethylphenyl or 2,3,4,6-tetramethylphenyl.

The phenylene, biphenylylene and naphthylene radicals D occurring in the formula (I) in the radical B are derived, for example, from the following amines: 1-amino-4-nitrobenzene-2-sulphonic acid, 1-amino-4-nitrobenzene-3-sulphonic acid, 1-amino-5-nitrobenzene-2-sulphonic acid, 1-amino-4-formylaminobenzene-2-sulphonic acid, 1-amino-4-acetylaminobenzene-2-sulphonic acid, 1-amino-5-acetylaminobenzene-2-sulphonic acid, benzidine-3-sulphonic acid, 2-amino-6-nitronaphthalene-4,8-disulphonic acid, 1-amino-6-nitronaphthalene-4,8-disulphonic acid, 2-amino-7-nitronaphthalene-1,5-disulphonic acid, 2-amino-6-nitronaphthalene-8-sulphonic acid and 1-amino-5-nitrobenzene-2-carboxylic acid.

The radicals —OC—E—Z—E'—CO—are derived, for example, from the following dicarboxylic acids:

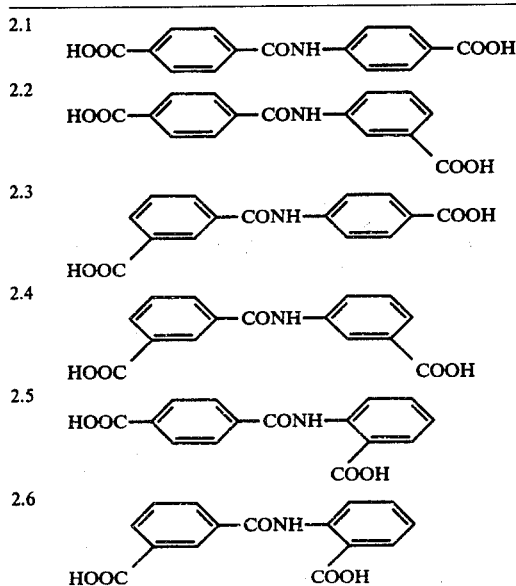

-continued
2.7 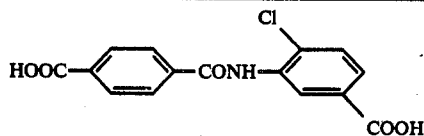
2.8 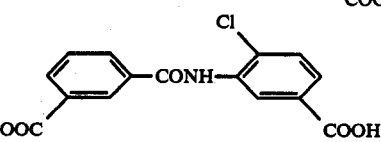
2.9 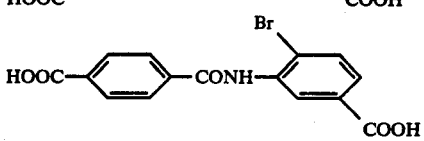
2.10 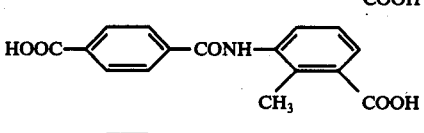
2.11 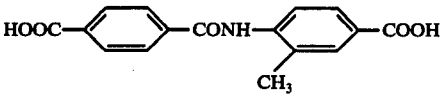
2.12 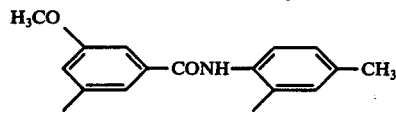
2.13 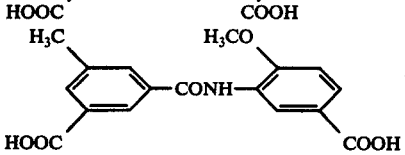
2.14 
2.15 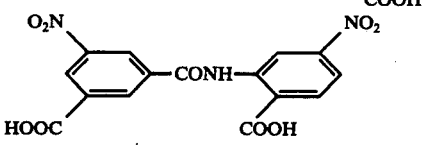
2.16 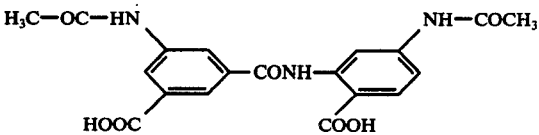
2.17 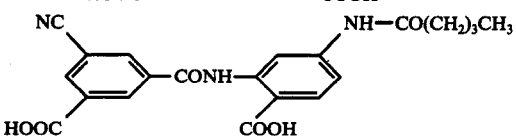
2.18 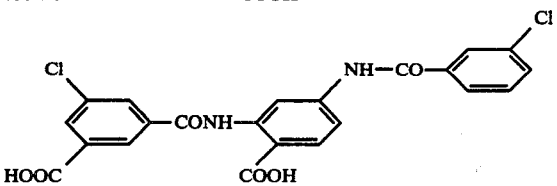
2.19 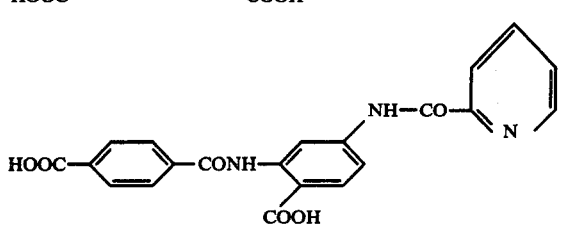

-continued
2.20 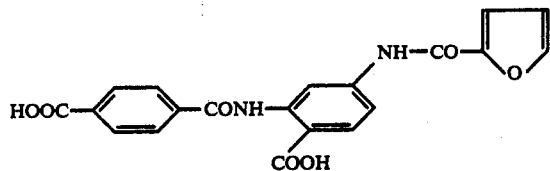
2.21 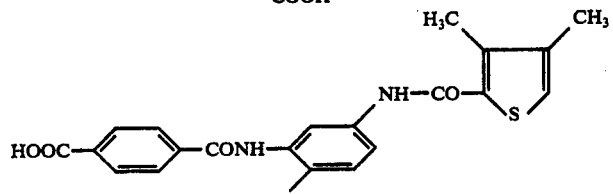
2.22 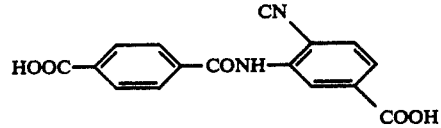
2.23 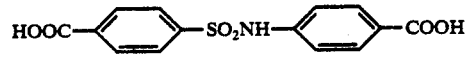
2.24 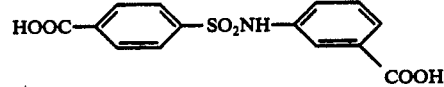
2.25 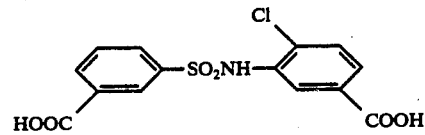
2.26 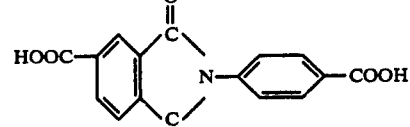
2.27 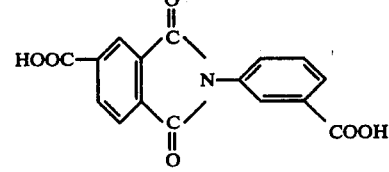
2.28 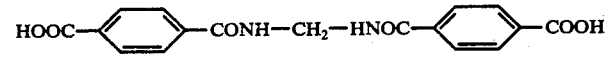
2.29 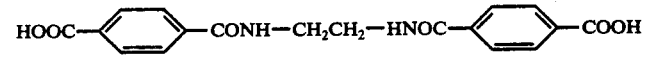
2.30 
2.31 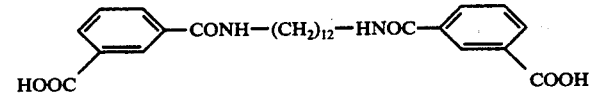
2.32 
2.33 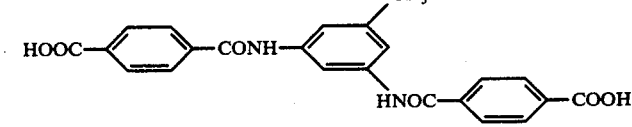
2.34 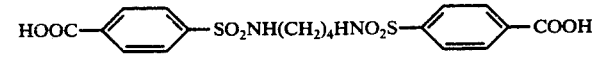

-continued
2.35 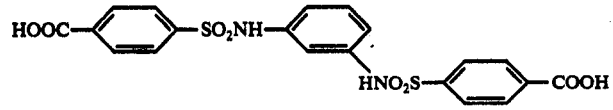
2.36 
2.37 
2.38 
2.39 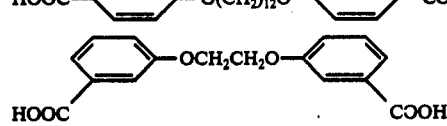
2.40 
2.41 
2.42 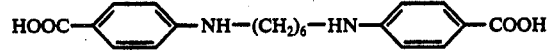
2.43 
2.44 
2.45 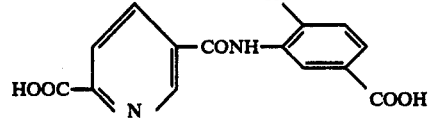
2.46 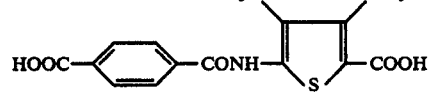
2.47 
2.48 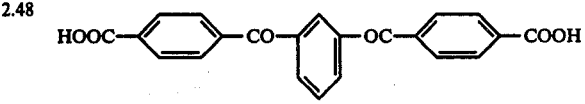
2.49 
2.50 
2.51 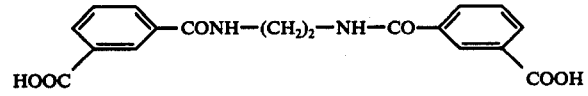
2.52 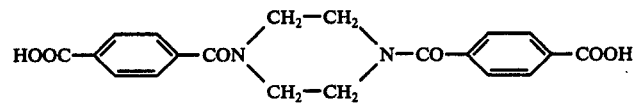
2.53 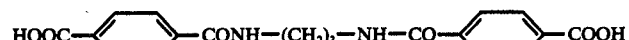
2.54 
2.55 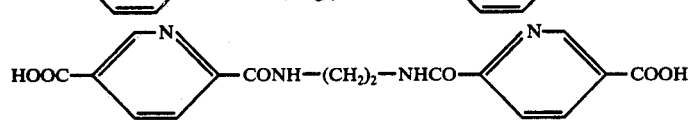

2.56 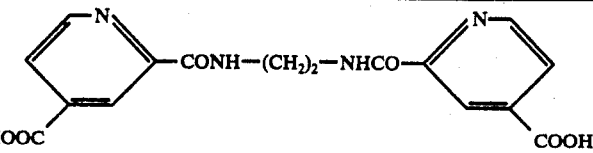

2.57 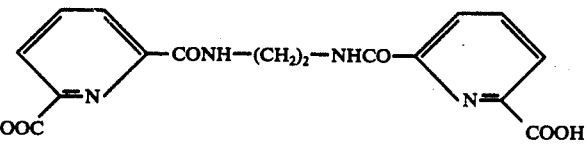

2.58 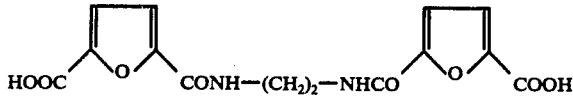

2.59 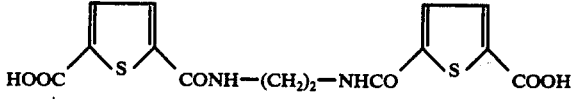

2.60 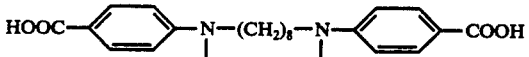

2.61 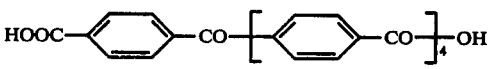

The azo dyestuffs of the formula (I) are manufactured in accordance with methods which are in themselves known.

One process is characterised, for example, in that two equivalents of a compound of the formula (XVI)

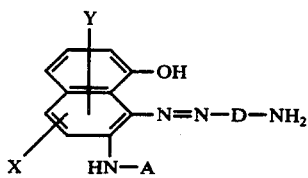

(XVI)

are reacted with a dihalide or dianhydride of an acid of the formula

HO—M—OH wherein A, D, X, Y and M have the abovementioned meanings.

The starting compounds of the formula (XVI) are obtained if, for example, a corresponding amino-nitro-benzenesulphonic acid, or -carboxylic acid, amino-acylaminobenzenesulphonic acid or -carboxylic acid, amino-nitronaphthalenemono- or -di-sulphonic acid or a corresponding 4-amino-4'-nitro- or -4'-acylamino-biphenyl is diazotised and coupled with a compound of the formula

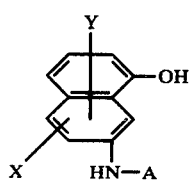

(XVII)

After reduction of the nitro group or splitting off of the protective group, an aminoazo dyestuff of the formula (XVI) is obtained.

It is also possible successively to react 1 mol at a time of an amino compound of the formula (XVI) with 1 mol of the bridge member, for example of the formula Hal — M — Hal wherein Hal represents halogen.

Another process for the manufacture of dyestuffs of the formula (I) is that 1 mol of a tetrazo compound of a diamine of the formula

H$_2$N—D—NH—M—HN—D—NH$_2$ is reacted with 2 moles of an aminonaphthol of the formula (XVII).

A further process for the manufacture of dyestuffs of the formula (I) is characterised, for example, in that a diazo compound of an aminoazo dyestuff of the formula

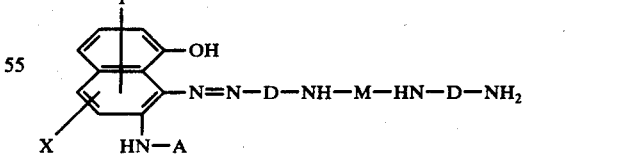

(XVIII)

is reacted with an aminonaphthol of the formula (XVII); wherein A, M, X and Y have the indicated meanings. The compounds of the formula (XVIII) are obtained by diazotisation of a compound of the formula

H$_2$N—D—NH—M—HN—D—NO$_2$ or

H₂N—D—NH—M—HN—D—NH—U wherein D and M have the abovementioned meanings and U denotes a protective group which can be split off, and coupling of the diazo compound with a compound of the formula (XVII), with subsequent reduction of the nitro group or splitting off of the protective group U.

The condensation of amines with acid dichlorides is advantageously carried out in polar, protic or aprotic solvents such as water, methanol, glycol, diethylacetamide, dimethylformamide, N-methylpyrrolidone, pyridine, tetramethyl-urea, hexamethyl-phosphoric acid triamide or N-methyl-caprolactam or mixtures thereof.

It can also be of advantage to carry out the condensation in the presence of acid-binding agents such as, for example, alkali carbonates or alkali borates. Solvents such as pyridine themselves already have an acid-binding effect.

The dyestuffs of the formula (I) can be used for various purposes, but especially in photographic materials and in these particularly advantageously as image dystuffs for a dye bleach process.

For this it is possible to use, for example, the following dye bleach processes: the diffusion transfer process with photosensitive ferric salts (German Pat. No. 1,422,917), metal bleach processes via photosensitive metal complexes (Swiss Pat. No. 506,809), electrophotographic processes (Swiss Pat. No. 1,431,277 or U.S. Pat. No. 3,172,826), dye bleach processes in the presence of stannite (British patent specification No. 546,704), contact processes (British patent specification No. 661,416) and other dye bleach processes, such as, for example, the dye bleach process with complex salts of the first transition metal series, described in Swiss Application No. 12,323/71.

The dyestuffs of the formula (I) can be used with very particular advantage as image dyestuffs for the silver dye bleach process. In accordance therewith, valuable photographic materials, which contain, on an emulsion carrier, at least one layer with a dyestuff of the formula (I), can be manufactured in the customary manner which is in itself known.

In particular, these dyestuffs can be present in a multilayer material which contains, on an emulsion carrier, a layer dyed with a cyan dyestuff which is selectively sensitive to red, on top of this a layer dyed with a magenta dyestuff of the formula (I) which is selectively sensitive to green and finally a layer dyed with a yellow dyestuff, which is sensitive to blue. It is however also possible to incorporate the dyestuffs of the formula (I) in an auxiliary layer or, in particular, in a layer adjacent to the light-sensitive layer.

Furthermore, the dyestuffs of the formula (I) can also be used, for example, for retouching purposes or as filter dystuffs or screening dyestufs, In most cases it suffices to add the dyestuffs to be used according to the invention, as a solution in water or in a water-miscible solvent, at normal or slightly elevated temperature, to an aqueous gelatine solution, whilst stirring well. Thereafter the mixture is brought together with a gelatine containing silver halide and/or other materials for the production of photographic images, cast on a base in the usual manner to give a layer, and dried if appropriate.

The dyestuff solution can also be directly added to a gelatine containing silver halide and/or other materials for the production of photographic images. Thus it is possible, for example, only to add the dyestuff solution immediately before casting.

Instead of simple stirring, the customary methods of distribution by means of kneading forces and/or shear forces or ultrasonics can also be employed.

It is also possible to add the dyestuff, not as a solution, but in a solid form or as a paste.

The casting solution can contain yet further additives such as hardeners, sequestring agents and wetting agents, as well as sensitisers and stabilisers for the silver halide.

The dyestuffs neither undergo chemical reactions with the light-sensitive materials nor impair their sensitivity to light. The dyestuffs of the formula (I) are at the same time very resistant to diffusion but also form stable, aqueous solutions, are insensitive to calcium ions and can be bleached successfully to white.

The dyestuffs, on addition to the casting solutions, neither cause a rise in viscosity nor cause a significant change in viscosity on leaving the casting mixture to stand.

The spectral absorption in gelatine lies in a favourable range, so that the dyestuffs of the formula (I) can be combined with a suitable yellow dyestuff and cyan dyestuff to give a triple dyestuff combination which shows grey shades which appear neutral to the eye over the entire density range.

The dyestuffs of the formula (I) are distinguished by particularly high fastness to light and at the same time excellent bleachability, good resistance to diffusion and favourable colour strength. Finally, after photographic processing in accordance with Use Example 1, no amine decomposition products, which frequently yellow under the action of actinic light, are left in the gelatine layers.

Percentages in the manufacturing instructions and examples which follow are percentages by weight.

MANUFACTURING EXAMPLES

EXAMPLE 1

1.1.

274 g of 3-amino-4-chloro-benzoic acid methyl ester in 4,000 ml of ether are treated dropwise, whilst stirring, with 120 g of p-toluoyl chloride and the whole is stirred for 5 hours at room temperature. The ether is then largely distilled off and the residue is cooled to 10° C and filtered, whereupon 250 g of crude product are obtained.

This product is suspended in 1,000 ml of methanol and treated, at 65° C, with 300 ml of 35% strength hydrochloric acid and thereafter immediately with 2,000 ml of ice water. The mixture is filtered and the product is washed with water until neutral and recrystallised from 5,000 ml of methanol. Yield 174 g of product of the formula

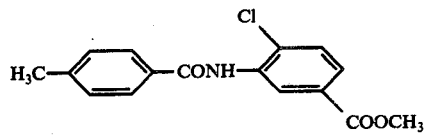

of melting point 147° C.

1.2.

54 g of the product thus obtained, in 300 ml of methanol and 20 ml of 10 N sodium hydroxide solution are heated to the boil, and 2,000 ml of water are then gradually added, whereby a clear solution is produced. Thereafter, 50 ml of glacial acetic acid are added and the crystals which have separated out are filtered off and recrystallised from methanol. Yield: 45 g of product of the formula

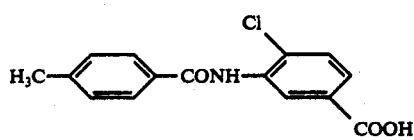

of melting point 233° C.

1.3.

50 g of this product are suspended in 300 ml of water and a solution of 66 g of potassium permanganate and 25 g of MgSO$_4$.H$_2$O in 1,300 ml of water is added dropwise on a steam bath, whilst stirring. The mixture is stirred until the potassium permanganate has been completely consumed (approx. 3 to 4 hours), the manganese dioxide formed is filtered off and rinsed with 400 ml of hot water, and the filtrate is rendered acid to Congo Red with 35% strength hydrochloric acid. The crystals which have separated out are filtered off, washed with 300 ml of water and recrystallised from 120 ml of dimethylformamide.

Yield: 39 g of product of the formula

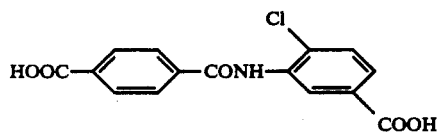

of melting point > 300° C.

1.4.

5.0 g of the dicarboxylic acid thus obtained in 75 ml of benzene are mixed with 7.5 ml of thionyl chloride and the whole is heated to the boil for 4 hours. A clear solution is produced, which is allowed to cool gradually. The crystals which have separated out are filtered off and are successively washed with 30 ml of benzene and 30 ml of petroleum ether.

Yield: 3.9 g of product of the formula

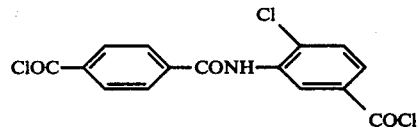

of melting point 172° C.

Analogously to 1.4., the appropriate dicarboxylic acids yield the dicarboxylic acid dichlorides of the formulae (1) to (5), listed in Table I below.

1.5.

1.5 g of aminomonoazo dyestuff of the formula

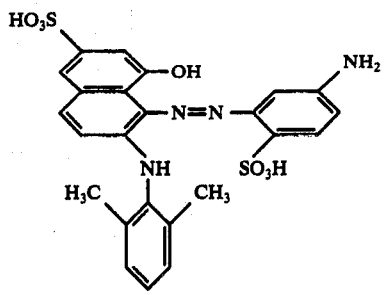

are dissolved in 75 ml of N-methylpyrrolidone and 2 ml of pyridine at 110° C and 1.5 g of the dicarboxylic acid dichloride obtained are gradually added at 100° to 110° C. After 15 minutes, the reaction mixture is diluted with 150 ml of isopropanol and the dyestuff which has separated out is filtered off, washed with 50 ml of ethanol and extracted with ethanol for 24 hours.

1.6 g of pure dyestuff of the formula (101) of Table II are obtained in the form of a red powder.

The dyestuffs of the formulae (102) and (103) of Table II are obtained analogously.

EXAMPLE 2

2.1.

6.9 g of trimellitic anhydride and 6.9 g of 3-aminobenzoic acid are stirred into a melt of 30 g of diphenyl at 240° to 250° C. After 15 minutes, 200 ml of dimethylformamide are stirred into the reaction mixture, the whole is cooled to 0°-2° C and the crystals which have separated out are filtered off and rinsed with 20 ml of dimethylformamide.

For purification, the resulting crude product is dissolved in 120 ml of dimethylformamide, the solution is filtered hot and the product is precipitated from the filtrate by means of 1,000 ml of ethanol. The product is filtered off, washed three times with 200 ml of ethanol at a time and recrystallised from pyridine, and pure product of the formula

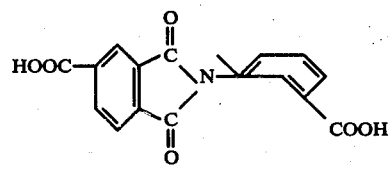

is obtained in good yield.

2.2.

8.6 g of the resulting dicarboxylic acid in 139 ml of toluene and 103 g of phosphorus pentachloride are heated to the boil for 3 hours, whereupon a clear solution is obtained. The mixture is cooled to 0° C and the crystals which have separated out are filtered off and rinsed with a little toluene. Recrystallisation from toluene yields 7.4 g of dicarboxylic acid dichloride of the formula (6) of Table I, of melting point 191° C.

EXAMPLE 3

3.1

15.2 g of 4-hydroxybenzoic acid methyl ester and 7.0 g of potassium carbonate are dissolved in 25 ml of cyclohexanone and 9.4g of ethylene bromide are added over the course of 5 minutes, in a nitrogen atmosphere, whilst stirring. The reaction mixture is stirred under nitrogen for 37 hours at 85° C and is then poured into 200 ml of methanol, 30 ml of water are added at 60° C and the solution is filtered whilst still hot, after which 8.7 g of product of the formula

crystallise out from the filtrate in the form of a white powder of melting point 164° C (decomposition).

3.2.

34.0 g of ester of the above formula in 170 ml of 30% strength potassium hydroxide solution are stirred for 72 hours at 85° to 90° C. The mixture is poured into 400 ml of water, the whole is heated to the boil and filtered after adding a little fuller's earth, and after acidification with 35% strength hydrochloric acid 28.1 g of product of the formula

are obtained in the form of a white powder of melting point >300° C.

3.3.

If an analogous procedure to 1.4 is followed, 28.0 g of acid of the above formula yield 25.1 g of acid chloride of the formula (7) of Table I, of melting point 128° C, in the form of fine white needles.

The acid chlorides of the formulae (8) to (10) of Table I are obtained cnalogously to 3.1-3.3.

analogously 4

4.1.

Oxidation of the compound of the formula

with potassium permanganate in the usual manner yields the dicarboxylic acid of the formula

from which, analogously to 2.2, the acid chloride of the formula (11) of Table I is obtained.

The acid chloride of the formula (12) of Table I is obtained analogously to 4.1.

EXAMPLE 5

5.1.

41.0 g of terephthalic acid monomethyl ester-monochloride are dissolved in 300 ml of acetone at 5° to 10° C. After adding 17.0 g of solid sodium bicarbonate a solution of 6.8 ml of ethylenediamine in 50 ml of acetone is added dropwise. The mixture is stirred for 2 hours at 5° C, 3 hours at 20° C and a further hour at the reflux temperature. After cooling, the reaction mixture is introduced into 1,200 ml of ice water. The precipitate is filtered off, washed with ice water and then dried and recrystallised from 350 ml of dimethylformamide and 300 ml of n-butanol.

24.7 g of product of the formula

are obtained in the form of colourless crystals of melting point 307° C.

5.2.

48.0 g of ester of the above formula are suspended in a mixture of 540 ml of water, 146 ml of 2 N sodium hydroxide solution and 270 ml of ethanol and the whole is stirred for 20 minutes under reflux, whereby a clear solution is produced. The reaction mixture is then added to 2,300 ml of 0.7 N sulphuric acid. The precipitate which has separated out is filtered off and washed by twice suspending it in 600 ml of ice water at a time.

43.0 g of product of the formula

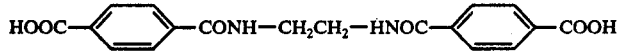

are obtained in the form of white crystals of melting point > 300° C.

5.3.

3.6 g of the dicarboxylic acid thus obtained are suspended in 50 ml of benzene. 0.4 ml of dimethylformamide and 10 ml of thionyl chloride are added and the mixture is heated to the boil and stirred until the evolution of gas has ceased. The reaction mixture is filtered hot and 25 ml of petroleum ether (boiling point 35° to 75° C) are added. After completion of the crystallisation, the crystals are rapidly filtered off, washed with petroleum ether and dried in vacuo over phosphorus pentoxide.

3.5 g of product of the formula (13) of Table I are obtained in the form of white needles of melting point 150° C.

Analogously to 5.3, the appropriate dicarboxylic acids yield the acid chlorides of the formulae (14) to (21) of Table I.

EXAMPLE 6

If an analogous procedure to 1.5 is followed, the dyestuffs of the formulae (104) to (130) of Table II and the dyestuffs of the formulae (201) to (205) of Table III are manufactured from the acid chlorides of the formulae (1) to (21) of Table I.

TABLE I

| No | Dicarboxylic acid dichloride | Melting point in °C |
|---|---|---|
| (1) | ClOC—C₆H₄—CONH—C₆H₄—COCl | *) |
| (2) | ClOC—C₆H₄—CONH—C₆H₄(COCl) (meta) | 109 |
| (3) | ClOC—C₆H₄—CONH—C₆H₄—COCl | 150 |
| (4) | ClOC—C₆H₄—CONH—C₆H₃(Cl)—COCl | 123 |
| (5) | ClOC—C₆H₄—SO₂NH—C₆H₄—COCl | 108 |
| (6) | ClOC—C₆H₃(phthalimido-N-C₆H₄—COCl) | 191 |
| (7) | ClOC—C₆H₄—OCH₂CH₂O—C₆H₄—COCl | 128 |
| (8) | ClOC—C₆H₄—OCH₂CH₂O—C₆H₄—COCl | 105 |
| (9) | ClOC—C₆H₄—O(CH₂)₅O—C₆H₄—COCl | 100 |
| (10) | ClOC—C₆H₄—O(CH₂)₁₂O—C₆H₄—COCl | >300 |
| (11) | ClOC—C₆H₄—CO—C₆H₄—O—C₆H₄—COCl | 132 |
| (12) | ClOC—C₆H₄—CO—C₆H₄—OC—C₆H₄—COCl | *) |
| (13) | ClOC—C₆H₄—CONH—CH₂CH₂—HNOC—C₆H₄—COCl | 150 |
| (14) | ClOC—C₆H₄—CONH—(CH₂)₃—NHCO—C₆H₄—COCl | 42 |
| (15) | ClOC—C₆H₄—CONH—(CH₂)₄NHCO—C₆H₄—COCl | 182 |
| (16) | ClOC—(pyridyl)—CONH—(CH₂)₂—NHCO—(pyridyl)—COCl | 180 |
| (17) | ClOC—(pyridyl)—CONH—(CH₂)₂—NHCO—(pyridyl)—COCl | 155 |
| (18) | ClOC—C₆H₄—CONH—(CH₂)₂—NHCO—C₆H₄—COCl | 180 |

TABLE I-continued

| No | Dicarboxylic acid dichloride | Melting point in °C |
|---|---|---|
| (19) |  ClOC–[thiophene]–CONH–(CH₂)₂–NHCO–[thiophene]–COCl | 120 |
| (20) |  ClOC–[furan]–CONH–(CH₂)₂–NHCO–[furan]–COCl | 218 |
| (21) |  ClOC–C₆H₄–CON(CH₂CH₂)₂NCO–C₆H₄–COCl (piperazine bridge) | 242 |

*) not isolated (further processed, in solution, to the dyestuff)

TABLE II

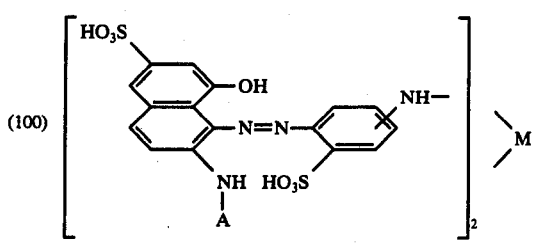

(100) $\left[ \text{structure with } HO_3S, OH, N=N, NH, HO_3S, NH-A \right]_2 M$

| No. | A | *) | M | Absorption maximum in nm in DMF-H₂O (1:1) | Gelatine |
|---|---|---|---|---|---|
| 101 | 2,6-dimethylphenyl (H₃C, CH₃) | 5 | OC–C₆H₄–CONH–C₆H₃(Cl)–CO | 532 + 560 | 532 + 560 |
| 102 | 2,6-dimethylphenyl (H₃C, CH₃) | 4 | OC–C₆H₄–CONH–C₆H₃(Cl)–CO | 532 + 554 | 540 + 572 |
| 103 | H | 4 | OC–C₆H₄–CONH–C₆H₃(Cl)–CO | 520 + 544 | 488 + 560 |
| 104 | 2,6-dimethylphenyl (H₃C, CH₃) | 5 | OC–C₆H₄–CONH–C₆H₄–CO | 522 + 540 | 532 + 562 |
| 105 | 2,6-dimethylphenyl (H₃C, CH₃) | 5 | OC–C₆H₄–CONH–C₆H₄–CO | 520 + 540 | 524 + 558 |
| 106 | 2,6-dimethylphenyl (H₃C, CH₃) | 5 | OC–C₆H₄–CONH–C₆H₃(Cl)–CO | 520 + 544 | 532 + 560 |

TABLE II-continued
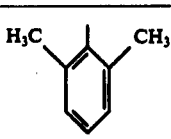
| No. | A | *) | M | Absorption maximum in nm in DMF-H₂O (1:1) | Gelatine |
|---|---|---|---|---|---|
| 107 | 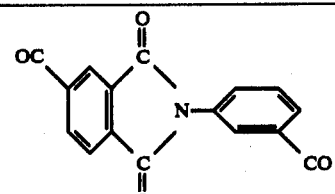 | 5 | 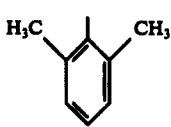 | 520 + 540 | 526 + 557 |
| 108 | 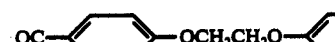 | 5 |  | 520 + 539 | 533 + 565 |
| 109 | H | 4 |  | 520 + 540 | 531 + 565 |
| 110 | H | 4 |  | 519 + 540 | 532 + 565 |
| 111 |  | 4 | 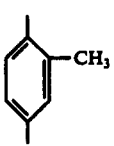 | 530 + 552 | 550 + 587 |
| 112 | 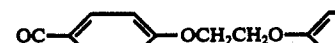 | 4 | 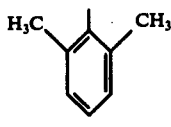 | 531 + 554 | 550 + 589 |
| 113 | 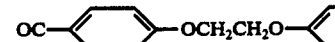 | 5 | 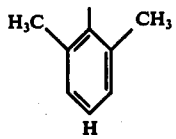 | 520 + 540 | 530 + 560 |
| 114 | H | 4 | 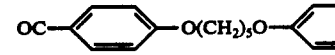 | 518 + 540 | 530 + 560 |
| 115 |  | 5 | 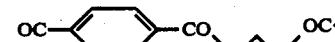 | 520 + 540 | 530 + 563 |
| 116 | 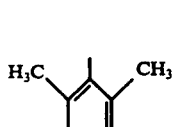 | 4 |  | 531 + 553 | 541 + 568 |
| 117 | 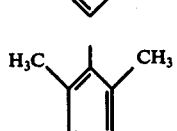 | 5 |  | 522 + 540 | 530 + 552 |

TABLE II-continued $$(100) \left[ \begin{array}{c} \text{HO}_3\text{S} \\ \text{naphthalene-OH, NH-A, HO}_3\text{S, N=N-phenyl-NH-} \end{array} \right]_2 M$$

| No. | A | *) | M | Absorption maximum in nm in DMF-H₂O (1:1) | Gelatine |
|---|---|---|---|---|---|
| 118 | CH₃ | 4 | OC–C₆H₄–CONH–CH₂CH₂–HNOC–C₆H₄–CO | 535 + 560 | 556 + 595 |
| 119 | 2,6-(H₃C)₂C₆H₃ | 4 | OC–C₆H₄–CONH–CH₂CH₂–HNOC–C₆H₄–CO | 531 + 553 | 548 + 583 |
| 120 | H | 4 | OC–C₆H₄–CONHCH₂CH₂HNOC–C₆H₄–CO | 520 + 544 | 540 + 571 |
| 121 | H | 4 | OC–C₆H₄–CON(CH₂CH₂)₂NCO–C₆H₄–CO (piperazine) | 519 + 544 | 494 + 560 |
| 122 | H | 4 | OC–C₆H₄–CONH–(CH₂)₃–HNOC–C₆H₄–CO | 517 + 544 | 522 + 561 |
| 123 | 2,6-(H₃C)₂C₆H₃ | 5 | OC–C₆H₄–CONH–(CH₂)₃–HNOC–C₆H₄–CO | 521 + 540 | 531 + 556 |
| 124 | 2,6-(H₃C)₂C₆H₃ | 5 | OC–C₆H₄–CONH–(CH₂)₄–HNOC–C₆H₄–CO | 521 + 540 | 532 + 559 |
| 125 | H | 4 | OC–C₆H₄–CONH–(CH₂)₄–HNOC–C₆H₄–CO | 520 + 544 | 537 + 574 |
| 126 | H | 4 | OC–(pyridyl)–CONHCH₂CH₂HNOC–(pyridyl)–CO | 520 + 546 | 543 + 577 |
| 127 | H | 4 | OC–(furyl)–CONHCH₂CH₂HNOC–(furyl)–CO | 519 + 548 | 522 + 562 |
| 128 | 2,6-(H₃C)₂C₆H₃ | 4 | OC–C₆H₄–O(CH₂)₁₂O–C₆H₄–CO | elf 552 | 540 + 576 |
| 129 | 2,6-(H₃C)₂C₆H₃ | 4 | OC–C₆H₄–OCH₂CH₂O–C₆H₄–CO | 528 + 551 | 532 + 561 |

TABLE II-continued (100) [structure with HO₃S, OH, N=N, NH—, NH—A, HO₃S groups]₂ M

| No. | A | *) | M | Absorption maximum in nm in DMF-H₂O (1:1) | Gelatine |
|---|---|---|---|---|---|
| 130 | 2,6-dimethylphenyl (H₃C, CH₃) | 5 | OC–C₆H₄–CO–NH–CH₂CH₂–HN–CO–C₆H₄–CO | 520 + 541 | 532 + 568 |

*) Position the —NH— group in the benzene radical, relative to the azo group.

TABLE III (200) [structure with HO₃S, OH, N=N, SO₃H, NH—A, SO₃H, NH— groups]₂ M

| No. | A | M | Absorption maximum in nm in DMF—H₂O (1:1) | Gelatine |
|---|---|---|---|---|
| 201 | 2,6-dimethylphenyl | OC–C₆H₄–OCH₂CH₂O–C₆H₄–CO | 530 + 554 | 542 + 576 |
| 202 | 2,6-dimethylphenyl | OC–C₆H₄–CONH(CH₂)₂–NHCO–C₆H₄–CO | 530 + 553 | 539 + 565 |
| 203 | 2,6-dimethylphenyl | OC–C₆H₄–CONH(CH₂)₄NHCO–C₆H₄–CO | 530 + 553 | 542 + 568 |
| 204 | 2,6-dimethylphenyl | OC–C₆H₄–CON(CH₂CH₂)₂NCO–C₆H₄–CO (piperazine) | 532 + 554 | 540 + 562 |
| 205 | 2,6-dimethylphenyl | OC–(furan)–CONH(CH₂)₂NHCO–(furan)–CO | 533 + 555 | 543 + 566 |

USE EXAMPLES

EXAMPLE 1

3.3 ml of a 6% strength gelatine solution, 2.0 ml of a 1% strength aqueous solution of the hardener of the formula

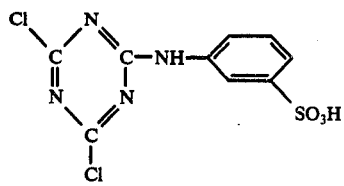

(301)

1.0 ml of a 1% strength aqueous solution of the magenta

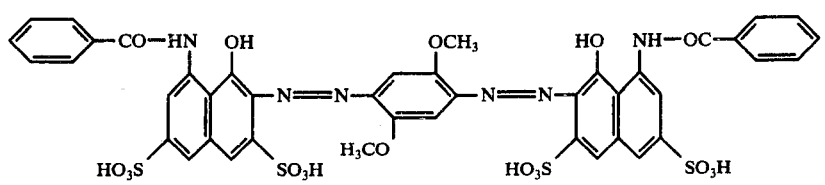

(302)

dyestuff of the formula (101) and 3.3 ml of silver bromide emulsion containing 35 g of silver per liter are pipetted into a test tube and made up to 10.0 ml with deionised water. This solution is vigorously mixed and kept for 5 minutes in a water bath at 40° C.

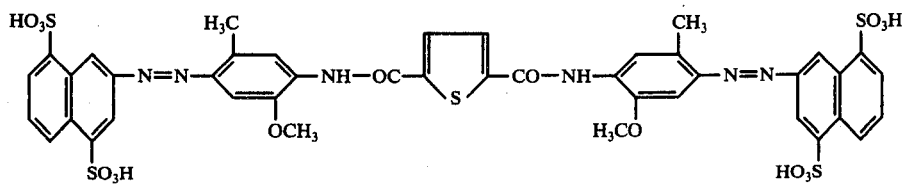

(303)

The casting solution, at 40° C, is cast on a substrated glass plate of size 13 cm × 18 cm. After setting at 10°, the plate is dried in a drying cabinet by means of circulating air at 32° C.

A strip cut to size 3.5 cm × 18 cm is exposed for 3 seconds with 50 Lux/cm² under a step wedge through a Kodak 2b + 49 blue filter. Thereafter it is further processed as follows:

1. 10 minutes' developing in a bath which per liter contains 1 g of p-methylaminophenol sulphate, 20 g of anhydrous sodium sulphite, 4 g of hydroquinone, 10 g of anhydrous sodium carbonate and 2 g of potassium bromide;
2. 2 minutes' soaking;
3. 6 minutes' stop-fixing in a bath which per liter contains 200 g of crystalline sodium thiosulphate, 15 g of anhydrous sodium sulphite, 25 g of crystalline sodium acetate and 13 ml of glacial acetic acid;
4. 8 minutes' soaking;
5. 20 minutes' dye bleaching in a bath which per liter contains 27.5 ml of 96% strength sulphuric acid, 10 g potassium iodide and 15 ml of a solution of 0.3 g of 2,3-dimethyl-6-aminoquinonoxaline in 50 ml of ethanol;
6. 4 minutes' soaking;
7. 8 minutes' residual silver bleaching in a bath which per liter contains 50 g of potassium ferricyanide, 15 g of potassium bromide, 10 g of disodium phosphate and 14 g of monosodium phosphate;
8. 6 minutes' soaking;
9. 6 minutes' fixing as indicated under (3);
10. 10 minutes' soaking.

A brilliant, light-fast magenta wedge is obtained, which is completely bleached to white in the position of what was originally the greatest density of silver.

Similar results are obtained when using one of the other dyestuffs of Tables II and III.

EXAMPLE 2

The following layers are successively applied to an opaque white acetate film provided with an adhesive layer;

1. Red-sensitive silver bromide emulsion in gelatine, containing the cyan dyestuff of the formula 2. Colourless gelatine layer without silver halide.
3. Green-sensitive silver bromide emulsion in gelatine, containing the magenta dyestuff of the formula (108).
4. Blue-sensitive silver bromide emulsion in gelatine, containing the yellow dyestuff of the formula (303)

The gelatine layers can furthermore contain additives such as wetting agents, hardeners and stabilisers for the silver halide. In other respects the procedure followed is that the individual layers contain, per square meter of film, 0.5 g of the particular dyestuff and the amount of silver bromide corresponding to 1–1.2 g of silver.

This film is exposed with red, green and blue copying light under a coloured diapositive. Thereafter the copy is developed in accordance with the instruction given in Example 1.

A light-fast, document-quality, positive direct-viewing image is obtained.

Similar results are obtained if instead of the dyestuff of the formula (108) another dyestuff of Tables II and III is used.

EXAMPLE 3

3.3 ml of a 6% strength gelatine solution, 2.0 ml of a 1% strength aqueous solution of the hardener of the formula (301), 3.3 ml of silver bromide emulsion containing 35 g of silver per liter, and 1.4 ml of deionised water are pipetted into a test tube.

The whole is thoroughly mixed and kept in a water bath at 40° C for 5 minutes.

The casting solution at 40° C is cast onto a substrated glass plate of size 13 cm × 18 cm. After setting at 10° C, the plate is dried in a drying cabinet by means of circulating air at 32° C.

A mixture of 3.3 ml of a 6% strength gelatine solution, 2.0 ml of a 1% strength aqueous solution of the hardener of the formula (301), 0.5 ml of a 1% strength aqueous solution of the magenta dyestuff of the formula (120) and 4.2 ml of deionised water is then cast onto the dried layer at 40° C.

The layer is allowed to set and dry as indicated above.

A strip cut to size 3.5 cm × 18 cm is exposed for 10 seconds with 50 Lux/cm² under a step wedge through a Kodak 2b + 49 blue filter.

Thereafter the procedure described in Example 1 is followed.

A brilliant, very light-fast magenta wedge is obtained, which is completely bleached to white in the position of what was originally the greatest density of silver.

Similar results are obtained if instead of the dyestuff of the formula (120) a different dyestuff of Tables II and III is used.

EXAMPLE 4

A test strip prepared and exposed according to Example 1 is processed as follows:

1. 5 minutes' developing in a bath which per liter contains 1 g of p-methylaminophenol sulphate, 20 g of anhydrous sodium sulphite, 4 g of hydroquinone, 10 g of anhydrous sodium carbonate, 2 g of potassium bromide and 3 g of sodium thiocyanate;
2. 2 minutes' soaking;
3. 2 minutes' treatment in a reversal bath which per liter contains 5 g of potassium bichromate and 5 ml of 96% strength sulphuric acid;
4. 4 minutes' soaking;
5. 5 minutes' treatment in a bath which per liter contains 50 g of anhydrous sodium sulphite;
6. 3 minutes' soaking;
7. 4 minutes' developing in a bath which per liter contains 2 g of 1-phenyl-3-pyrazolidone, 50 g of anhydrous sodium sulphite, 10 g of hydroquinone, 50 g of anhydrous sodium carbonate, 2 g of sodium hexametaphosphate and 20 ml of a 1% strength aqueous solution of tert.-butylaminoborane;
8. 2 minutes' soaking;
9. further treatment as indicated in Example 1 under (5) to (10).

A brilliant, highly light-fast magenta wedge running counter to the original is obtained.

Similar results are obtained on using one of the other dyestuffs of Tables II and III.

In a third main aspect the present invention relates to new azo dyestuffs, processes for their manufacture and the use of these azo dyestuffs as constituents of photographic materials.

The azo dyestuffs according to the invention correspond to the formula $$A_1-N=N-B_1-NH-CO-X_1-Y-Z_1-OC-H-N-B_1-N=N-A_1 \quad (I)$$

wherein $A_1$ denotes a 3,6-disulpho-8-hydroxy-naphth-1-yl, 4,8-disulpho-naphth-2-yl, 1-amino-3,6-disulpho-8-hydroxynaphth-7-yl or 1-amino-4,6-disulpho-8-hydroxy-naphth-7-yl radical which is unsubstituted or substituted by alkyl, alkoxy, acyl, halogen, nitro, amino, acylamino, substituted phenyl or phenyl, or denotes a benzene radical containing 1 or 2 acid groups which confer solubility in water, $B_1$ denotes a benzene, diphenyl or naphthalene radical which is unsubstituted or substituted by alkyl, substituted alkyl, alkoxy, alkylmercapto, phenoxy, halogen, acylamino, nitrile, alkylsulphonyl, carbonamido or sulphonamido and which can contain 1 to 2 acid groups which confer solubility in water, $X_1$ and $Z_1$ each denote the benzene, furane, thiophene or pyridine radical or a benzene radical substituted by halogen, lower alkyl, lower alkoxy, nitro, acylamino or nitrile and Y denotes one of the radicals —CONH—, —SO₂NH—, $$\begin{array}{c}-CO\\ \phantom{-}\diagdown\\ \phantom{-CO}N-,\\ \phantom{-}\diagup\\ -CO\end{array}$$

$$\begin{array}{c}-CO\\ \phantom{-}\diagdown\\ \phantom{-CO}N-,\\ \phantom{-}\diagup\\ -CO\end{array}$$

—CONH(CH₂)ₙHNOC—,

—CONH—⟨phenyl⟩—HNOC—,

—SO₂NH(CH₂)ₙHNO₂S—,

—SO₂NH—⟨phenyl⟩—HNO₂S—,

—O(CH₂)ₙO—, —S(CH₂)ₙS—, —SO₂(CH₂)ₙO₂S—, $$-N(CH_2)_nN-,\quad -CO-\left\{\text{⟨phenyl⟩}-OC-\right\}_m$$
     |         |
     R         R —CO—N⟨ring⟩N—OC— and —NHCO(CH₂)ₙO—, wherein n signifies an integer from 1 to 12, m signifies an integer from 1 to 5 and R signifies a hydrogen atom or an alkyl radical with 1 to 4 carbon atoms.

Possible groups, which confer solubility in water, of the benzene radicals $A_1$ are, for example, carboxyl or sulphonic acid groups.

Alkyl and alkoxy substituents of the radicals $A_1$ and $B_1$ possess 1 to 5 carbon atoms. Possible substituted alkyl radicals of the benzene, diphenyl or naphthalene radicals $B_1$ are halogenoalkyl, hydroxyalkyl, alkoxyalkyl, carboxyalkyl and carboxyalkoxyalkyl radicals and possible substituted phenyl radicals of the benzene or naphthalene radicals $A_1$ are phenyl radicals which are substituted by alkyl with 1 to 12 carbon atoms, alkoxy with 1 to 4 carbon atoms, halogen, such as chlorine, bromine and fluorine, nitro and acylamino. Lower alkyl radicals $X_1$ and $Z_1$ possess 1 to 5 carbon atoms. Acid groups which confer solubility in water are, for example, carboxyl or sulphonic acid groups.

Possible acyl substituents of radicals $A_1$ are unsubstituted or substituted alkanoyl, alkylsulphonyl, benzoyl or phenylsulphonyl radicals, or a 5- to 6-membered heterocyclic radical, possessing 1 to 3 hetero-atoms, bonded to the radical $A_1$ via —CO— or —$SO_2$—.

In a first aspect of the present invention, azo dyestuffs of the formula

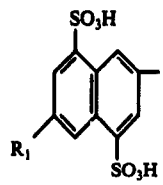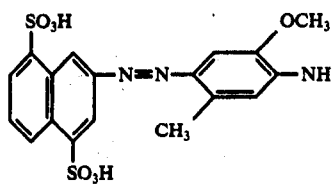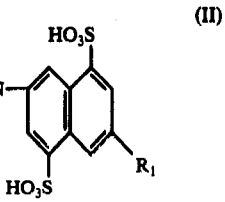

(II)

are of interest. In this formula, Y, $X_1$ and $Z_1$ have the abovementioned meanings, $B_2$ denotes a naphthyl-1,4-ene radical or a radical

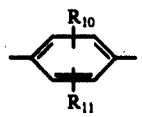

wherein $R_{10}$ represents hydrogen, halogen, lower alkyl, lower alkoxy, carboxymethyl, carboxymethoxy or acylamino and $R_{11}$ represents hydrogen, lower alkyl, lower alkoxy or acylamino, and $R_1$ signifies hydrogen, halogen, nitro or acylamino.

Possible acylamino radicals $R_{10}$ and $R_{11}$ are those whereof the acyl part is derived from an aliphatic carboxylic acid with 1 to 5 carbon atoms or from a benzene-, pyridine-, furane- or thiophene-carboxylic acid which is unsubstituted or substituted by alkyl with 1 to 12 carbon atoms, halogenoalkyl with 1 to 12 carbon atoms, alkoxy with 1 to 4 carbon atoms, halogen, alkylcarbonyl, alkylsulphonyl, phenyl, nitro, acylamino or nitrile.

Azo dyestuffs of the formula cal substituted by chlorine, methyl or methoxy, $R_{12}$ denotes hydrogen, chlorine, methyl, methoxy or acetylamino and $R_{13}$ denotes hydrogen, methyl, methoxy or hydroxyethoxy, are of particular interest.

Azo dyestuffs of the formula wherein $Y_1$ denotes one of the radicals —CONH—, —$SO_2$NH—,

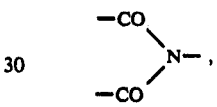

—CONH$(CH_2)_p$HNOC—, —O$(CH_2)_p$O—,

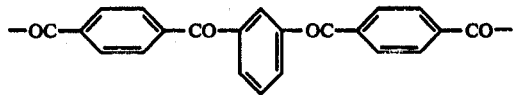

and

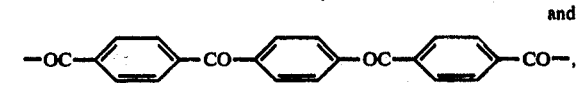

wherein $p$ represents an integer from 2 to 5, $X_3$ denotes the 1,4- or 1,3-phenylene radical and $Z_3$ denotes the 1,4- or 1,3-phenylene radical or the 4-chloro-1,3-phenylene radical, have proved particularly suitable.

Azo dyestuffs of particular interest are those of the formula

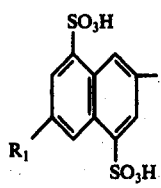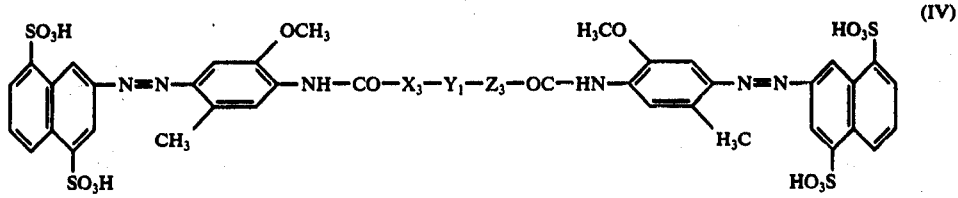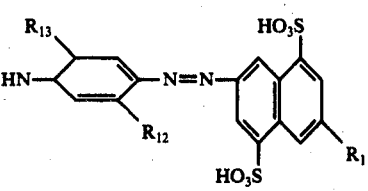

(III)

wherein Y and $R_1$ have the abovementioned meanings, $X_2$ and $Z_2$ denote the benzene radical or a benzene radi-

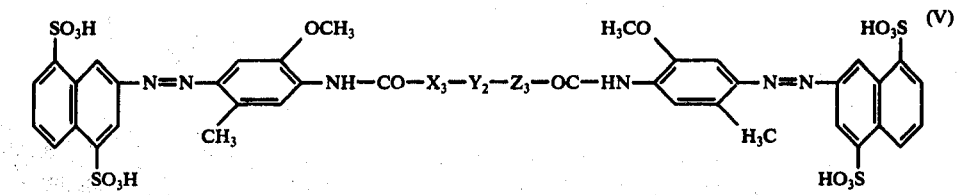

(V)

wherein $Y_2$ denotes one of the radicals —CONH—, —CONH—CH$_2$CH$_2$—HNOC and —O—CH$_2$CH$_2$—O— and $X_3$ and $Z_3$ have the abovementioned meanings.

In a second aspect of the present invention, azo dyestuffs of the formula

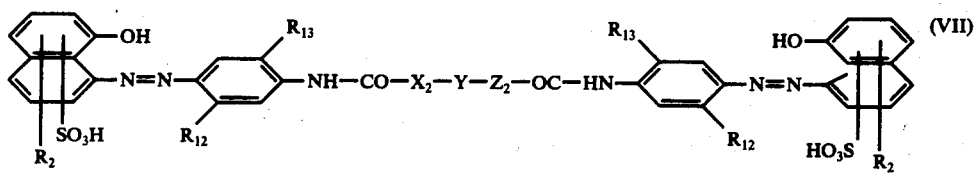

are of interest. In this formula, Y, $X_1$, $Z_1$ and $B_2$ have the abovementioned meanings and $R_2$ signifies hydrogen or the sulpho group.

Azo dyestuffs of the formula

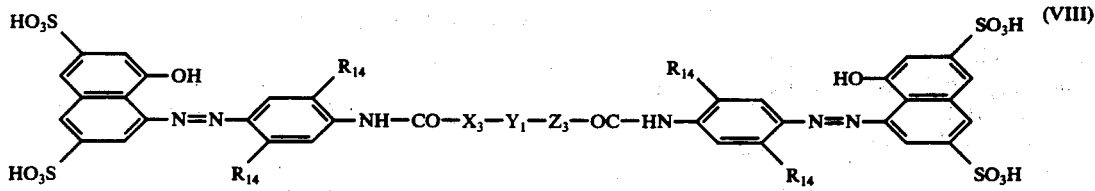

wherein Y, $X_2$, $Z_2$, $R_2$, $R_{12}$ and $R_{13}$ have the abovementioned meanings, are of particular interest.

Azo dyestuffs of the formula

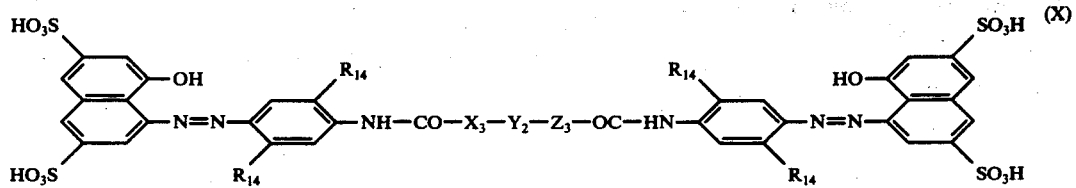

wherein $Y_1$, $X_3$ and $Z_3$ have the abovementioned meanings and $R_{14}$ denotes methoxy or ethoxy, have proved particularly suitable.

Azo dyestuffs of the formula

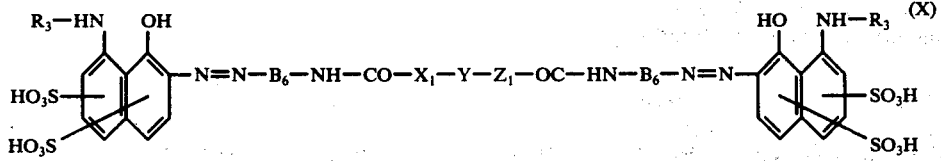

wherein $Y_2$, $X_3$, $Z_3$ and $R_{14}$ have the abovementioned meanings, are of particular interest.

In a third aspect of the present invention, azo dyestuffs of the formula

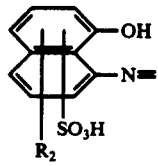

are of interest. In this formula, Y, $X_1$ and $Z_1$ have the abovementioned meanings, $B_6$ denotes a radical

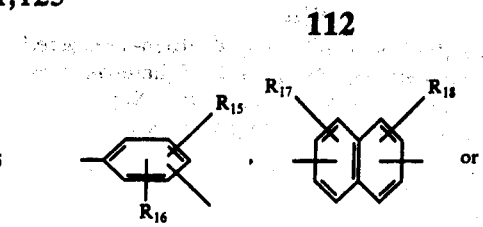

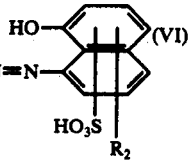

wherein $R_{15}$ represents hydrogen, lower alkyl, lower alkoxy or sulpho, $R_{16}$ represents hydrogen, halogen, lower alkyl, lower alkoxy or acylamino, $R_{17}$ and $R_{18}$ each represent hydrogen or sulpho and $R_{19}$ and $R_{20}$ each represent hydrogen, methyl, chlorine or sulpho, and $R_3$ denotes hydrogen, a radical of an aliphatic carboxylic acid with 1 to 5 carbon atoms, a radical of an unsubstituted or substituted benzene-, pyridine-, furane- or thiophene-carboxylic acid or a radical of an unsubstituted or substituted benzenesulphonic acid.

Lower alkyl and alkoxy radicals $R_{15}$ and $R_{16}$ have 1 to 4 carbon atoms. By acylamino radicals $R_{16}$ there are to be understood radicals whereof the acyl part is derived from an aliphatic carboxylic acid with 1 to 5 carbon atoms or from a benzene-, pyridine-, furane- or thiophene-carboxylic acid which is unsubstituted or substituted by alkyl with 1 to 12 carbon atoms, halogenoalkyl with 1 to 12 carbon atoms, alkoxy with 1 to 4 carbon atoms, halogen, alkylcarbonyl, alkylsulphonyl, phenyl, nitro, acylamino or nitrile.

Azo dyestuffs of the formula

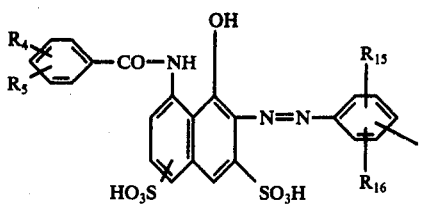 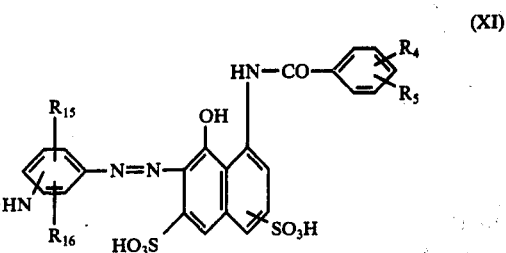

(XI)

wherein Y, $X_2$, $Z_2$, $R_{15}$ and $R_{16}$ have the abovementioned meanings, $R_4$ denotes hydrogen, halogen, unsubstituted or substituted alkyl, alkoxy, nitro, nitrile, carboxyl, sulpho, alkylcarbonyl, alkylsulphonyl or acylamino, and $R_5$ denotes hydrogen, halogen, alkyl or alkoxy, are of particular interest.

Possible substituents of an alkyl radical $R_4$ are, for example, hydroxyl groups or halogen atoms.

Azo dyestuffs of the formula

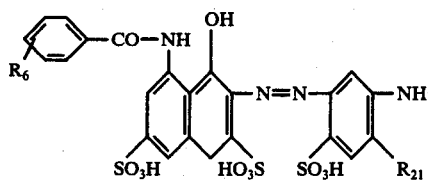 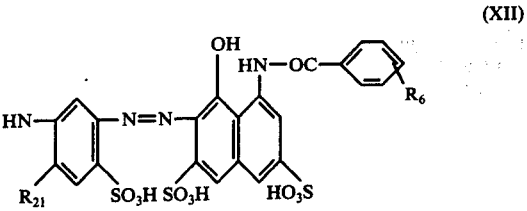

(XII)

wherein $Y_1$, $X_3$ and $Z_3$ have the abovementioned meanings and $R_6$ denotes hydrogen, chlorine, methyl, methoxy, nitrile or methylsulphonyl and $R_{21}$ denotes hydrogen, methyl or methoxy, have proved particularly suitable.

Azo dyestuffs of the formula

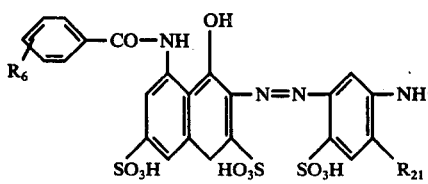 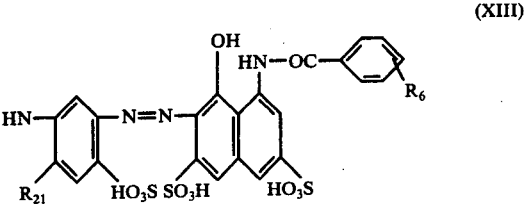

(XIII)

wherein $Y_2$, $X_3$, $Z_3$, $R_6$ and $R_{21}$ have the abovementioned meanings, are of particular interest.

The dyestuffs of the formulae (I) to (XIII) can not only, as indicated, be present in the form of their free acids, that is to say with HOOC— or $HO_3S$— groups, but also as salts. Depending on the conditions under which the dyestuffs are separated out, for example the selective pH value or the cation which the salt used for separating out the dyestuffs contains, the acid groups can be present as —$SO_3$— or —COO— cation groups, such as, for example, —$SO_3Na$, —$SO_3K$, (—$SO_3)_2Ca$, —COONa, —COOLi and —$COONH_4$. Thus the compounds are preferably salts of the alkaline earth group or especially of the alkali group.

The radicals $A_1$ in yellow dyestuffs of the formulae (I) to (V) are derived, for example, from the following amines: 2-aminonaphthalene-4,8-disulphonic acid, 2-amino-6-nitronaphthalene-4,8-disulphonic acid, 2-amino-6-chloronaphthalene-4,8-disulphonic acid, 2-aminonaphthalene-5,7-disulphonic acid, 1-aminonaphthalene-3,6-disulphonic acid, 2-aminonaphthalene-4,6,7-trisulphonic acid, 1-aminobenzene-3,5-dicarboxylic acid, 1-aminobenzene-2-sulphonic acid, 1-aminobenzene-2,5-disulphonic acid, 2-amino-6-acetylaminonaphthalene-4,8-disulphonic acid, 2-amino-6-n-valeroylaminonaphthalene-4,8-disulphonic acid, 2-amino-6-(4'-chlorobenzoylamino)-naphthalene-4,8-disulphonic acid, 2-amino-6-(pyridine-2'-carbonylamino)naphthalene-4,8-disulphonic acid, 2-amino-6(2'-furoylamino)naphthalene-4,8-disulphonic acid, 2-amino-6(2'-thenoylamino)naphthalene-4,8-disulphonic acid, 1-amino-4-methylbenzene-2-sulphonic acid, 1-amino-2-methoxyaniline-5-sulphonic acid, 4-amino-4'-acetylaminobenzidine-2-sulphonic acid, 2-amino-6-(4'-methylbenzoylamino)-naphthalene-4,8-disulphonic acid and 2-amino-6-benzoylamino-naphthalene-4,8-disulphonic acid.

The radicals $A_1$ in magenta dyestuffs of the formulae (I) and (VI) to (XXIII) are derived, for example, from the following amines and hydroxy compounds: 2-aminonaphthalene-6-sulphonic acid, 1-amino-8-hydroxynaphthalene-4- or -5- or -6-sulphonic acid, 1-amino-5-hydroxynaphthalene-7-sulphonic acid, 2-amino-5-hydroxynaphthalene-7-sulphonic acid, 2-aminonaphthalene-6-sulphonic acid, 2-hydroxynaphthalene-4- or -6- or -7-sulphonic acid, 2-hydroxynaphthalene-3,6- or 6,8-disulphonic acid, 1,7-dihydroxynaphthalene-3,6-disulphonic acid, 1,8-dihydroxynaphthalene-3,6-disulphonic acid, 1-amino-8-hydroxynaphthalene-2,4-disulphonic acid, 1-amino-8-hydroxynaphthalene-2,5-disulphonic acid, 1-amino-8-hydroxynaphthalene-2,6-disulphonic acid, 1-amino-8-hydroxynaphthalene-3,6-disulphonic acid, 1-amino-8-hydroxynaphthalene-4,6-disulphonic acid, 1-amino-8-hydroxynaphthalene-5,7-disulphonic acid, 1-benzoylamino-8-hydroxynaphthalene-3,6-disulphonic acid, 1-benzoylamino-8-hydroxynaphthalene-4,6-disulphonic acid, 1-(4'-chlorobenzoylamino)-8-hydroxynaphthalene-3,6-disulphonic acid, 1-(4'-bromobenzoylamino)-8-hydroxynaphthalene-3,6-disulphonic acid, 1-(3'-trifluoromethylbenzoylamino)-8-hydroxynaphthalene-3,6-disulphonic acid, 1-(4'-methoxybenzoylamino)-8-hydroxynaphthalene-3,6-disulphonic acid, 1-(4'-nitrobenzoylamino)-8-hydroxynaphthalene-3,6-disulphonic acid, 1-(4'-cyanobenzoylamino)-8-hydroxynaphthalene-3,6-disulphonic acid, 1-(3'-carboxybenzoylamino)-8-hydroxynaphthalene-3,6-disulphonic acid, 1-(3'-sulphobenzoylamino)-8-hydroxynaphthalene-3,6-disulphonic acid 1-(3'-acetylbenzoylamino)-8-hydroxynaphthalene-3,6-disulphonic acid, 1-(3'-methylsulphonylbenzoylamino)-8-hydroxynaphthalene-3,6-disulphonic acid, 1-(4'-formylaminobenzoylamino)-8-hydroxynaphthalene-3,6-disulphonic acid, 1(3',4'-dichlorobenzoylamino)-8-hydroxynaphthalene-3,6-disulphonic acid, 1-(3'-chloro-4'-methylbenzoylamino)-8-hydroxynaphthalene-3,6-disulphonic acid, 1-n-valeroylamino-8-hydroxynaphthalene-3,6-disulphonic acid, 1-(pyridine-4'-carbonylamino)-8-hydroxynaphthalene-3,6-disulphonic acid, 1-(2'-furoylamino)-8-hydroxynaphthalene-3,6-disulphonic acid, 1-(2'-thenoylamino)-8-hydroxynaphthalene-3,6-disulphonic acid, 1-(toluene-4'-sulphonylamino)-8-hydroxynaphthalene-3,6-disulphonic acid and 1-benzenesulphonylamino-8-hydroxynaphthalene-3,6-disulphonic acid.

The radicals $B_1$ in the formula (I) are derived from, for example, the following amines: aminobenzene, 1-amino-2- or -3-methylbenzene, 1-amino-2,5- or -2,6-dimethylbenzene, 1-amino- 2- or -3-methoxybenzene, 1-amino-2-ethoxybenzene, 1-amino-2-(2'-hydroxyethoxy)benzene, 1-amino-2-(2'-methoxyethoxy)-5-methylbenzene, 1-amino-3-acetylaminobenzene, 1-amino-3-propionylaminobenzene, 1-amino-3-isobutyrylaminobenzene, 1-amino-3-acetylamino-6-methylbenzene, 1-amino-3-n-valeroylamino-6-methylbenzene, 1-amino-3(3'-carboxy)propionylaminobenzene, 1-amino-2-acetylamino-5-methylbenzene, 1-amino-2-methyl-5-methoxybenzene, 1-amino-2-methoxy-5-methylbenzene, 1-amino-3-chlorobenzene, 1-amino-2-chloro-5-methoxybenzene, 1-amino-2-methoxy-5-chlorobenzene, 1-amino-2,5-dimethoxybenzene, 1-amino- 2,5-diethoxybenzene, 1-amino-2,5-diacetylaminobenzene, 1-amino-2-carboxymethylbenzene, 1-amino-2-carboxymethoxybenzene, 1-amino-3-(2'-carboxythenoylamino)benzene, 1-aminonaphthalene, 1-amino-4-nitrobenzene, 1-amino-4-nitrobenzene-2-sulphonic acid, 1-amino-4-nitrobenzene-3-sulphonic acid, 1-amino-5-nitrobenzene-2-sulphonic acid, 1-amino-4-acetylaminobenzene-2-sulphonic acid, 1-amino-5-acetylaminobenzene-2-sulphonic acid, 1-amino-2-methyl-4-nitrobenzene, 1-amino-2-trifluoromethyl-4-nitrobenzene, 1-amino-2-methoxy-4-nitrobenzene, 1-amino-2-chloro-4-nitrobenzene, 1-amino-2-cyano-4-nitrobenzene, 1-amino-5-methyl-4-nitrobenzene-2-sulphonic acid, 1-amino-5-methoxy-4-nitrobenzene-2-sulphonic acid, 1-amino-2,5-dimethoxy-4-nitrobenzene, 1-amino-4-methyl-5-nitrobenzene-2-sulphonic acid, 1-amino-2,3-dimethyl-4-nitrobenzene, 1-amino-2,5-diethoxy-4-nitrobenzene, 1-amino-2,5-di(2'-hydroxyethoxy)4-nitrobenzene, 1-amino-2,5-di(2'-methoxyethoxy)4-nitrobenzene, 1-amino-2-carboxy-4-nitrobenzene, 1-amino-2-carboxymethyl-4-nitrobenzene, 1-amino-2-phenoxy-4-nitrobenzene, 1-amino-2-(dimethylcarbonamido)4-nitrobenzene, 1-amino-2-methylsulphonyl-4-nitrobenzene, 1-amino-2(4'-methyl-2'-sulphophenylsulphonyl)4-nitrobenzene, 1-amino-2(4'-chloro-2'-carboxyphenylsulphonyl)4-nitrobenzene, 1-amino-3-methylmercapto-4-nitrobenzene, 1-amino-4-bromo-5-nitrobenzene-2-sulphonic acid, 1-amino-4-methoxy-5-nitrobenzene-2-sulphonic acid, 1-amino-4-acetylamino-5-nitrobenzene-2-sulphonic acid, 1-amino-4-acetylamino-5-methoxybenzene-2-sulphonic acid, 2-amino-5-nitrobenzenesulphonamide, 2-amino-5-nitro-(N-2'-hydroxyethyl)-benzenesulphonamide, 2-amino-5-nitro-(N-methyl-N-2'-sulphoethyl)-benzenesulphonamide, 2-amino-5-nitro-(N-phenyl)-benzenesulphonamide, 2-amino-5-nitro-(N-methyl-N-2'-carboxyphenyl)-benzenesulphonamide, N-acetylbenzidine, benzidine-3-sulphonic acid, 3,3'-dichlorobenzidine, 3,3'-dimethylbenzidine, 2-amino-6-nitronaphthalene-4,8-disulphonic acid, 1-amino-6-nitronaphthalene-4,8-disulphonic acid, 2-amino-7-nitronaphthalene-1,5-disulphonic acid and 2-amino-6-nitronaphthalene-8-sulphonic acid.

The radicals of the formula —OC—$X_1$—Y—$Z_1$—CO— are derived from, for example, the following dicarboxylic acids:

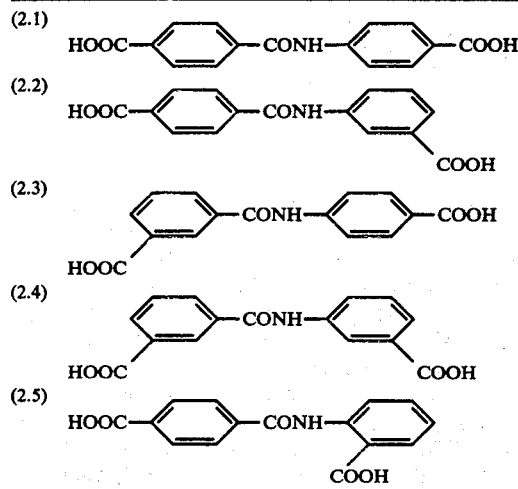

-continued
(2.6) 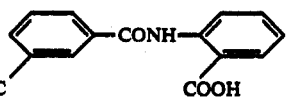
(2.7) 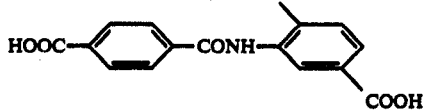
(2.8) 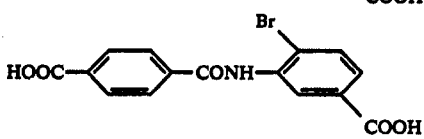
(2.9) 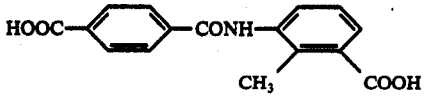
(2.10) 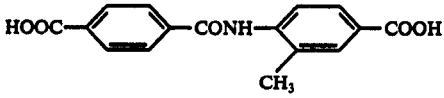
(2.11) 
(2.12) 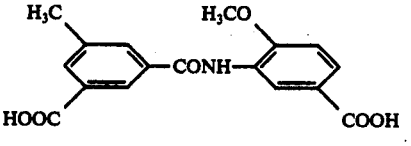
(2.13) 
(2.14) 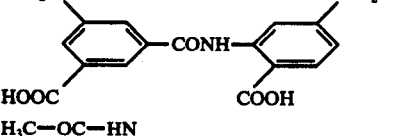
(2.15) 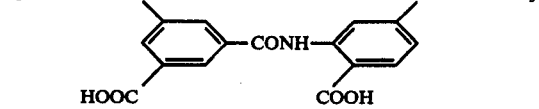
(2.16) 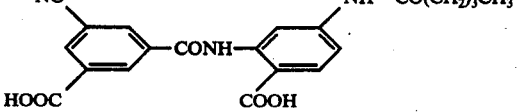
(2.17) 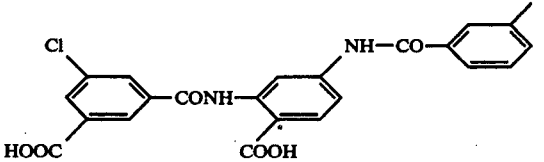
(2.18) 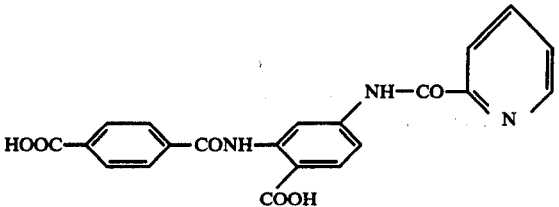

-continued
(2.19) 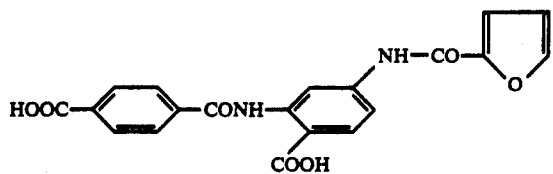
(2.20) 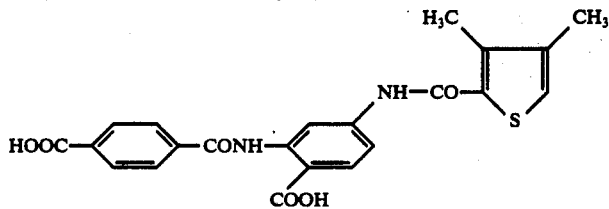
(2.21) 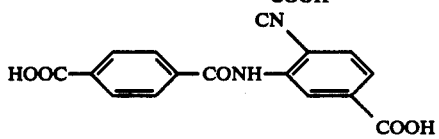
(2.22) 
(2.23) 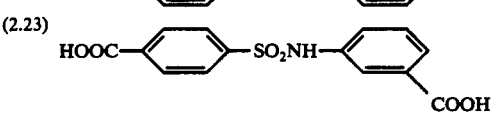
(2.24) 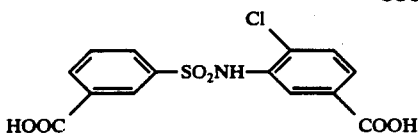
(2.25) 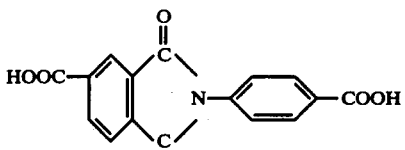
(2.26) 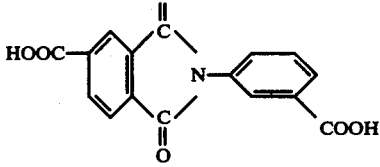
(2.27) 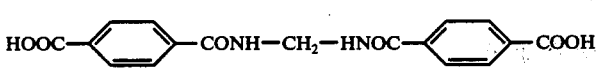
(2.28) 
(2.29) 
(2.30) 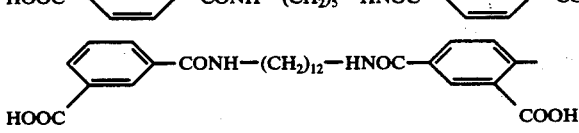
(2.31) 
(2.32) 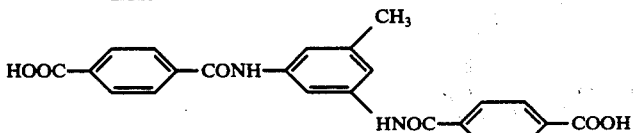
(2.33) 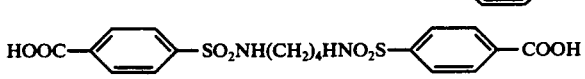

-continued
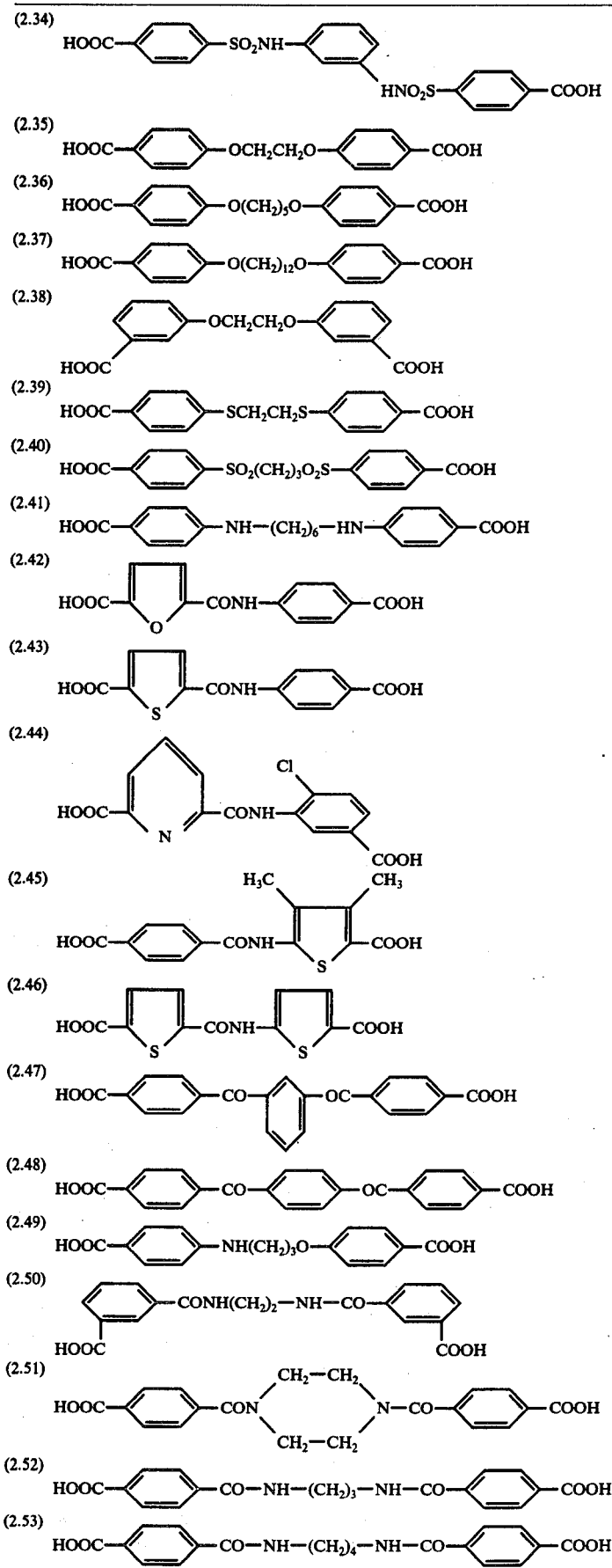

-continued (2.54) 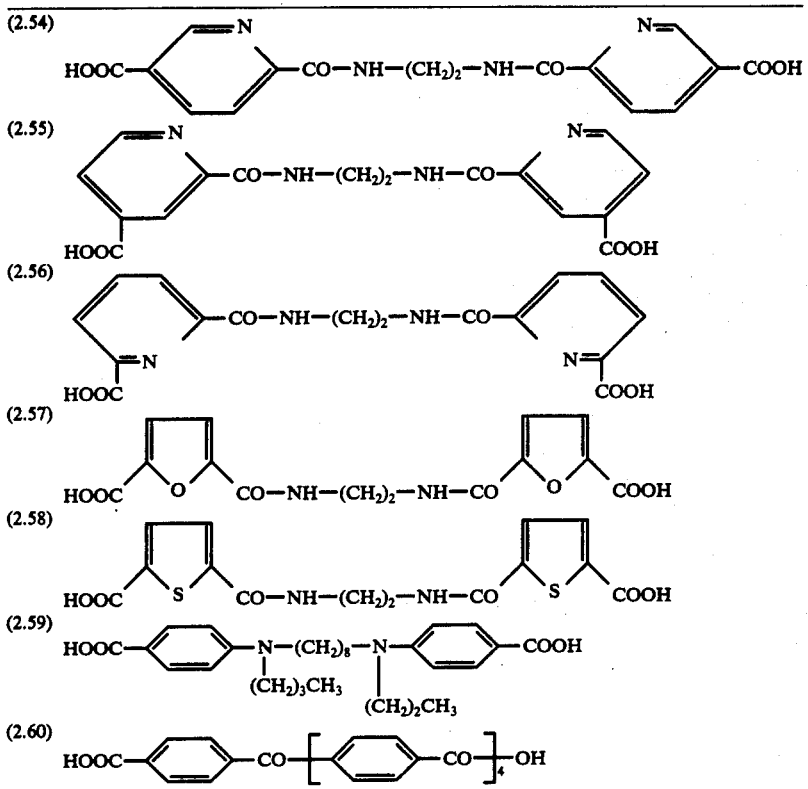
(2.55)
(2.56)
(2.57)
(2.58)
(2.59)
(2.60)

The dyestuffs of the formula (I) can be manufactured according to various processes which are in themselves known. One such process is characterised, for example, in that two mols of a compound of the formula

  (XIV)

wherein $A_1$ and $B_1$ have the indicated meanings, are condensed with dicarboxylic acid dihalides of the formula

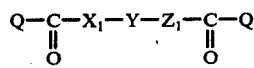  (XV)

wherein Q denotes a halogen atom and $X_1$, Y and $Z_1$ have the indicated meanings.

In the case where $A_1$ represents diazo component and $B_1$ represents a coupling component, an appropriate procedure is to diazotise a compound of the formula

  (XVI)

and couple the product, in an acid medium, with an amine of the formula

  (XVII)

wherein $A_1$ and $B_1$ have the indicated meanings. Here it is of advantage if any free hydroxyl groups which may be present are protected before the reaction by suitable protective groups which are subsequently split off again.

In the case where $A_1$ represents a coupling component and $B_1$ represents a diazo component, an appropriate procedure is to diazotise a compound of one of the formulae $H_2N—B_1—NO_2$  (XVIII)

or $H_2N—B_1—NH—U$  (XVIIIa)

wherein $B_1$ has the indicated meaning and U denotes a protective group which can be split off and couple the product with a compound of the formula $A_1—H$  (XIX)

After reduction of the nitro group or splitting off of the protective group, the compound of the formula (XIV) is obtained.

It is also possible to react a mixture of compounds of the formulae (XIV) with a dicarboxylic acid dihalide of the formula (XV).

Another process if characterised in that one mol of a tetrazo compound of a diamine of the formula $H_2N—B_1—NH—CO—X_1—Y—Z_1—OC—HN—B_1—NH_2$  (XX)

is reacted with 2 mols of a compound of the formula (XIX). In the formula (XX) $B_1$, $X_1$, Y and $Z_1$ have the abovementioned meanings.

A further process is characterised in that a diazo compound of an aminoazo dyestuff of the formula $H_2N—B_1—NH—OC—X_1—Y—Z_1—CO—HN—B_1—N=N—A_1$  (XXI)

wherein $A_1$, $B_1$, $X_1$, Y and $Z_1$ have the indicated meanings, is reacted with a compound of the formula (XIX).

The condensation of amines with dicarboxylic acid dihalides is carried out in accordance with methods which are in themselves known and is advantageously effected in a polar solvent such as water or in a polar organic solvent such as pyridine, methanol, glycol, diethylacetamide, dimethylformamide, N-methylpyrrolidone or N-methylcaprolactam.

It can also be of advantage to carry out the condensation in the presence of acid-binding agents such as, for example, tertiary amines or alkali carbonates. Solvents such as, for example, pyridine, themselves already act as acid-binding agents.

The manufacture of the dicarboxylic acid dihalides of the formula (XV) takes place in accordance with customary methods which are in themselves known.

The azo dyestuffs of the formula (I) can be used for various purposes, but especially in photographic materials and here particularly advantageously as dyestuffs for the dye bleach process. For this purpose the following dye bleach processes, for example, can be employed: diffusion transfer process with photo-sensitive ferric salts (German Pat. No. 1,422,917), metal bleach process using photosensitive metal complexes (Swiss Pat. No. 506,809), electrophotographic process (Swiss Pat. No. 1,431,277 or U.S. Pat. No. 3,172,826), dye bleach process in the presence of stannite (British patent specification No. 546,704), contact process (British patent specification No. 661,416) and others, such as, for example, the dye bleach process with complex salts of the first transition metal series. The dyestuffs of the formula (I) can be used with very particular advantage as image dyestuffs for the silver dye bleach process. In accordance therewith, valuable photographic materials can be manufactured in the customary manner, which is in itself known, and these materials contain, on an emulsion carrier, at least one layer with a dyestuff of the formula (I).

In particular, the disazo dyestuffs can be present in a multi-layer material which contains, on an emulsion carrier, a layer dyed with a cyan dyestuff which is selectively sensitive to red, on top of this a layer dyed magenta which is selectively sensitive to green and finally a layer dyed yellow which is selectively sensitive to blue.

Azo dyestuffs of the formula (I) can however also be used in only one or in two layers.

Dyestuffs of the formula (I) can be employed both in layers which are sensitive to blue and in layers which are sensitive to green, whilst dyestuffs of the formulae (II) to (V) are preferentially suitable for layers sensitive to blue and dyestuffs of the formulae (VI) to (XIII) are preferentially suitable for layers sensitive to green.

However, the dyestuffs of the formula (I) can also be incorporated into a "pseudo-sensitised" layer, into an auxiliary layer or, especially, into a layer adjacent to the light-sensitive layer.

The dyestuffs of the formula (I) can furthermore also be used for retouching purposes or as filter dyestuffs.

The azo dyestuffs of the formula (I) are extremely resistant to diffusion and at the same time easily soluble in water and insensitive to calcium ions, and can be bleached completely to white.

The azo dyestuffs according to the invention, of the formula (I), also offer diverse possibilities for varying the spectral properties and are distinguished by extremely pure and brilliant colour shades and by high colour strength. They are distinguished by high fastness to light and colorimetrically favourable shape of the absorption spectrum in visible light, which makes it possible to achieve suitable combinations which have grey shades which appear neutral to the eye over the entire density range.

Furthermore, due to the special structure of the radical $-X_1-Y-Z_1-$, they do not produce any increase in viscosity in gelatine solutions or in casting mixtures, containing emulsions, according to Use Example 1, in contrast to similar dyestuffs. Furthermore, the viscosity of the casting solution remains constant over several hours.

Finally, after the photographic processing according to Use Example 1, no initially colourless amines resulting from decomposition, which subsequently however frequently yellow under the influence of actinic light, are left in the gelatine layers.

In the manufacturing examples which follow, percentages are percentages by weight.

MANUFACTURING EXAMPLES

EXAMPLE 1

1.1.

274 g of 3-amino-4-chloro-benzoic acid methyl ester in 4,000 ml of ether are treated dropwise with 120 g of p-toluoyl chloride, whilst stirring. The mixture is stirred for 5 hours at room temperature. The ether is then largely distilled off and the residue is cooled to 10° C and filtered, whereupon 250 g of crude product are obtained.

This product is suspended in 1,000 ml of methanol and 300 ml of 35% strength hydrochloric acid are added at 65° C, followed immediately by 2,000 ml of ice water. The mixture is filtered and the product is washed with water until neutral and recrystallised from 5,000 ml of methanol.

Yield: 174 g of product of the formula

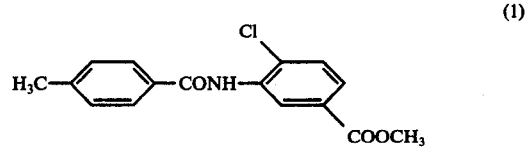

of melting point 147° C.

1.2.

54 g of the product thus obtained in 300 ml of methanol and 20 ml of 10 N sodium hydroxide solution are heated to the boil and 2,000 ml of water are then added gradually, whereby a clear solution is produced. Thereafter 50 ml of glacial acetic acid are added and the crystals which have separated out are filtered off and recrystallised from methanol.

Yield: 45 g of product of the formula

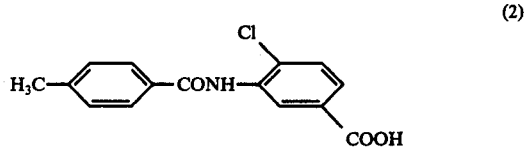

of melting point 233° C.

1.3.

50 g of this product are suspended in 300 ml of water and a solution of 66 g of potassium permanganate and 25 g of MgSO₄.H₂O in 1,300 ml of water is added dropwise whilst stirring on a steam bath. The mixture is stirred until the potassium permanganate has been completely consumed (approx. 3 to 4 hours), the manganese dioxide which has formed is filtered off and rinsed with 400 ml of hot water, and the filtrate is rendered acid to Congo Red with 35% strength hydrochloric acid. The crystals which have separated out are filtered off, washed with 300 ml of water and recrystallised from 120 ml of dimethylformamide.

Yield: 39 g of product of the formula

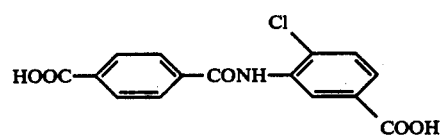
(3)

of melting point > 300° C.

1.4.

5.0 g of the dicarboxylic acid thus obtained in 75 ml of benzene are heated to the boil for 4 hours, after addition of 7.5 ml of thionyl chloride. A clear solution is produced, which is allowed to cool gradually. The crystals which have separated out are filtered off and successively washed with 30 ml of benzene and 30 ml of petroleum ether.

Yield: 3.9 g of product of the formula

-continued

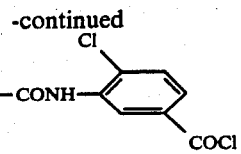

of melting point 172° C.

1.5.

1.7 g of aminomonoazo dyestuff of the formula

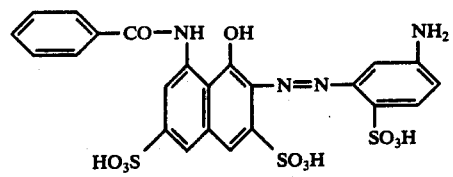
(5)

are dissolved in 75 ml of N-methylpyrrolidone and 2 ml of pyridine at 110° C and 1.5 g of the dicarboxylic acid dichloride obtained are gradually added at 100° to 110° C. After 15 minutes, the reaction mixture is diluted with 150 ml of isopropanol and the dyestuff which has separated out is filtered off, washed with 50 ml of ethanol and extracted with ethanol for 24 hours.

1.8 g of pure dyestuff of the formula (201) of Table II are obtained in the form of a red powder.

The dicarboxylic acid dichlorides of the formulae (6) to (10) listed in Table I below are obtained analogously to 1.1 – 1.4.

The remaining dyestuffs of Tables II to IV are obtained analogously to 1.5. from the acid chlorides of the formula (4) and the acid halides of Table I.

TABLE I

| Formula No. | Dicarboxylic acid dichloride | Melting point in ° C |
|---|---|---|
| (6) | ClOC—⟨benzene⟩—CONH—⟨benzene⟩—COCl | *) |
| (7) | ClOC—⟨benzene⟩—CONH—⟨benzene, COCl⟩ | 109 |
| (8) | ⟨benzene, ClOC⟩—CONH—⟨benzene, COCl⟩ | 150 |
| (9) | ⟨benzene, ClOC⟩—CONH—⟨benzene, Cl, COCl⟩ | 123 |
| (10) | ClOC—⟨benzene⟩—SO₂NH—⟨benzene, COCl⟩ | 108 |
| (11) | ClOC—⟨phthalimide⟩—N—⟨benzene, COCl⟩ | 191 |
| (12) | ClOC—⟨benzene⟩—OCH₂CH₂O—⟨benzene⟩—COCl | 128 |

TABLE I-continued

| Formula No. | Dicarboxylic acid dichloride | Melting point in °C |
|---|---|---|
| (13) | ClOC—⟨C₆H₄⟩—O(CH₂)₅O—⟨C₆H₄⟩—COCl | 100 |
| (14) | ClOC—⟨C₆H₄⟩—O(CH₂)₁₂O—⟨C₆H₄⟩—COCl | |
| (15) | ClOC—⟨C₆H₄⟩—CO—⟨C₆H₄⟩—OC—⟨C₆H₄⟩—COCl | 132 |
| (16) | ClOC—⟨C₆H₄⟩—CO—⟨C₆H₄⟩—OC—⟨C₆H₄⟩—COCl | *) |
| (17) | ClOC—⟨C₆H₄⟩—CONH—CH₂CH₂—HNOC—⟨C₆H₄⟩—COCl | 150 |
| (18) | ClOC—⟨C₆H₄⟩—CONH—(CH₂)₃—HNOC—⟨C₆H₄⟩—COCl | 42 |
| (19) | ClOC—⟨C₆H₄⟩—CONH—(CH₂)₄—HNOC—⟨C₆H₄⟩—COCl | 182 |
| (20) | ClOC—⟨pyridine⟩—CONH—(CH₂)₂—HNCO—⟨pyridine⟩—COCl | 180 |
| (21) | ClOC—⟨pyridine⟩—CONH—(CH₂)₂—HNOC—⟨pyridine⟩—COCl | 155 |
| (22) | ClOC—⟨C₆H₄⟩—CONH—(CH₂)₂—HNOC—⟨C₆H₄⟩—COCl (meta) | 180 |
| (23) | ClOC—⟨thiophene⟩—CONH—(CH₂)₂—HNOC—⟨thiophene⟩—COCl | 120 |
| (24) | ClOC—⟨furan⟩—CONH—(CH₂)₂—HNOC—⟨furan⟩—COCl | 218 |
| (25) | ClOC—⟨C₆H₄⟩—CON(CH₂CH₂)₂NCO—⟨C₆H₄⟩—COCl | 242 |

EXAMPLE 2

2.1.

6.9 g of trimellitic anhydride and 6.9 g of 3-aminobenzoic acid are stirred into a melt of 30 g of diphenyl at 240° to 250° C. After 15 minutes 200 ml of dimethylformamide are stirred into the reaction mixture, the whole is cooled to 0°-2° C and the crystals which have separated out are filtered off and rinsed with 2 ml of dimethylformamide.

For purification, the resulting crude product is dissolved in 120 ml of dimethylformamide, the solution is filtered out and the product is precipitated from the filtrate by means of 1,000 ml of ethanol. It is filtered off, washed three times with 200 ml of ethanol at a time and recrystallised from pyridine, and pure product of the formula (26)

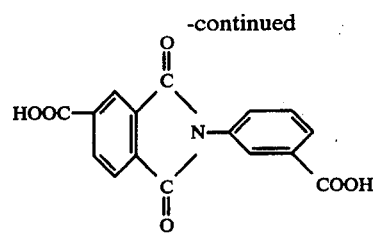

is obtained in good yield.

2.2.

8.6 g of the resulting dicarboxylic acid, in 139 ml of toluene and 103 g of phosphorus pentachloride, are heated to the boil for 3 hours, whereupon a clear solution is obtained. The solution is cooled to 0° C and the crystals which have separated out are filtered off and rinsed with a little toluene. Recrystallisation from toluene yields 7.4 g of dicarboxylic acid dichloride of the formula (11) of Table I, of melting point 191° C.

EXAMPLE 3

3.1.

15.2 g of 4-hydroxybenzoic acid methyl ester and 7.0 g of potassium carbonate are dissolved in 25 ml of cyclohexanone and 9.4 g of ethylene bromide are added over the course of 5 minutes in a nitrogen atmosphere, whilst stirring. The reaction mixture is stirred under nitrogen for 36 hours at 85° C and is then poured into 20 ml of methanol, 30 ml of water are added at 60° C and the solution is filtered whilst still hot, whereupon 8.7 g of product of the formula

(27)

crystallise out from the filtrate in the form of a white powder of melting point 164° C (decomposition).

3.2.

34.0 g of the ester thus obtained in 170 ml of 30% strength potassium hydroxide solution are stirred for 72 hours at 85° to 90° C. The mixture is poured into 400 ml of water, the whole is heated to the boil and filtered after adding a little fuller's earth, and after acidification with 335% strength hydrochloric acid 28.1 g of product of the formula

(28)

are obtained in the form of a white powder of melting point > 300° C.

3.3.

If an analogous procedure to 1.4. is followed 28.0 g of the above acid yield 25.1 g of acid chloride of the formula (12) of Table I, of melting point 128° C, in the form of fine, white needles.

The acid chlorides of the formulae (13) and (14) of Table I are obtained analogously to 3.1.–3.3.

EXAMPLE 4

4.1.

Oxidation of the compound of the formula

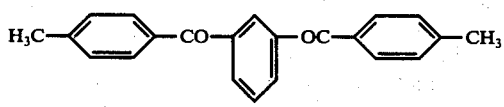
(29)

in the usual manner with potassium permanganate yields the dicarboxylic acid of the formula

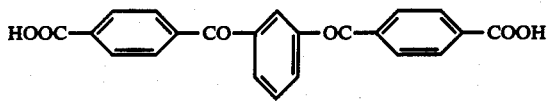
(30)

which on heating with phosphorus pentachloride yields the acid chloride of the formula (15) of Table I.

The acid chloride of the formula (16) of Table I is obtained analogously to 4.1

EXAMPLE 5

5.1.

41.0 g of terephthalic acid monomethyl ester monochloride are dissolved in 300 ml of acetone at 5° to 10° C. After adding 17.0 g of solid sodium bicarbonate a solution of 6.8 ml of ethylene diamine in 50 ml of acetone is added.

The mixture is stirred for 2 hours at 5° C, 3 hours at 20° C and 1 hour longer at the reflux temperature. After cooling, the reaction mixture is introduced into 1,200ml of ice water. The precipitate is filtered off, washed with ice water, dried and recrystallised from 350 ml of dimethylformamide and 300 ml of n-butanol. 24.7 g of product of the formula

(31)

are obtained in the form of colourless crystals of melting point 307° C.

5.2.

48.0 g of ester of the above formula are suspended in a mixture of 540 ml of water, 146 ml of 2 N sodium hydroxide solution and 270 ml of ethanol and the mixture is stirred for 20 minutes under reflux, whereupon a clear solution is produced. The reaction mixture is then added to 2,300 ml of 0.7 N hydrochloric acid. The precipitate which has separated out is filtered off and washed by twice suspending it in 600 ml of ice water each time.

43.0 g of product of the formula

(32)

are obtained in the form of white crystals of melting point > 300° C.

5.3.

3.6 g of dicarboxylic acid of the above formula are suspended in 50 ml of benzene. 0.4 ml of dimethylformamide and 10 ml of thionyl chloride are added and the mixture is heated to the boil and stirred until the evolution of gas has ceased. The reaction mixture is filtered hot and 25 ml of petroleum ether (boiling point 35° to 75° C) are added. After completion of the crystallisation, the crystals are rapidly filtered off, washed with petroleum ether and dried in vacuo over phosphorous pentoxide. 3.5 g of product of the formula (17) of Table I are obtained in the form of white needles of melting point 150° C.

The acid chlorides of the formulae (18) to (25) of Table I are obtained analogously.

In Tables II, III and IV below:
Column (1) denotes: Dyestuff No.
Column (2) denotes: Position of the —NH— group in the benzene radical, relative to the azo group.
Column (3) denotes: Absorption maximum in nm
 a. measured in dimethylformamide-water (1:1)
 b. measured in gelatine

TABLE II

Formula (200): bis-azo dye with naphthalene bearing $R_{24}$—HN—, OH, $R_{25}$, $SO_3H$, azo-linked to benzene with $R_{26}$, $R_{27}$, NH—$D_1$, taken as $[\ldots]_2$—$D_1$.

| (1) | $R_{24}$ | $R_{25}$ | (2) | $R_{26}$ | $R_{27}$ | $D_1$ | (3)(a) | (3)(b) |
|---|---|---|---|---|---|---|---|---|
| 201 | C₆H₅—CO | 3-SO₃H | 5 | SO₃H | H | —OC—C₆H₄—CONH—(2-Cl,5-)C₆H₃—CO— | 516 +542 | 524 +553 |
| 202 | C₆H₅—CO | 3-SO₃H | 5 | SO₃H | H | —OC—C₆H₄—CONH—C₆H₄—CO— | 516 +543 | 523 +552 |
| 203 | 4-Cl—C₆H₄—CO | 3-SO₃H | 5 | SO₃H | H | —OC—C₆H₄—CONH—(2-Cl,5-)C₆H₃—CO— | 517 +543 | 525 +555 |
| 204 | 3,4-Cl₂—C₆H₃—CO | 3-SO₃H | 5 | SO₃H | H | —OC—C₆H₄—CONH—(2-Cl,5-)C₆H₃—CO— | 517 +543 | 522 +555 |
| 205 | 4-CH₃SO₂—C₆H₄—CO | 3-SO₃H | 5 | SO₃H | H | —OC—C₆H₄—CONH—(2-Cl,5-)C₆H₃—CO— | 518 +544 | 527 +555 |
| 206 | C₆H₅—CO | 3-SO₃H | 5 | SO₃H | H | 1,3-bis(4-CO—C₆H₄—CO—O—)C₆H₄ | 514 +540 | 521 +540 |
| 207 | C₆H₅—SO₂ | 3-SO₃H | 5 | SO₃H | H | 1,3-bis(4-CO—C₆H₄—CO—O—)C₆H₄ | 508 +533 | 515 +540 |

TABLE II-continued (200)

[Structure: R24-HN, OH, N=N, NH-, R26, R27, R25, SO3H, D1]2

| (1) | R24 | R25 | (2) | R26 | R27 | D1 | (3)(a) | (3)(b) |
|---|---|---|---|---|---|---|---|---|
| 208 | 4-Cl-C6H4-CO | 3-SO3H | 5 | SO3H | H | Two -CO-C6H4- groups linked via -O- to 1,3-phenylene | 515 + 542 | 527 + 568 |
| 209 | C6H5-CO | 3-SO3H | 5 | SO3H | H | Two -CO-C6H4- groups linked via -O- to 1,4-phenylene | 515 + 541 | 524 + 554 |
| 210 | C6H5-CO | 4-SO3H | 5 | SO3H | H | Two -CO-C6H4-O- groups linked by (CH2)5 | 513 + 537 | 522 + 548 |
| 211 | CH3SO2-C6H4-CO | 3-SO3H | 5 | SO3H | H | Two -CO-C6H4-O- groups linked by (CH2)5 | 518 + 544 | 531 + 570 |
| 212 | CH3SO2-C6H4-CO | 4-SO3H | 5 | SO3H | H | Two -CO-C6H4-O- groups linked by (CH2)5 | 515 + 539 | 530 + 567 |
| 213 | H11C5CO | 3-SO3H | 5 | SO3H | 4-OCH3 | Two -CO-C6H4-O- groups linked by (CH2)5 | 527 + 551 | 540 + 569 |
| 214 | C6H5-SO2 | 3-SO3H | 5 | SO3H | H | Two -CO-C6H4-O- groups linked by (CH2)5 | 510 + 535 | 519 + 545 |

TABLE II-continued $$\left[\begin{array}{c} R_{24}-HN \quad OH \\ \phantom{R_{24}-HN}\diagup\diagdown N=N-\diagup\diagdown-NH- \\ R_{25} \quad SO_3H \quad R_{26} \quad R_{27} \end{array}\right]_2 D_1 \quad (200)$$

| (1) | $R_{24}$ | $R_{25}$ | (2) | $R_{26}$ | $R_{27}$ | $D_1$ | (3)(a) | (3)(b) |
|---|---|---|---|---|---|---|---|---|
| 215 | 4-Cl-C$_6$H$_4$-SO$_2$- | 3-SO$_3$H | 5 | SO$_3$H | H | -CO-C$_6$H$_4$-O(CH$_2$)$_5$O-C$_6$H$_4$-CO- | 510 + 535 | 519 + 545 |
| 216 | C$_6$H$_5$-CO- | 4-SO$_3$H | 5 | SO$_3$H | 4-OCH$_3$ | -CO-C$_6$H$_4$-O(CH$_2$)$_5$O-C$_6$H$_4$-CO- | 531 + 556 | 551 + 591 |
| 217 | C$_6$H$_5$-CO- | 3-SO$_3$H | 5 | SO$_3$H | 4-OCH$_3$ | -CO-C$_6$H$_4$-O(CH$_2$)$_5$O-C$_6$H$_4$-CO- | 536 + 563 | 549 + 578 |
| 218 | CH$_3$SO$_2$-C$_6$H$_4$-CO- | 4-SO$_3$H | 5 | SO$_3$H | 4-OCH$_3$ | -CO-C$_6$H$_4$-O(CH$_2$)$_5$O-C$_6$H$_4$-CO- | 533 + 560 | 554 + 601 |
| 219 | C$_6$H$_5$-SO$_2$- | 3-SO$_3$H | 5 | SO$_3$H | 4-OCH$_3$ | -CO-C$_6$H$_4$-O(CH$_2$)$_5$O-C$_6$H$_4$-CO- | 530 + 552 | 542 + 568 |
| 220 | C$_6$H$_5$-CO- | 3-SO$_3$H | 5 | SO$_3$H | 4-OCH$_3$ | OC-C$_6$H$_4$-CO-C$_6$H$_4$(1,3)-O-C$_6$H$_4$-CO | 535 + 564 | 549 + 575 |
| 221 | C$_6$H$_5$-SO$_2$- | 3-SO$_3$H | 5 | SO$_3$H | H | OC-C$_6$H$_4$-CONH-(2-Cl,5-CO)C$_6$H$_3$ | 509 + 534 | 516 + 542 |
| 222 | C$_6$H$_5$-CO- | 3-SO$_3$H | 5 | SO$_3$H | 4-OCH$_3$ | OC-C$_6$H$_4$-CONH-(2-Cl,5-CO)C$_6$H$_3$ | 535 + 563 | 545 + 581 |
| 223 | C$_6$H$_5$-CO- | 4-SO$_3$H | 5 | SO$_3$H | 4-OCH$_3$ | OC-C$_6$H$_4$-CONH-(2-Cl,5-CO)C$_6$H$_3$ | 532 + 557 | 538 + 572 |

TABLE II-continued

Structure (200):

$$\left[ \begin{array}{c} R_{24}-HN \quad OH \\ \phantom{xxx} \diagdown \phantom{xxx} \diagup \\ \phantom{xxxxxx} N=N-\!\!\!\!-\!\!\!\!-\!\!\!\!-NH-\!\!\!\!- \\ R_{25} \quad SO_3H \quad R_{26} \quad R_{27} \end{array} \right]_2 D_1$$

| (1) | $R_{24}$ | $R_{25}$ | (2) | $R_{26}$ | $R_{27}$ | $D_1$ | (3)(a) | (3)(b) |
|---|---|---|---|---|---|---|---|---|
| 224 | C₆H₅—SO₂— | 3-SO₃H | 5 | SO₃H | 4-OCH₃ | OC—C₆H₄—CONH—C₆H₃(Cl)—CO | 530+552 | 540+564 |
| 225 | CH₃SO₂—C₆H₄—CO— | 4-SO₃H | 5 | SO₃H | H | OC—C₆H₄—CONH—C₆H₃(Cl)—CO | 514+538 | 525+557 |
| 226 | CH₃SO₂—C₆H₄—CO— | 4-SO₃H | 5 | SO₃H | 4-OCH₃ | OC—C₆H₄—CONH—C₆H₃(Cl)—CO | 533+560 | 548+575 |
| 227 | CH₃SO₂—C₆H₄—CO— | 3-SO₃H | 5 | SO₃H | H | OC—C₆H₄—CONH—C₆H₄—CO | 517+544 | 528+561 |
| 228 | H₁₁C₅CO— | 3-SO₃H | 5 | SO₃H | 4-OCH₃ | OC—C₆H₄—CONH—C₆H₄—CO | 527+551 | 542+568 |
| 229 | C₆H₅—SO₂— | 3-SO₃H | 5 | SO₃H | H | OC—C₆H₄—CONH—C₆H₄—CO | 509+534 | 518+543 |
| 230 | CH₃SO₂—C₆H₄—CO— | 4-SO₃H | 5 | SO₃H | 4-OCH₃ | OC—C₆H₄—CONH—C₆H₄—CO | 532+559 | 549+587 |
| 231 | C₆H₅—SO₂— | 3-SO₃H | 5 | SO₃H | 4-OCH₃ | OC—C₆H₄—CONH—C₆H₄—CO | 530+553 | 537+564 |
| 232 | C₆H₅—CO— | 4-SO₃H | 5 | SO₃H | 4-OCH₃ | OC—C₆H₄—CONH—C₆H₄—CO | 531+557 | 546+583 |
| 233 | C₆H₅—CO— | 3-SO₃H | 5 | SO₃H | 4-OCH₃ | OC—C₆H₄—CONH—C₆H₄—CO | 535+563 | 554+591 |
| 234 | C₆H₅—CO— | 3-SO₃H | 5 | SO₃H | H | OC—C₆H₄—CONH—CH₂CH₂—HNOC—C₆H₄—CO | 516+542 | 522+550 |

TABLE II-continued (200)

$$\left[ R_{24}-HN \underset{R_{25}}{\overset{OH}{\bigcirc\bigcirc}} \underset{SO_3H}{-N=N-} \underset{R_{26}}{\bigcirc} \underset{R_{27}}{-NH-} \right]_2 D_1$$

| (1) | $R_{24}$ | $R_{25}$ | (2) | $R_{26}$ | $R_{27}$ | $D_1$ | (3) (a) | (b) |
|---|---|---|---|---|---|---|---|---|
| 235 | C₆H₅—CO | 4-SO₃H | 5 | SO₃H | H | OC—C₆H₄—CONH—CH₂CH₂—HNOC—C₆H₄—CO | 513 + 536 | 534 + 572 |
| 236 | C₆H₅—CO | 3-SO₃H | 5 | SO₃H | H | OC—C₆H₄(meta)—CONH—C₆H₃(Cl)—CO | 516 + 542 | 526 + 552 |

TABLE III (250)

$$\left[ \underset{R_{28}}{\overset{HO_3S}{\bigcirc\bigcirc}} \underset{SO_3H}{-N=N-} \underset{R_{29}}{\bigcirc} \underset{R_{30}}{-NH-} \right]_2 D_2$$

| (1) | $R_{28}$ | $R_{29}$ | $R_{30}$ | $D_2$ | (3) (a) | (b) |
|---|---|---|---|---|---|---|
| 251 | H | CH₃ | OCH₃ | OC—C₆H₄—OCH₂CH₂O—C₆H₄—CO | 401 | 408 |
| 252 | H | NH—COCH₃ | H | OC—C₆H₄—C₆H₄(CONH)—CO | 394 | 405 |
| 253 | H | CH₃ | OCH₃ | OC—C₆H₄—C₆H₄(CONH)—CO | 397 | 410 |
| 254 | H | NH—COCH₃ | H | OC—C₆H₄—CONH—C₆H₃(Cl)—CO | 394 | 401 |
| 255 | H | CH₃ | OCH₃ | OC—C₆H₄—CONH—C₆H₃(Cl)—CO | 397 + 410 | 410 |
| 256 | CH₃CONH | CH₃ | OCH₂HOCH₂ | OC—C₆H₄—OCH₂CH₂O—C₆H₄—CO | 405 | 411 |
| 257 | CH₃CONH | CH₃ | OCH₂HOCH₂ | OC—C₆H₄—CONH—CH₂CH₂—HNOC—C₆H₄(CO)—CO | 402 + 416 | 411 |

TABLE III-continued

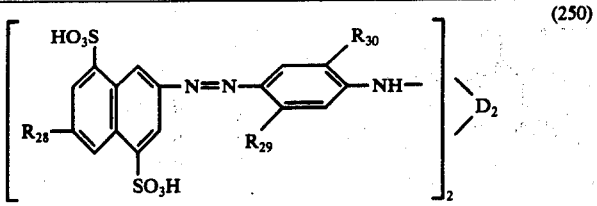

| (1) | $R_{28}$ | $R_{29}$ | $R_{30}$ | $D_2$ | (3) (a) | (b) |
|---|---|---|---|---|---|---|
| 258 | CH$_3$–COCH$_3$ | CH$_3$ | OCH$_2$–HOCH$_2$ | OC–⟨⟩–OCH$_2$CH$_2$O–⟨⟩–CO | 410 | 424 |

TABLE IV

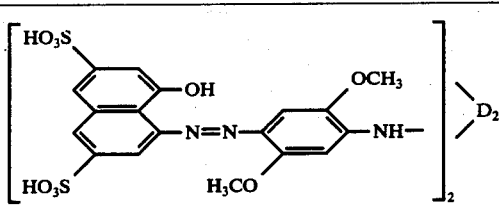

| (1) | $D_2$ | (3) (a) | (b) |
|---|---|---|---|
| 291 | OC–⟨⟩–CONH–CH$_2$CH$_2$–HNOC–⟨⟩–CO | 509 | 471 |

USE EXAMPLES

EXAMPLE 1

3.3 ml of 6% strength gelatine solution, 2.0 ml of 1% strength aqueous solution of the hardener of the formula

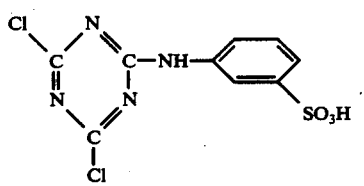

(301)

1.0 ml of 1% aqueous solution of the magenta dyestuff of the formula (201) and 3.3 ml of silver bromide emulsion containing 35 g of silver per liter are pipetted into a test tube and made up to 10.0 ml with deionised water. This solution is vigorously mixed and kept in a water bath at 40° C for 5 minutes.

The casting solution at 40° C is cast on a substrated glass plate of size 13 cm × 18 cm. After setting at 10° C, the plate is dried in a drying cabinet by means of circulating air at 32° C.

A strip cut to 3.5 cm × 18 cm is exposed for 3 seconds with 50 Lux/cm² under a step wedge, through a Kodak 2b + 49 blue filter.

Thereafter the material is further processed as follows:

1. 10 minutes developing in a bath which per liter contains 1 g p-methylaminophenol sulphate, 20 g of ahydrous sodium sulphite, 4 g of hydroquinone, 10 g of anhydrous sodium carbonate and 2 g of potassium bromide;
2. 2 minutes soaking;
3. 6 minutes stop-fixing in a bath which per liter contains 200 g of crystalline sodium thiosulphate, 15 g of anyydrous sodium sulphite, 25 g of crystalline sodium acetate and 13 ml of glacial acetic acid;
4. 8 minutes soaking;
5. 20 minutes dye-bleaching in a bath which per liter contains 27.5 ml 96% strength sulphuric acid, 10 g of potassium iodide and 15 ml of a solution of 0.3 g of 2,3-dimethyl-6-aminoquinoxaline in 50 ml of ethanol;
6. 4 minutes soaking;
7. 8 minutes bleaching of residual silver in a bath which per liter contains 50 g of potassium ferricyanide, 15 g of potassium bromide, 10 g of disodium phosphate and 14 g of monosodium phosphate;
8. 6 minutes soaking;
9. 6 minutes fixing as indicated under (3);
10. 10 minutes soaking;

A brilliant, light-fast magenta wedge is obtained, which is completely bleached to white in the position of what was originally the greatest density of silver.

Similar results are obtained on using one of the remaining dyestuffs of Tables II to IV.

EXAMPLE 2

The following layers are successively applied to an opaque white acetate film provided with an adhesive layer:

1. Red-sensitive silver bromide emulsion in gelatine, containing the cyan dyestuff of the formula (302)

-continued

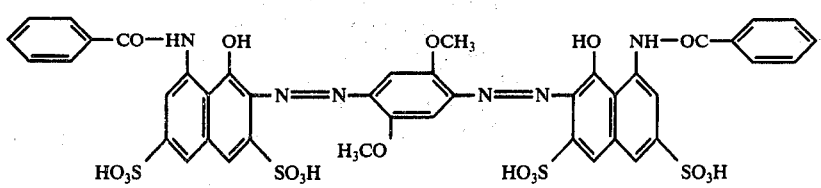

2. Colourless gelatine without silver halide.
3. Green-sensitive silver bromide emulsion in gelatine, containing the magenta dyestuff of the formula (210).
4. Blue-sensitive silver bromide emulsion in gelatine, containing the yellow dyestuff of the formula (303)

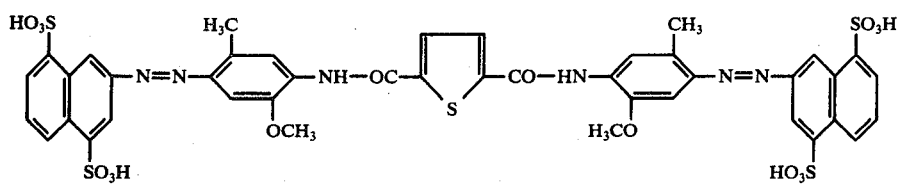

The gelatine layers can furthermore contain additives, such as wetting agents, hardeners and stabilisers for the silver halide. In other respects the procedure followed is such that the individual layers contain, per square meter of film, 0.5 g of the particular dyestuff and the amount of silver bromide corresponding to 1–1.2 g of silver.

This film is exposed with red, green and blue copying light under a coloured diapositive. Thereafter the copy is developed in accordance with the instruction given in Example 1.

A light-resistant, document-quality positive direct-viewing image is obtained.

Similar results are obtained if instead of the dyestuff of the formula (210) another dyestuff of Table II is used.

Instead of the yellow dyestuff of the formula (303) it is also possible to use one of the dyestuffs of the formulae (251) to (258) of Table III.

EXAMPLE 3

3.3 ml of 6% strength gelatine solution, 2.0 ml of 1% strength aqueous solution of the hardener of the formula (301), 3.3 ml of silver bromide emulsion, containing 35 g of silver per liter, and 1.4 ml of deionised water are pipetted into a test tube.

The whole is thoroughly mixed and kept at 40° C in a water bath for 5 minutes.

The casting solution at 40° C is cast on a substrated glass plate of size 13 cm × 18 cm. After setting at 10° C, the plate is dried in a drying cabinet by means of circulating air at 32° C.

A mixture of 3.3 ml of 6% strength gelatine solution, 2.0 ml of 1% strength aqueous solution of the hardener of the formula (301), 0.5 ml of 1% strength aqueous solution of the magenta dyestuff of the formula (211) and 4.2 ml of deionised water is than cast onto the dried layer at 40° C.

The new layer is left to set and dry as indicated above.

A strip cut to 3.5 cm × 18 cm is exposed for 10 seconds with 50 Lux/cm² under a step wedge through a Kodak 2b + 49 blue filter.

Thereafter the procedure described in Example 1 is followed.

A brilliant, very light-fast magenta wedge is obtained, which is completely bleached to white in the position of what was originally the greatest density of silver.

Similar results are obtained if instead of the dyestuff of the formula (211) another dyestuff of Table II is used.

EXAMPLE 4

A test strip manufactured according to Example 1 and exposed according to Example 1 is processed as follows:

1. 5 minutes developing in a bath which per liter contains 1 g of p-methylaminophenol sulphate, 20 g of anhydrous sodium sulphite, 4 g of hydroquinone, 10 g of anhydrous sodium carbonate, 2 g of potassium bromide and 3 g of sodium thiocyanate;
2. 2 minutes soaking;
3. 2 minutes treatment in a reversal bath which contains, per liter, 5 g of potassium bichromate and 5 ml of 96% strength sulphuric acid;
4. 4 minutes soaking;
5. 5 minutes treatment in a bath which per liter contains 50 g of anhydrous sodium sulphite;
6. 3 minutes soaking;
7. 4 minutes developing a bath which per liter contains 2 g of 1-phenyl-3-pyrazolidone, 50 g of anhydrous sodium sulphite, 10 g of hydroquinone, 50 g of anhydrous sodium carbonate, 2 g of sodium hexametaphosphate and 20 ml of a 1% strength aqueous solution of tert.-butylaminoborane;
8. 2 minutes soaking;
9. further treatment as indicated under (5) to (10) in Example 1.

A brilliant, highly light-fast magenta wedge running counter to the original is obtained.

Similar results are obtained on using one of the other dyestuffs of Table II.

We claim:
1. Azo dyestuff of the formula

(XI)

-continued

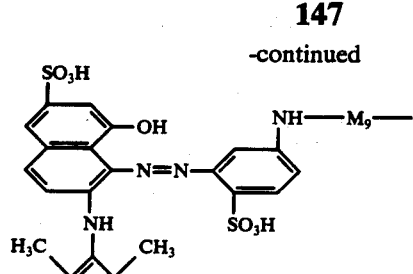

wherein $M_9$ denotes benzophenone-4,4'-dicarbonyl, diphenylsulphone-4,4'-dicarbonyl, naphthalene-2,6-dicarbonyl, N-benzoylaniline-3,4'-dicarbonyl, N-benzoyl-2-chloroaniline-5,4'-dicarbonyl, 1,2-diphenoxyethane- 3',3''- or -4',4''-dicarbonyl or N,N'-dibenzoylethylenediamine- 4,4'-dicarbonyl.

2. Azo dyestuff according to claim 1, of the formula (XI)

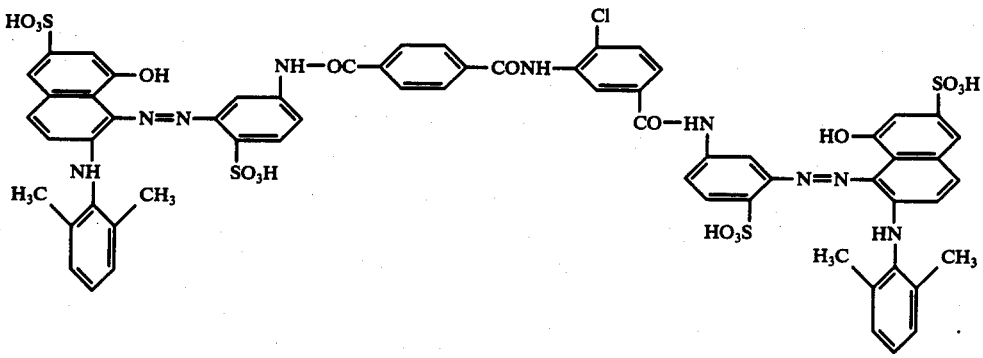

3. Azo dyestuff according to claim 1, of the formula (XII)

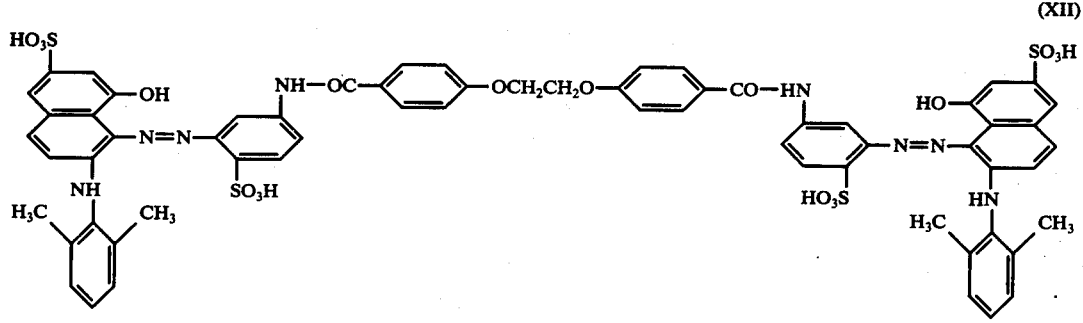

4. Azo dyestuff of the formula (XIV)

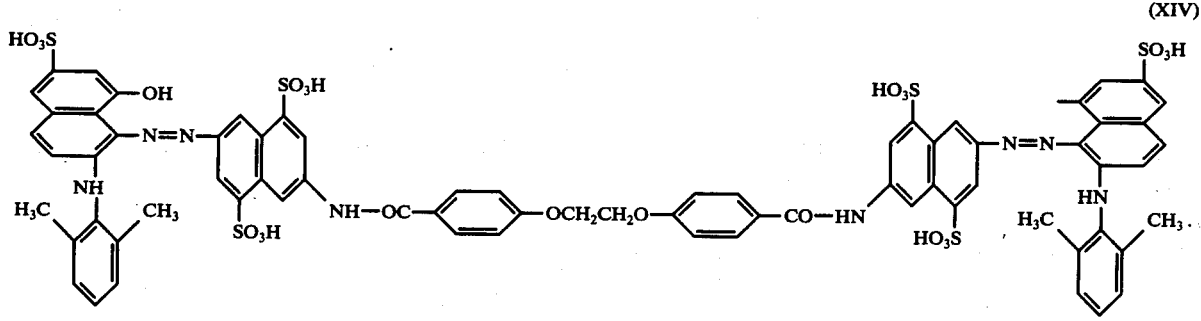

5. Azo dyestuff of the formula (XI)

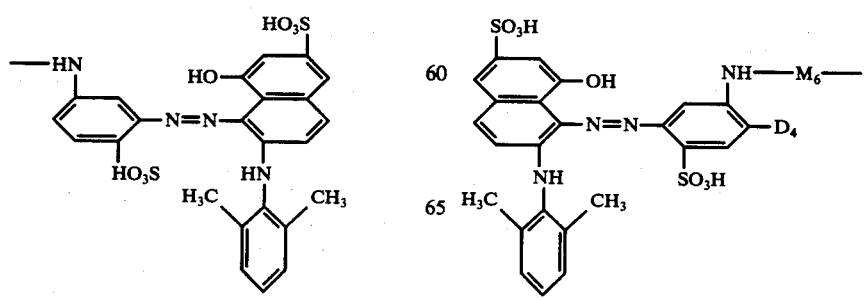

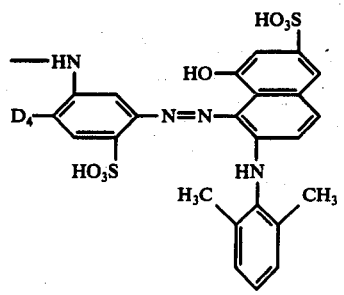

wherein D₄ denotes methyl or methoxy and M₆ denotes terephthaloyl, benzophenone-4,4'-dicarbonyl, diphenyl-sulphone-4,4'-dicarbonyl, naphthalene-2,6-dicarbonyl, N-benzoylaniline-3,4'-dicarbonyl, N-benzoyl-2-chloroaniline-5,4'-dicarbonyl, 1,2-diphenoxyethane-3',3''- or -4',4''-dicarbonyl or N,N'-dibenzoylethylenediamine-4,4'-dicarbonyl.

6. Azo dyestuff according to claim 5, of the formula (XII)

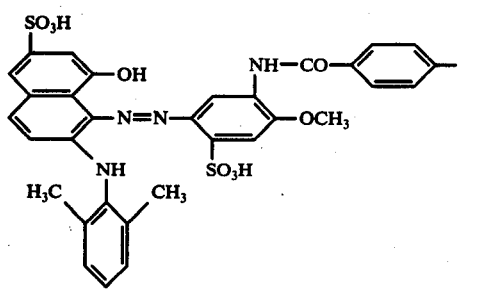

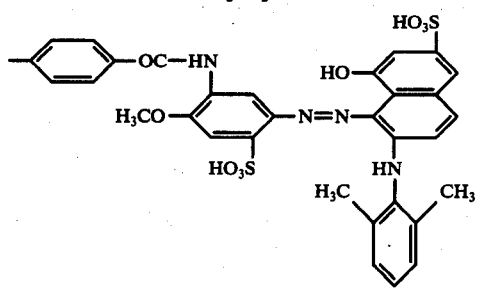

7. Azo dyestuff according to claim 5, of the formula (XIII)

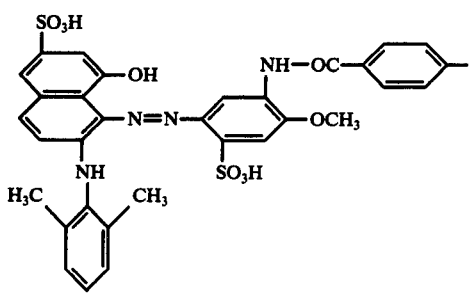

8. Azo dyestuff according to claim 5, of the formula (XIV)

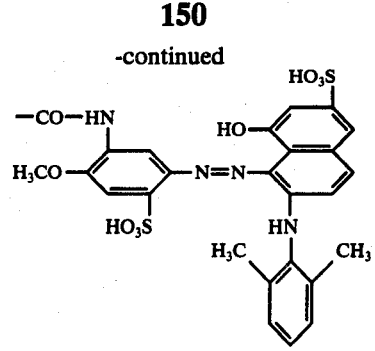

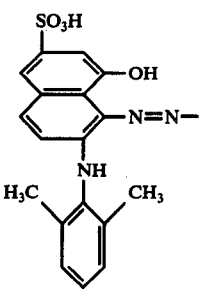

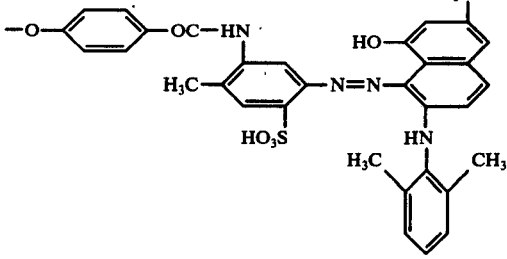

9. Azo dyestuff of the formula (XV)

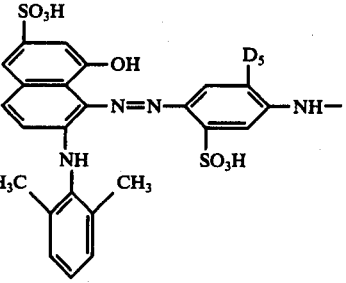

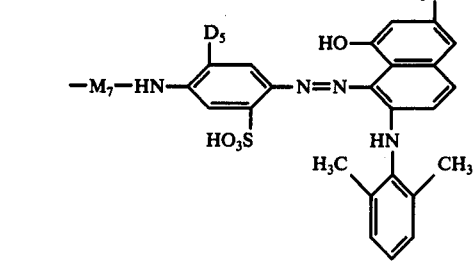

wherein $D_5$ denotes chlorine or methyl, methoxy or trifluoromethyl and $M_7$ denotes isophthaloyl, terephthaloyl, benzophenone-4,4'-dicarbonyl, naphthalene-2,6-dicarbonyl, diphenylsulphone-4,4'-dicarbonyl, N-benzoylaniline-3,4'-dicarbonyl, N-benzoyl-2-chloroaniline-5,4'-dicarbonyl or 1,2-diphenoxyethane-3',3''- or -4',4''-dicarbonyl or N,N'-dibenzoylethylenediamine-4,4'-dicarbonyl.

10. Azo dyestuff according to claim 9, of the formula (XVI)

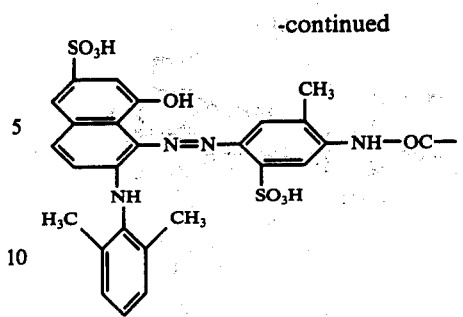

11. Azo dyestuff according to claim 9, of the formula

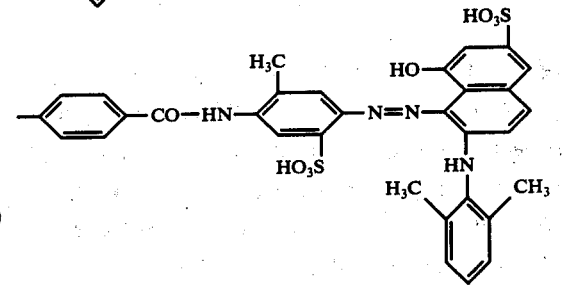

12. Azo dyestuff according to claim 9, of the formula (XVII)

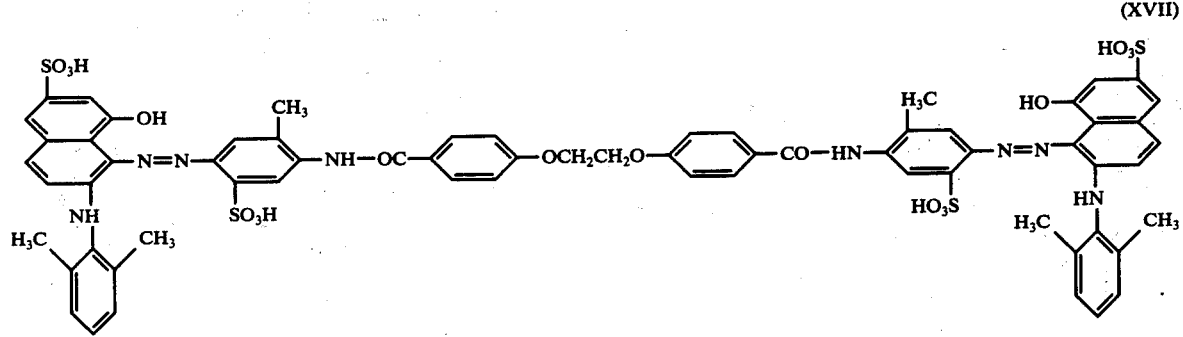

(XVIII)

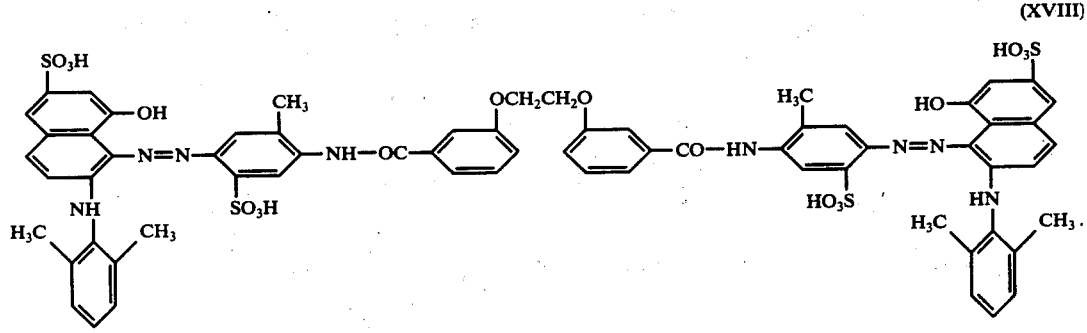

* * * * *

UNITED STATES PATENT AND TRADEMARK OFFICE
CERTIFICATE OF CORRECTION

PATENT NO. : 4,051,123
DATED : September 27, 1977
INVENTOR(S) : Bernhard Piller et al.

It is certified that error appears in the above-identified patent and that said Letters Patent is hereby corrected as shown below:

Column 147, the formula of claim 1 should appear as follows:

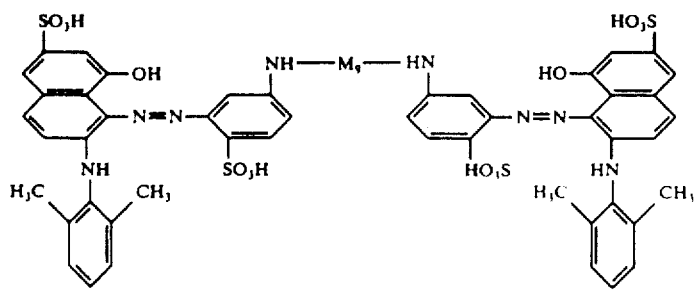

Column 148, No. 4, Insert -- HO -- above "-N=N".

Signed and Sealed this

Eighth Day of November 1983

[SEAL]

Attest:

GERALD J. MOSSINGHOFF

Attesting Officer

Commissioner of Patents and Trademarks